(12) United States Patent
Hirai et al.

(10) Patent No.: US 9,057,018 B2
(45) Date of Patent: *Jun. 16, 2015

(54) POLYMERIZABLE LIQUID CRYSTAL COMPOUND, POLYMERIZABLE LIQUID CRYSTAL COMPOSITION, AND POLYMER THEREOF

(75) Inventors: Yoshiharu Hirai, Chiba (JP); Ryushi Shundo, Chiba (JP); Takashi Kato, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 1050 days.

This patent is subject to a terminal disclaimer.

(21) Appl. No.: 12/659,693

(22) Filed: Mar. 17, 2010

(65) Prior Publication Data

US 2010/0304148 A1 Dec. 2, 2010

(30) Foreign Application Priority Data

Mar. 18, 2009 (JP) .................................. 2009-65683
Jan. 12, 2010 (JP) ................................. 2010-003684

(51) Int. Cl.
| | | |
|---|---|---|
| C09K 19/32 | (2006.01) | |
| C09K 19/34 | (2006.01) | |
| G02F 1/13363 | (2006.01) | |
| G02F 1/1337 | (2006.01) | |
| C09K 19/04 | (2006.01) | |
| G02F 1/1335 | (2006.01) | |

(52) U.S. Cl.
CPC ......... *C09K 19/32* (2013.01); *Y10T 428/31515* (2015.04); *Y10T 428/31855* (2015.04); *Y10T 428/31645* (2015.04); *Y10T 428/31518* (2015.04); *Y10T 428/31616* (2015.04); *Y10T 428/31504* (2015.04); *Y10T 428/31634* (2015.04); *Y10T 428/31786* (2015.04); *Y10T 428/31507* (2015.04); *Y10T 428/31971* (2015.04); *Y10T 428/31725* (2015.04); *Y10T 428/31623* (2015.04); *Y10T 428/31533* (2015.04); *Y10T 428/31935* (2015.04); *Y10T 428/31649* (2015.04); *Y10T 428/31938* (2015.04); *Y10T 428/31721* (2015.04); *C09K 2019/0448* (2013.01); *G02F 1/133536* (2013.01); *G02F 1/13363* (2013.01); *G02F 1/133711* (2013.01); *G02F 2001/133726* (2013.01); *G02F 2201/343* (2013.01); *G02F 2413/11* (2013.01); *G02F 2413/15* (2013.01)

(58) Field of Classification Search
CPC ............ G02F 2413/15; G02F 1/13363; G02F 2413/11; G02F 2201/343; G02F 1/133536; G02F 1/133711; G02F 2001/133726; G09K 19/32; G09K 2019/0448

USPC ............... 252/299.01, 299.6, 299.61, 299.62; 428/1.1, 412, 413, 473.5, 474.4, 480, 428/500, 532

See application file for complete search history.

(56) References Cited

U.S. PATENT DOCUMENTS

| | | |
|---|---|---|
| 4,009,200 A | 2/1977 | Little et al. |
| 2004/0222403 A1 | 11/2004 | Sasada et al. |
| 2006/0222784 A1 | 10/2006 | Saigusa et al. |
| 2006/0278851 A1 | 12/2006 | Ito et al. |
| 2007/0255031 A1* | 11/2007 | Lee et al. ...................... 526/283 |

FOREIGN PATENT DOCUMENTS

| | | |
|---|---|---|
| JP | 2002-372623 | 12/2002 |
| JP | 2006-111571 | 4/2006 |
| JP | 2006-285014 | 10/2006 |
| WO | 2005/040146 | 5/2005 |

OTHER PUBLICATIONS

Hsiao, S., Huang, T. "Synthesis and Properties of Novel Polyamides Based on a Benzonorbornane Dietheramine" Polymer Journal, vol. 34, No. 3, pp. 225-233 (2002).*

Pugh, C., Schrock, R., "Synthesis of Side-Chain Liquid Crystal Polymers by Living Ring-Opening Metathesis Polymerization" Macromolecules 1992, 25, 6593-6604.*

(Continued)

*Primary Examiner* — Callie Shosho
*Assistant Examiner* — John Freeman
(74) *Attorney, Agent, or Firm* — Wenderoth, Lind & Ponack, L.L.P.

(57) ABSTRACT

A compound represented by the formula (1) is provided. A polymerizable liquid crystal composition containing the compound can be controlled in birefringence and is excellent in stability of a liquid crystal phase. An anisotropic polymer excellent in uniformity of alignment is obtained by coating and polymerizing the composition on a supporting substrate. In the formula (1), at least one of $R^a$ represents a polymerizable group, A represents a ring group, Y and Z each represent a single bond or alkylene; in which $-CH_2-$ in the alkylene may be replaced by another group, and m and n each represent an integer of from 0 to 5.

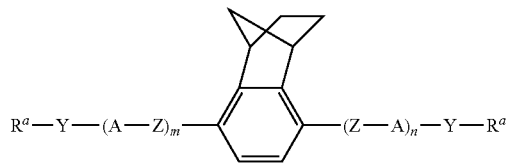

32 Claims, 1 Drawing Sheet

(56) References Cited

OTHER PUBLICATIONS

Abstract of JP2006307150 published Nov. 9, 2006.
Abstract of JP2004231638 published Aug. 19, 2004.
Abstract of JP2007016213 published Jan. 25, 2007.
Ya-Yin Chen et al., "Soluble and Colorless Poly(ether-imide)s Based on a Benzonorbornane Bis(ether anhydride) and Trifluoromethyl-Substituted Aromatic Bis(ether-amine)s," Macromolecular Chemistry and Physics, 2006, 207, p. 1888-1898.
Sheng-Huei Hsiao et al., "Synthesis and Properties of Aromatic Polyamides Based on a Benzonorbornane Bis(ether carboxylic acid)," Journal of Polymer Science: Part A: Polymer Chemistry, 2002, vol. 40, p. 947-957.

* cited by examiner

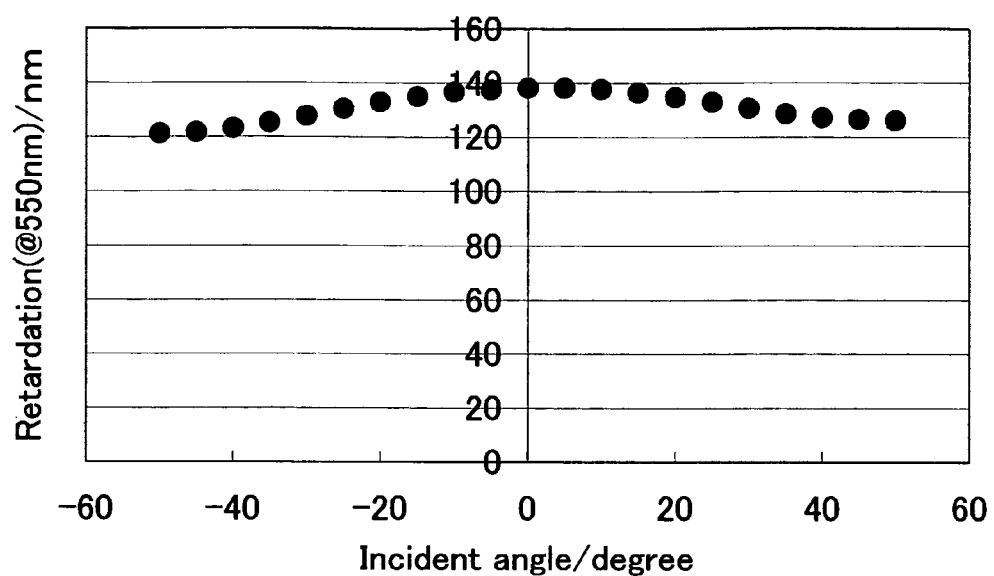

POLYMERIZABLE LIQUID CRYSTAL COMPOUND, POLYMERIZABLE LIQUID CRYSTAL COMPOSITION, AND POLYMER THEREOF

FIELD OF THE INVENTION

The present invention relates to a polymerizable liquid crystal compound having a norbornane skeleton in the molecular short axis, a polymerizable liquid crystal composition containing the compound, an anisotropic polymer and a polymer film obtained from the polymerizable liquid crystal composition, and use thereof.

BACKGROUND OF THE INVENTION

A polymerizable compound having a liquid crystal phase provides a polymer having such a function as optical compensation through polymerization. This is because the alignment of the liquid crystal molecules is fixed through polymerization. For utilizing the function of the polymer, various polymerizable compounds have been developed. However, a sufficient function may not be attained only with a single compound. Under the circumstances, such an attempt has been made that a composition is prepared from plural kinds of polymerizable compounds, and the composition is polymerized (see, for example, JP-2006-307150-A and JP-2004-231638-A).

In the specification, the facts that a liquid crystal skeleton exhibits such an alignment state as a homogeneous alignment (horizontal alignment), a tilted alignment, a homeotropic alignment (vertical alignment) or a twisted alignment may be expressed as "having a homogeneous alignment", "having a tilted alignment", "having a homeotropic alignment" or "having a twisted alignment", respectively. For example, a liquid crystal film having a homogeneous molecular alignment, i.e., a liquid crystal film oriented homogeneously, may be referred to as a liquid crystal film having a homogeneous alignment or a liquid crystal film of a homogeneous alignment.

A polymer having a homogeneous alignment can be used by combining, for example, with a ½ wavelength plate, a ¼ wavelength plate or a film having another optical function (see, for example, JP-2002-372623-A).

In the aforementioned purposes, a polymerizable liquid crystal material may be accumulated in some cases on a glass substrate, a glass substrate having a plastic thin film coated on the surface thereof (for example, an overcoating film formed on a color filter), a color filter substrate (see, for example, JP-2006-285014-A), or a plastic substrate. Examples of a material used as the plastic substrate include such polymers as TAC (triacetyl cellulose), polycarbonate, PET (polyethylene terephthalate) and a cycloolefin resin.

The inventors have found a polymerizable liquid crystal composition that can maintain the liquid crystal phase stably at room temperature to exhibit a uniform alignment property (see, for example, JP-2007-16213-A). However, in the case where the composition is changed in compositional ratio for changing the optical characteristics, particularly decreasing the birefringence (refractive index anisotropy Δn), a problem arises that the liquid crystal phase cannot be maintained. As another method for controlling the birefringence, a method of adding a compound having an aromatic ring in the short axis of the mesogen (a compound having a triptycene ring) has been proposed, but in the method, the addition of the compound in a large amount may cause crystallization, which brings about a problem in controlling the birefringence (see, for example, JP-2006-111571-A).

SUMMARY OF THE INVENTION

An object of the invention is to provide a compound that has liquid crystallinity and good miscibility, and also to provide a polymerizable liquid crystal composition that contains the compound, and has suitable optical anisotropy, good coating property and the like.

Another object of the invention is to provide a polymer that is obtained from the polymerizable liquid crystal composition through polymerization, and is excellent in optical anisotropy, transparency, chemical stability, heat resistance, hardness, dimensional stability, adhesiveness, stickiness, mechanical strength and the like, and also to provide use of the polymer utilizing the excellent properties.

Still another object of the invention is to provide a phase retardation film, an optical compensation film and a reflection film each containing the polymer, and also to provide an image display device, such as a liquid crystal display device, an organic electroluminescence (EL) display device and a plasma display panel (PDP), containing the films.

Other objects and advantages of the invention will be apparent from the following description.

The inventors have found that the use of a polymerizable compound having a norbornane skeleton in the molecular short axis as a component of a polymerizable liquid crystal composition maintains alignment uniformity of an optical anisotropic material and is advantageous for controlling the birefringence. It has also been found that the combination use with a polymerizable triptycene derivative can decrease the birefringence. Thus, the invention has been completed. The polymerizable liquid crystal compound having a norbornane skeleton in the molecular short axis has at least one polymerizable group and can be polymerized as similar to a polymerizable liquid crystal compound. A polymer obtained from a polymerizable liquid crystal composition containing the polymerizable liquid crystal compound forms an anisotropic polymer having controlled in alignment uniformly upon being coated on a supporting substrate, which has been subjected to a mechanical surface treatment such as rubbing, a photo aligning treatment, or a chemical treatment.

BRIEF DESCRIPTION OF THE DRAWING

FIG. 1 is an illustration showing measurement results of retardation of an anisotropic polymer in Example 1.

DETAILED DESCRIPTION OF THE INVENTION

Embodiments of the polymerizable liquid crystal compound having a norbornane skeleton in the molecular short axis, the polymerizable liquid crystal composition containing the compound, the polymer obtained from the composition, and the use thereof, according to the invention will be described in detail below.

The terms used in this specification will be explained. The term "liquid crystal compound" is a generic term for a compound having a liquid crystal phase, such as a nematic phase and a smectic phase, and a compound having no liquid crystal phase but being useful as a component of a liquid crystal composition. The term "compound (1)" means a compound represented by the formula (1) or at least one compound selected from compounds represented by the formula (1). Compounds represented by the other formulae may be referred in the similar manner. The term "composition (1)"

means a composition containing at least one compound selected from compounds represented by the formula (1).

The term "an anisotropic polymer" means a liquid crystal film, which is obtained by aligning a polymerizable liquid crystal compound or a composition containing the compound and then polymerizing the aligned compound or the aligned composition. The term "a polymer film" means a liquid crystal film, which is obtained by polymerizing the polymerizable liquid crystal compound or the polymerizable liquid crystal composition without aligning treatment. And, the term "an anisotropic polymer (1)" means a liquid crystal film, which is obtained by aligning the compound (1) or the composition (1) and then polymerizing the aligned compound (1) or the aligned composition (1), and "a polymer film (1)" means a liquid crystal film, which is obtained by polymerizing the compound (1) or the composition (1) without aligning treatment. A polymer of the compound (1) or the composition (1) may be referred to "the polymer (1)". And, this term "the polymer (1)" has also a meaning of a generic term for the anisotropic polymer (1) and the polymer film (1).

The term "(meth)acryloyloxy" is a generic term for acryloyloxy and methacryloyloxy. The term "(meth)acrylate" is a generic term for acrylate and methacrylate. The term "(meth)acrylic acid" is a generic term for acrylic acid and methacrylic acid.

The term "arbitrary" used upon defining the chemical structural formulae means that not only the position but also the number may be arbitrarily determined. For example, the expression "arbitrary A may be replaced by B, C or D" includes the case where arbitrary A may be replaced by B, the case where arbitrary A may be replaced by C, and the case where arbitrary A may be replaced by D, and also includes plural A may be replaced by at least two members selected from B, C and D. In the invention, however, two groups —CH$_2$— adjacent to each other are not replaced by the same two groups.

The embodiments of the invention include the following items [1] to [33].

[1] A polymerizable liquid crystal compound represented by the formula (1):

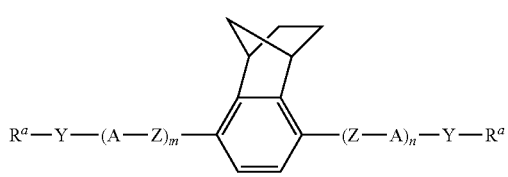

(1)

wherein at least one of R$^a$ represents a polymerizable group, and R$^a$, which is not the polymerizable group, represents chlorine, fluorine, cyano, alkyl having from 1 to 10 carbon atoms, alkoxy having from 1 to 10 carbon atoms, —CF$_3$ or —OCF$_3$;

A independently represents 1,4-cyclohexylene, 1,4-cyclohexenylene, 1,4-phenylene, naphthalen-2,6-diyl, tetrahydronaphthalen-2,6-diyl, fluoren-2,7-diyl or bicyclo[2.2.2]octan-1,4-diyl; in which one or two —CH$_2$— in the 1,4-cyclohexylene may be replaced by —O— provided that two —CH$_2$— adjacent to each other are not replaced simultaneously, one or two —CH= in the 1,4-phenylene may be replaced by —N=, and arbitrary hydrogen in the 1,4-phenylene may be replaced by halogen, cyano, alkyl having from 1 to 5 carbon atoms or halogenated alkyl having from 1 to 5 carbon atoms;

Z independently represents a single bond or alkylene having from 1 to 20 carbon atoms; in which in the alkylene, arbitrary —CH$_2$— may be replaced by —O—, —CO—, —COO—, —OCO—, —CH=CH—, —CF=CF— or —C≡C—, and arbitrary hydrogen may be replaced by halogen;

Y independently represents a single bond or alkylene having from 1 to 20 carbon atoms; in which in the alkylene, arbitrary —CH$_2$— may be replaced by —O—, —CO—, —COO—, —OCO—, —OCOO— or —CH=CH—, and arbitrary hydrogen may be replaced by halogen; and m and n independently represent an integer of from 0 to 5.

[2] The polymerizable liquid crystal compound according to the item [1], wherein the polymerizable group is a group represented by one of the formulae (p-1) to (p-6):

(p-1)

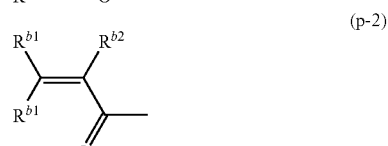

(p-2)

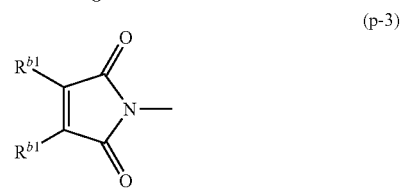

(p-3)

(p-4)

(p-5)

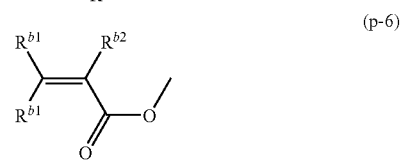

(p-6)

wherein R$^{b1}$ and R$^{b2}$ independently represent hydrogen, halogen, alkyl having from 1 to 5 carbon atoms or halogenated alkyl having from 1 to 5 carbon atoms.

[3] The polymerizable liquid crystal compound according to the item [1], wherein the polymerizable group is a group represented by one of the formulae (p-4) to (p-6):

(p-4)

(p-5)

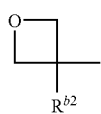

(p-6)

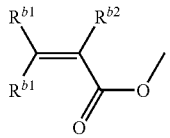

wherein $R^{b1}$ and $R^{b2}$ independently represent hydrogen, halogen, alkyl having from 1 to 5 carbon atoms or halogenated alkyl having from 1 to 5 carbon atoms.

[4] The polymerizable liquid crystal compound according to one of the items [1] to [3], wherein m+n is from 1 to 3 in the formula (1).

[5] The polymerizable liquid crystal compound according to one of the items [1] to [3], wherein m+n is 2 in the formula (1).

[6] The polymerizable liquid crystal compound according to one of the items [1] to [5], wherein in the formula (1), A independently represents 1,4-cyclohexylene, 1,4-phenylene, pyridin-2,5-diyl, pyridazin-3,6-diyl or pyrimidin-2,5-diyl; in which arbitrary hydrogen in the 1,4-phenylene may be replaced by chlorine, fluorine, cyano, alkyl having from 1 to 3 carbon atoms or fluoroalkyl having from 1 to 3 carbon atoms.

[7] The polymerizable liquid crystal compound according to one of the items [1] to [5], wherein in the formula (1), A independently represents 1,4-cyclohexylene or 1,4-phenylene; in which arbitrary hydrogen in the 1,4-phenylene may be replaced by chlorine, fluorine, cyano, —$CH_3$ or —$CF_3$.

[8] The polymerizable liquid crystal compound according to one of the items [1] to [7], wherein in the formula (1), Z independently represents a single bond, —$CH_2O$—, —$OCH_2$—, —COO—, —OCO—, —CH=CH—, —$(CH_2)_2$COO—, —OCO$(CH_2)_2$—, —CH=CH—COO—, —OCO—CH=CH— or —C≡C—.

[9] The polymerizable liquid crystal compound according to one of the items [1] to [7], wherein in the formula (1), Z independently represents a single bond, —$CH_2O$—, —$OCH_2$—, —COO— or —OCO—.

[10] The polymerizable liquid crystal compound according to one of the items [1] to [9], wherein in the formula (1), Y independently represents alkylene having from 1 to 10 carbon atoms; in which arbitrary —$CH_2$— in the alkylene may be replaced by —O—, —COO—, —OCO— or —OCOO—.

[11] A polymerizable liquid crystal composition containing at least one polymerizable liquid crystal compound selected from the group of the polymerizable liquid crystal compounds according to one of the items [1] to [10].

[12] A polymerizable liquid crystal composition containing at least one polymerizable liquid crystal compound selected from the group of compounds represented by the formula (1), and at least one polymerizable compound selected from the group of compounds represented by the formulae (M1), (M2-1), (M2-2), (M3) and (M4):

(1)

wherein
at least one of $R^a$ represents a polymerizable group represented by one of the formulae (p-1) to (p-6), and $R^a$, which is not the polymerizable group, represents chlorine, fluorine, cyano, alkyl having from 1 to 10 carbon atoms, alkoxy having from 1 to 10 carbon atoms, —$CF_3$ or —$OCF_3$:

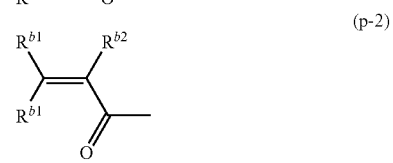
(p-1)

(p-2)

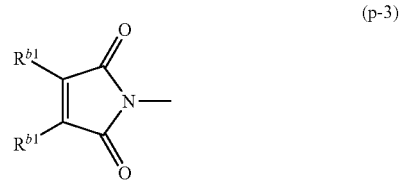
(p-3)

(p-4)

(p-5)

(p-6)

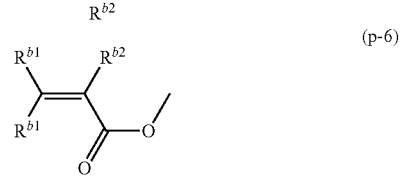

wherein $R^{b1}$ and $R^{b2}$ independently represent hydrogen, halogen, alkyl having from 1 to 5 carbon atoms or halogenated alkyl having from 1 to 5 carbon atoms;

A independently represents 1,4-cyclohexylene, 1,4-cyclohexenylene, 1,4-phenylene, naphthalen-2,6-diyl, tetrahydronaphthalen-2,6-diyl, fluoren-2,7-diyl or bicyclo[2.2.2]octan-1,4-diyl; in which one or two —$CH_2$— in the 1,4-cyclohexylene may be replaced by —O— provided that two —$CH_2$— adjacent to each other are not replaced simultaneously, one or two —CH= in the 1,4-phenylene may be replaced by —N=, and arbitrary hydrogen in the 1,4-phenylene may be replaced by halogen, cyano, alkyl having from 1 to 5 carbon atoms or halogenated alkyl having from 1 to 5 carbon atoms;

Z independently represents a single bond or alkylene having from 1 to 20 carbon atoms; in which in the alkylene, arbitrary —CH$_2$— may be replaced by —O—, —CO—, —COO—, —OCO—, —CH=CH—, —CF=CF— or —C≡C—, and arbitrary hydrogen may be replaced by halogen;

Y independently represents a single bond or alkylene having from 1 to 20 carbon atoms; in which in the alkylene, arbitrary —CH$_2$— may be replaced by —O—, —CO—, —COO—, —OCO—, —OCOO— or —CH=CH—, and arbitrary hydrogen may be replaced by halogen; and m and n independently represent an integer of from 0 to 5,

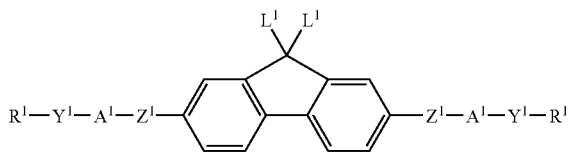

(M1)

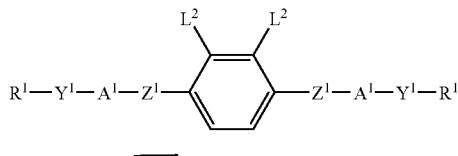

(M2-1)

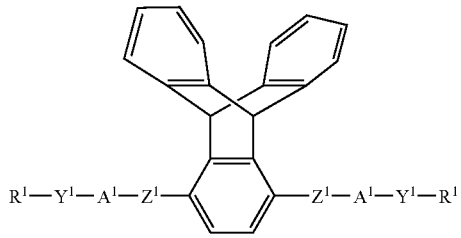

(M-2-2)

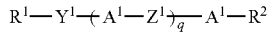

(M3)

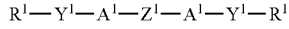

(M4)

wherein
R$^1$ independently represents a group represented by one of the formulae (p-1) to (p-6);

R$^2$ represents alkyl having from 1 to 10 carbon atoms, alkoxy having from 1 to 10 carbon atoms, chlorine, fluorine, cyano, —CF$_3$ or —OCF$_3$;

A$^1$ independently represents 1,4-cyclohexylene or 1,4-phenylene; in which arbitrary hydrogen in the 1,4-phenylene may be replaced by fluorine;

Z$^1$ independently represents a single bond, —CH$_2$CH$_2$—, —CH$_2$O—, —OCH$_2$—, —COO—, —OCO—, —CH=CH—, —C≡C—, —CH=CHCOO—, —CH=CHOCO—, —(CH$_2$)$_2$COO— or —(CH$_2$)$_2$OCO—;

Y$^1$ independently represents a single bond or alkylene having from 1 to 20 carbon atoms; in which arbitrary —CH$_2$— in the alkylene may be replaced by —O—, —CO—, —COO—, —OCO—, —OCOO— or —CH=CH—;

L$^1$ independently represents hydrogen, fluorine or —CH$_3$;

L$^2$ independently represents hydrogen, chlorine, fluorine, —CH$_3$ or —CF$_3$; and q represents 1 or 2.

[13] The polymerizable liquid crystal composition according to the item [12], wherein
in the formula (1),
the polymerizable group is a group represented by one of the formulae (p-4) to (p-6);
A independently represents 1,4-cyclohexylene, 1,4-phenylene, pyridin-2,5-diyl, pyridazin-3,6-diyl or pyrimidin-2, 5-diyl; in which arbitrary hydrogen in the 1,4-phenylene may be replaced by chlorine, fluorine, cyano, alkyl having from 1 to 3 carbon atoms or fluoroalkyl having from 1 to 3 carbon atoms;

Z independently represents a single bond, —CH$_2$O—, —OCH$_2$—, —COO—, —OCO—, —CH=CH—, —(CH$_2$)$_2$COO—, —OCO(CH$_2$)$_2$—, —CH=CH—COO—, —OCO—CH=CH— or —C≡C—;

Y independently represents a single bond or alkylene having from 1 to 10 carbon atoms; in which arbitrary —CH$_2$— in the alkylene may be replaced by —O—, —COO—, —OCO— or —OCOO—; and m and n each represent 1,
in the formulae (M1), (M2-1), (M2-2), (M3) and (M4),
R$^1$ independently represents a group represented by one of the formulae (p-4) to (p-6);

R$^2$ represents alkyl having from 1 to 5 carbon atoms, alkoxy having from 1 to 5 carbon atoms, chlorine, fluorine, cyano, —CF$_3$ or —OCF$_3$;

A$^1$ independently represents 1,4-cyclohexylene, 1,4-phenylene, monofluoro-1,4-phenylene or difluoro-1,4-phenylene;

Z$^1$ independently represents a single bond, —CH$_2$O—, —OCH$_2$—, —COO—, —OCO—, —C≡C—, —CH=CHCOO—, —OCOCH=CH—, —(CH$_2$)$_2$COO— or —OCO(CH$_2$)$_2$—;

Y$^1$ independently represents a single bond or alkylene having from 1 to 10 carbon atoms; in which arbitrary —CH$_2$— in the alkylene may be replaced by —O—, —COO—, —OCO— or —OCOO—;

L$^1$ independently represents hydrogen, fluorine or —CH$_3$;

L$^2$ independently represents hydrogen, chlorine, fluorine, —CH$_3$ or —CF$_3$; and q represents 1 or 2, and
a ratio of the compound represented by the formula (1) is from 1 to 90% by weight, and a ratio of the polymerizable compound selected from the group of compounds represented by the formulae (M1), (M2-1), (M2-2), (M3) and (M4) is from 10 to 99% by weight, based on a total amount of the compound represented by the formula (1) and the polymerizable compound selected from the group of compounds represented by the formulae (M1), (M2-1), (M2-2), (M3) and (M4).

[14] The polymerizable liquid crystal composition according to the item [12], wherein
in the formula (1),
the polymerizable group is a group represented by one of the formulae (p-4) to (p-6);
A independently represents 1,4-cyclohexylene or 1,4-phenylene; in which arbitrary hydrogen in the rings may be replaced by chlorine, fluorine, —CH$_3$ or —CF$_3$;

Z independently represents a single bond, —COO— or —OCO—;

Y independently represents alkylene having from 1 to 10 carbon atoms; in which in the alkylene, —CH$_2$— adjacent to the ring may be replaced by —O—, —COO—, —OCO— or —OCOO—; and m and n each represent 1,
in the formulae (M1), (M2-1), (M2-2), (M3) and (M4),
R$^1$ independently represents a group represented by one of the formulae (p-4) to (p-6);

R$^2$ represents alkyl having from 1 to 5 carbon atoms, alkoxy having from 1 to 5 carbon atoms, cyano, fluorine or —OCF$_3$;

A$^1$ independently represents 1,4-cyclohexylene, 1,4-phenylene, monofluoro-1,4-phenylene or difluoro-1,4-phenylene;

$Z^1$ independently represents a single bond, —COO—, —OCO—, —CH═CHCOO—, —OCOCH═CH—, —(CH$_2$)$_2$COO— or —OCO(CH$_2$)$_2$—;

$Y^1$ independently represents a single bond or alkylene having from 1 to 10 carbon atoms; in which in the alkylene, —CH$_2$— adjacent to the ring may be replaced by —O—, —COO—, —OCO— or —OCOO—;

$L^1$ independently represents hydrogen or —CH$_3$;

$L^2$ independently represents hydrogen, fluorine, —CH$_3$ or —CF$_3$; and q represents 2, and a ratio of the compound represented by the formula (1) is from 3 to 85% by weight, and a ratio of the polymerizable compound selected from the group of compounds represented by the formulae (M1), (M2-1), (M2-2), (M3) and (M4) is from 15 to 97% by weight, based on a total amount of the compound represented by the formula (1) and the polymerizable compound selected from the group of compounds represented by the formulae (M1), (M2-1), (M2-2), (M3) and (M4).

[15] The polymerizable liquid crystal composition according to one of the items [12] to [14], wherein the composition further contains a polymerizable compound which is not represented by the formula (1), (M1), (M2-1), (M2-2), (M3) and (M4), and is not optically active.

[16] The polymerizable liquid crystal composition according to one of the items [12] to [15], wherein the composition further contains a polymerizable optically active compound.

[17] The polymerizable liquid crystal composition according to one of the items [12] to [16], wherein the composition further contains a non-polymerizable liquid crystal compound.

[18] The polymerizable liquid crystal composition according to one of the items [12] to [17], wherein the composition further contains a non-polymerizable optically active compound.

[19] A polymer film obtained by polymerizing the polymerizable liquid crystal composition according to one of the items [12] to [18].

[20] An anisotropic polymer obtained by polymerizing the polymerizable liquid crystal composition according to one of the items [12] to [18].

[21] The anisotropic polymer according to the item [20], wherein the polymerizable liquid crystal composition has one alignment mode selected from a homogeneous alignment, a tilted alignment, a twisted alignment and a homeotropic alignment.

[22] The anisotropic polymer according to the item [20] or [21], wherein an alignment mode of the polymerizable liquid crystal composition is controlled by one method selected from a rubbing treatment, a photo alignment treatment, an ion beam treatment, a corona treatment and a plasma treatment.

[23] The anisotropic polymer according to the item [20] or [21], wherein an alignment mode of the polymerizable liquid crystal composition is controlled by one method selected from a rubbing treatment, a photo alignment treatment, a corona treatment and a plasma treatment.

[24] The anisotropic polymer according to one of the items [20] to [23], wherein the anisotropic polymer is formed on a glass substrate as a supporting substrate.

[25] The anisotropic polymer according to one of the items [20] to [23], wherein the anisotropic polymer is formed on a glass substrate having a plastic thin film coated thereon or on a plastic substrate containing a plastic film, as a supporting substrate.

[26] The anisotropic polymer according to the item [25], wherein a plastic material as a material for the plastic thin film and the plastic film is one material selected from polyimide, polyamideimide, polyamide, polyetherimide, polyether ether ketone, polyether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, cellulose, triacetyl cellulose, a partially saponified product of triacetyl cellulose, an epoxy resin, a phenol resin and a cycloolefin resin.

[27] The anisotropic polymer according to the item [25], wherein a plastic material as a material for the plastic thin film and the plastic film is one material selected from polyimide, polyvinyl alcohol, triacetyl cellulose, a partially saponified product of triacetyl cellulose and a cycloolefin resin.

[28] An optical compensation film containing the anisotropic polymer according to one of the items [20] to [27].

[29] A reflection film containing the anisotropic polymer according to one of the items [20] to [27].

[30] A liquid crystal display device containing the optical compensation film according to the item [28].

[31] A liquid crystal display device containing the reflection film according to the item [29].

[32] A liquid crystal display apparatus containing the optical compensation film according to the item [28].

[33] A liquid crystal display apparatus containing the reflection film according to the item [29].

The polymerizable liquid crystal compound of the invention is represented by the formula (1).

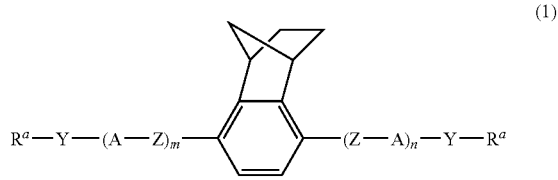

(1)

In the formula (1), at least one of the groups represented by $R^a$ is a polymerizable group. Accordingly, the formula (1) can be expanded to the following two formulae (1-A) and (1-B).

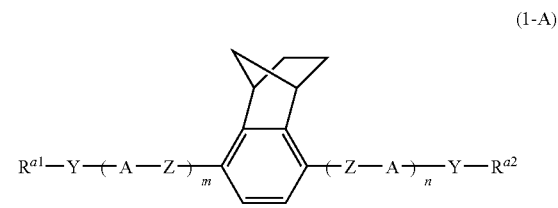

(1-A)

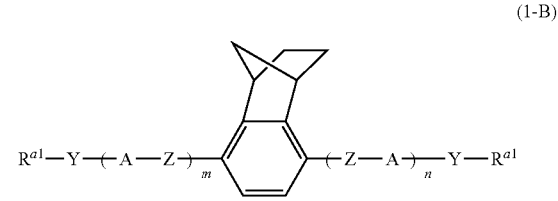

(1-B)

In the formulae (1-A) and (1-B), $R^{a1}$ represents a polymerizable group, and preferably a group represented by the following formulae (p-1) to (p-6). In the formula (1-B), the two groups represented by $R^{a1}$ may be the same as or different from each other, and preferably are the same as each other.

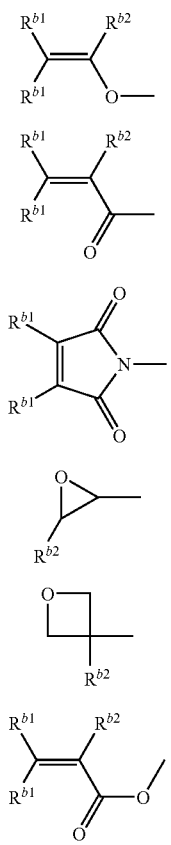

In the formulae (p-1) to (p-6), $R^{b1}$ and $R^{b2}$ independently represent hydrogen, halogen, alkyl having from 1 to 5 carbon atoms or halogenated alkyl having from 1 to 5 carbon atoms. Preferred examples of $R^{b1}$ and $R^{b2}$ include hydrogen, fluorine, chlorine, —$CH_3$ and —$CF_3$. Particularly preferred example of $R^{b1}$ is hydrogen.

More preferred examples of $R^{a1}$ include groups represented by the formulae (p-4), (p-5) and (p-6), and particularly preferred example of $R^{a1}$ is a group represented by the formula (p-6).

In the formula (1-A) $R^{a2}$ represents chlorine, fluorine, cyano, alkyl having from 1 to 10 carbon atoms, alkoxy having from 1 to 10 carbon atoms, —$CF_3$ or —$OCF_3$.

In the formulae (1-A) and (1-B), A independently represents 1,4-cyclohexylene, 1,4-cyclohexenylene, 1,4-phenylene, naphthalen-2,6-diyl, tetrahydronaphthalen-2,6-diyl, fluoren-2,7-diyl or bicyclo[2.2.2]octan-1,4-diyl. One or two —$CH_2$— in the 1,4-cyclohexylene may be replaced by —O—, provided that two —$CH_2$— adjacent to each other are not replaced simultaneously. One or two —CH= in the 1,4-phenylene may be replaced by —N=, and arbitrary hydrogen in the 1,4-phenylene may be replaced by halogen, cyano, alkyl having from 1 to 5 carbon atoms or halogenated alkyl having from 1 to 5 carbon atoms.

Preferred examples of A include 1,4-cyclohexylene, 1,4-phenylene, pyridin-2,5-diyl, pyridazin-3,6-diyl and pyrimidin-2,5-diyl; in which arbitrary hydrogen in the 1,4-phenylene may be replaced by chlorine, fluorine, cyano, alkyl having from 1 to 3 carbon atoms or fluoroalkyl having from 1 to 3 carbon atoms. More preferred examples of A include 1,4-cyclohexylene or 1,4-phenylene; in which arbitrary hydrogen may be replaced by chlorine, fluorine, cyano, —$CH_3$ or —$CF_3$.

In the formulae (1-A) and (1-B), Z independently represents a single bond or alkylene having from 1 to 20 carbon atoms. In the alkylene, arbitrary —$CH_2$— may be replaced by —O—, —CO—, —COO—, —OCO—, —CH=CH—, —CF=CF— or —C≡C—, and arbitrary hydrogen may be replaced by halogen.

Preferred examples of Z include a single bond, —$CH_2$O—, —$OCH_2$—, —COO—, —OCO—, —CH=CH—, —$(CH_2)_2$COO—, —$OCO(CH_2)_2$—, —CH=CH—COO—, —OCO—CH=CH— and —C≡C—, and more preferred examples of Z include a single bond, —$CH_2$O—, —$OCH_2$—, —COO— and —OCO—.

In the formulae (1-A) and (1-B), Y independently represents a single bond or alkylene having from 1 to 20 carbon atoms. In the alkylene, arbitrary —$CH_2$— may be replaced by —O—, —CO—, —COO—, —OCO—, —OCOO— or —CH=CH—, and arbitrary hydrogen may be replaced by halogen.

Preferred examples of Y include alkylene having from 1 to 10 carbon atoms. In the alkylene, arbitrary —$CH_2$— may be replaced by —O—, —COO—, —OCO— or —OCOO—.

In the formulae (1-A) and (1-B), m and n independently represent an integer of from 0 to 5. m+n is preferably from 1 to 3, and more preferably 2. It is further preferred that m and n are each 1.

The compound (1) of the invention has high polymerization reactivity. The compound (1) has a large internal free volume owing to the norbornane skeleton in the molecular short axis, and thus has a function of decreasing optical anisotropy. The compound (1) facilitates maintenance of a liquid crystal phase owing to the liquid crystal skeleton thereof, and is easily mixed with another liquid crystal compound or polymerizable compound or the like to form a uniform state. The compound (1) has optical activity when it has an asymmetric carbon atom.

The compound (1) can be arbitrarily controlled in properties, such as optical anisotropy, by appropriately selecting the end group, ring and bonding group. The effects of the end group $R^a$, the ring A and the bonding group Z on the properties of the compound (1) are described below.

In the case where the end group $R^a$ is chlorine, fluorine, cyano, alkyl having from 1 to 10 carbon atoms, alkoxy having from 1 to 10 carbon atoms, —$CF_3$ or —$OCF_3$, such properties as the melting point, the solubility in a solvent, the compatibility with another compound may be influenced. In the case where the end group $R^a$ is alkyl having from 1 to 10 carbon atoms or alkoxy having from 1 to 10 carbon atoms, the melting point and the solubility may be influenced, and in the case where the end group $R^a$ is chlorine, fluorine, cyano, —$CF_3$ or —$OCF_3$, such properties as the melting point, the solubility in a solvent and the compatibility with another compound may also be influenced.

In the case where the ring A is 1,4-phenylene, 1,4-phenylene having arbitrary hydrogen replaced by fluorine, pyridin-2,5-diyl, pyridazin-3,6-diyl or pyrimidin-3,6-diyl, the optical anisotropy is large. In the case where the ring A is 1,4-cyclohexylene, 1,4-cyclohexenylene or 1,3-dioxan-2,5-diyl, the optical anisotropy is small. In the case where at least two rings of the plural rings A are 1,4-cyclohexylene, the clearing point is high, the optical anisotropy is small, and the viscosity is small. In the case where at least one ring thereof is 1,4-phenylene, the optical anisotropy is relatively large, and the alignment order parameter is large. In the case where at least two rings thereof are 1,4-phenylene, the optical anisotropy is large, the temperature range of a liquid crystal phase is wide, and the clearing point is high.

In the case where the bonding group Z is a single bond, —(CH$_2$)$_2$—, —CH$_2$O—, —OCH$_2$—, —CF$_2$O—, —OCF$_2$—, —CH═CH—, —CF═CF— or —(CH$_2$)$_4$—, the viscosity is small. In the case where the bonding group Z is a single bond, —(CH$_2$)$_2$—, —OCF$_2$—, —CF$_2$O—, —CH═CH— or —(CH$_2$)$_4$—, the viscosity is smaller. In the case where the bonding group Z is —CH═CH— or —CF═CF—, the temperature range of a liquid crystal phase is wide, and the elastic constant ratio is large. In the case where the bonding group Z is —C≡C—, the optical anisotropy is large.

In the case where the compound (1) has three or less rings, the viscosity is low, and in the case where the compound (1) has three or more rings, the clearing point is high. In the invention, a six-membered ring and the like are defined as the ring, but a cyclic polymerizable group is not defined as the ring.

The compound (1) may be optically active or optically inactive. In the case where the compound (1) is optically active, the steric configuration of the asymmetric carbon atom may be either R or S. The compound (1) having an asymmetric carbon atom has good compatibility.

A compound having target properties can be obtained by appropriately selecting the kinds of the end group, ring and bonding group, and the number of the rings.

The compound (1) can be synthesized by combining various methods of organic synthetic chemistry. The methods for introducing the target end group, ring and bonding group into a starting substance are described, for example, in: Houben-Wyle, Methods of Organic Chemistry, Georg Thieme Valag, Stuttgart; Organic Reactions, John Wiley & Sons, Inc.; Organic Syntheses, John Wiley & Sons, Inc.; Comprehensive Organic Synthesis, Pergamon Press; and New Experimental Chemistry Course (Shin Jikken Kagaku Kouza), Maruzen, Inc.

The synthesis of the bonding group Z is described with reference to scheme 1 to 12 below. In the schemes, MSG$^1$ and MSG$^2$ each represent a monovalent organic group having at least one ring. Plural groups of MSG$^1$ (or MSG$^2$) may be the same as or different from each other. The compounds (1A) to (1M) each correspond to the compound (1) of the invention. These methods can be applied to the optically active compound (1) and the optically inactive compound (1). These methods can also be applied to synthesis of a part of Y and the like.

<Scheme 1> Compound Having Single Bond as Z

As shown below, an arylboronic acid (S1) and a compound (S2) synthesized by a known method are reacted in a carbonate salt aqueous solution in the presence of a catalyst, such as tetrakis(triphenylphosphine)palladium, to synthesize a compound (1A). The compound (1A) can also be synthesized in such a manner that a compound (S3) synthesized by a known method is reacted with n-butyllithium and the with zinc chloride, and is further reacted with the compound (S2) in the presence of a catalyst, such as dichlorobis(triphenylphosphine)palladium.

<Scheme 2> Compound having —CH═CH— as Z

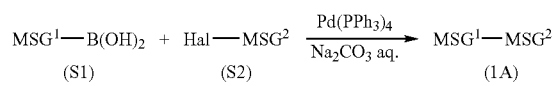

-continued

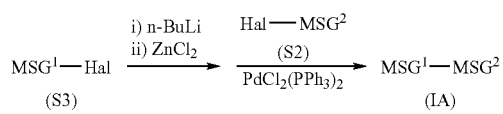

As shown below, a base, such as potassium t-butoxide, is added to a phosphonium salt (S5) synthesized by a known method to generate a phosphoylide, which is then reacted with an aldehyde (S4) to synthesize a compound (1B). A cis isomer may be formed depending on the reaction conditions and the reaction substances, and the cis isomer is isomerized to a trans isomer by a known method depending on necessity.

<Scheme 3> Compound having —(CH$_2$)$_2$— as Z

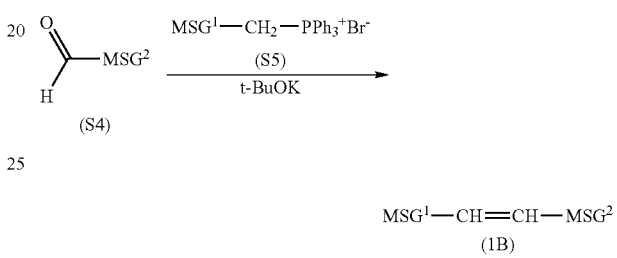

As shown below, the compound (1B) is hydrogenated in the presence of a catalyst, such as palladium carbon, to synthesize a compound (1C).

<Scheme 4> Compound having —(CF$_2$)$_2$— as Z

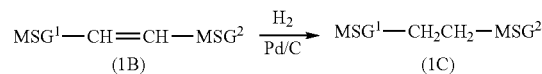

As shown below, a diketone (S6) is fluorinated with sulfur tetrafluoride in the presence of a hydrogen fluoride catalyst according to the method disclosed in J. Am. Chem. Soc., vol. 123, p. 5414 (2001) to synthesize a compound (1D) having —(CF$_2$)$_2$—.

<Scheme 5> Compound having —(CH$_2$)$_4$— as Z

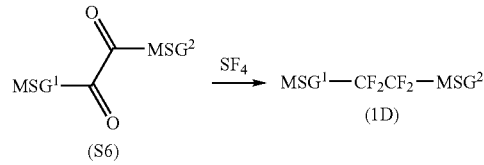

As shown below, a compound having —(CH$_2$)$_2$—CH═CH— is synthesized according to the manner in the scheme 2 except that a phosphonium salt (S7) is used instead of the phosphonium salt (S5), and is then subjected to contact hydrogenation to synthesize a compound (1E).

<Scheme 6> Compound having
—CH₂O— or —OCH₂— as Z

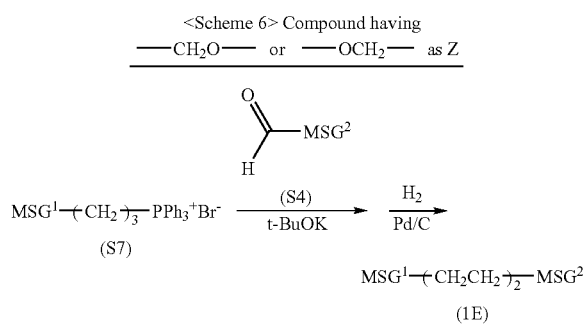

As shown below, a compound (S4) is reduced with a reducing agent, such as sodium borohydride, to provide a compound (S8). The compound (S8) is halogenated with a hydrobromic acid or the like to provide a compound (S9). The compound (S9) is reacted with a compound (S10) in the presence of potassium carbonate or the like to synthesize a compound (1F). A compound having —CH₂O— can be synthesized in the similar manner.

<Scheme 7> Compound having
—COO— or —OCO— as Z

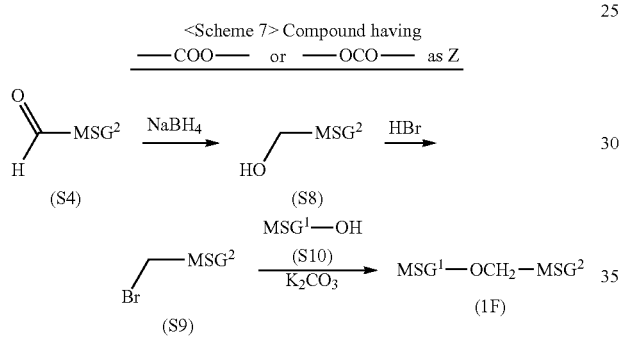

As shown below, a compound (S3) is reacted with n-butyllithium and then with carbon dioxide to provide a carboxylic acid (S11). The compound (S11) and a phenol (S10) are dehydrated in the presence of DCC (1,3-dicyclohexylcarbodiimide) and DMAP (4-dimethylaminopyridine) to synthesize a compound (1G) having —COO—. A compound having —OCO— can be synthesized in the similar manner. The compound (S11) is derived to a acid chloride compound by acting thionyl chloride or oxalyl chloride, and the acid chloride compound is reacted with the compound (S10) in the presence of a base, such as pyridine or triethylamine, to synthesize the compound (1G).

<Scheme 8>
Compound having —CF═CF— as Z

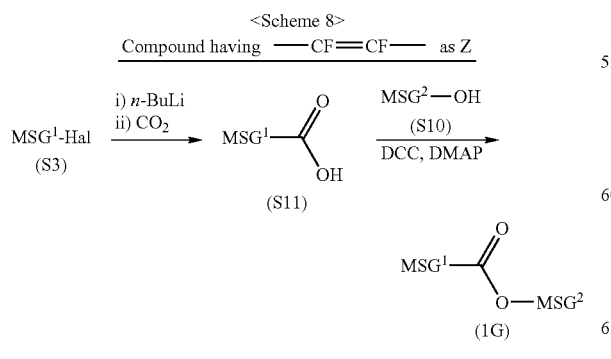

As shown below, a compound (S3) is treated with n-butyllithium and then reacted with tetrafluoroethylene to provide a compound (S12). A compound (S2) is treated with n-butyllithium and then reacted with the compound (S12) to synthesize a compound (1H). A cis isomer of the compound (1H) can be produced by selecting the reaction conditions.

<Scheme 9>
Compound having —C≡C— as Z

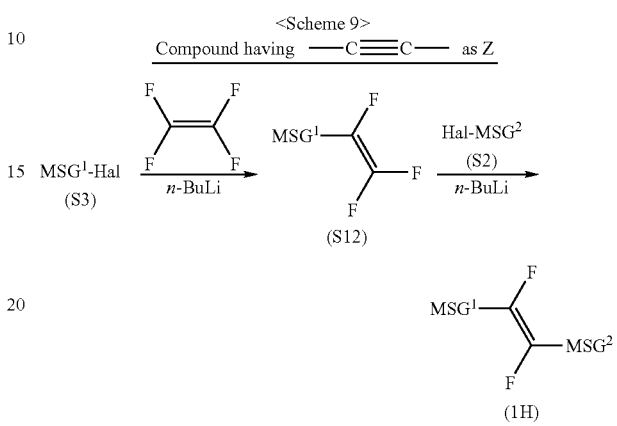

As shown below, a compound (S13) and a compound (S2) are reacted in the presence of a catalyst containing dichloropalladium and copper halide to synthesize a compound (1J).

<Scheme 10>
Compound having —C≡C—COO— as Z

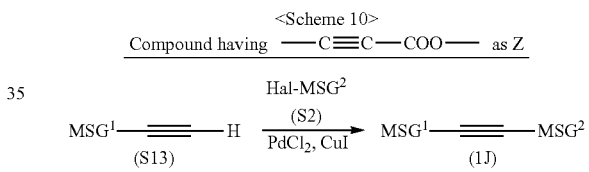

As shown below, a compound (S13) is lithiated with n-butyllithium and then reacted with carbon dioxide to provide a carboxylic acid (S14). The carboxylic acid (S14) and a phenol (S10) are dehydrated in the presence of DCC and DMAP to synthesize a compound (1K) having —C≡C—COO—. A compound having —OCO—C≡C— can be synthesized by the similar manner. The compound (1K) can also be synthesized through an acid chloride, as similar to the synthesis of the compound (1G) from the compound (S11) in the scheme 7.

<Scheme 11>
Compound having —C≡C—CH═CH— or
—CH═CH—C≡C— as Z

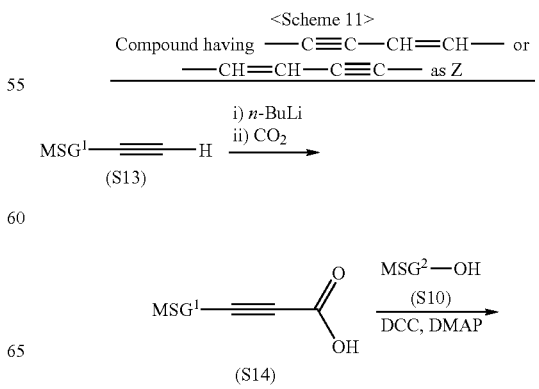

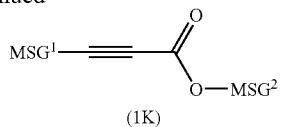
(1K)

As shown below, a compound (S13) and a vinyl bromide (S15) are subjected to cross-coupling reaction to synthesize a compound (1L) having —C≡C—CH═CH—. A cis isomer of the compound (1L) can be produced by using a cis isomer of the compound (S15).

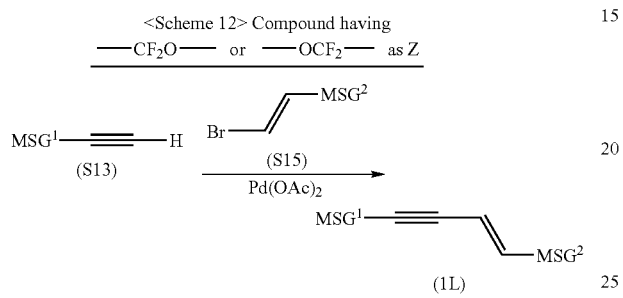

As shown below, a compound (1G) is treated with a sulfurizing agent, such as Lawesson's reagent, to provide a compound (S16). The compound (S16) is then fluorinated with a hydrogen fluoride pyridine complex and NBS (N-bromosuccinimide) to synthesize a compound (1M) having —$CF_2O$—. The compound (1M) may also be synthesized by fluorinating the compound (S16) with (diethylamino)sulfur trifluoride (DAST). A compound having —$OCF_2$— can be synthesized in the similar manner. These bonding groups can be formed by the method disclosed in P. Kirsch, et al., Angew. Chem. Int. Ed., vol. 40, p. 1480 (2001).

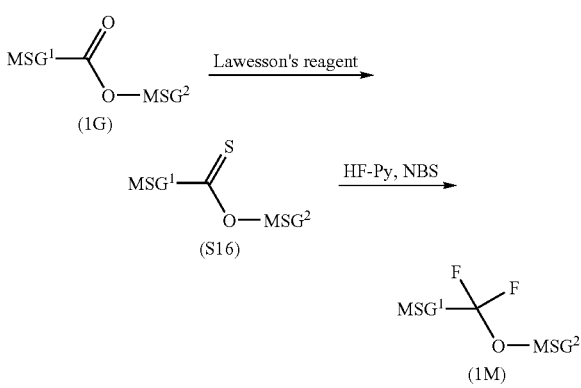

Examples of the compounds synthesized in the aforementioned manners are shown below. The structures of the compounds synthesized in the aforementioned manners can be confirmed, for example, by a proton NMR spectrum.

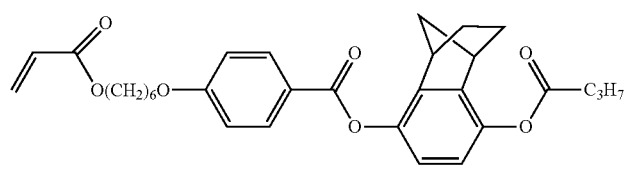
1-A-1

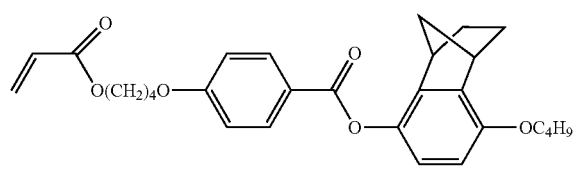
1-A-2

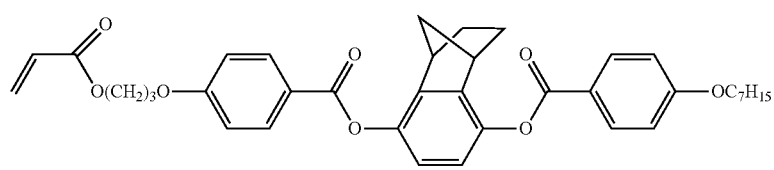
1-A-3

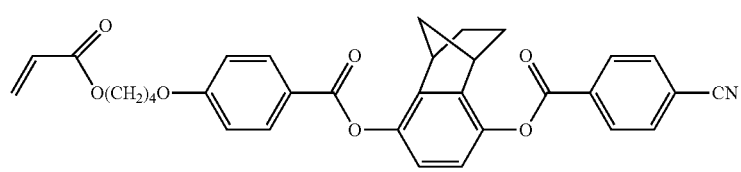
1-A-4

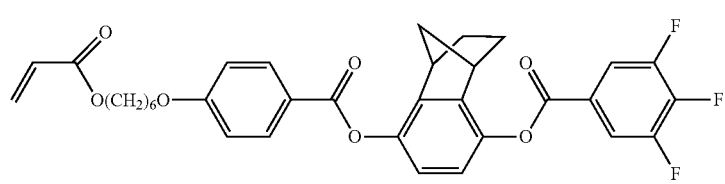
1-A-5

-continued
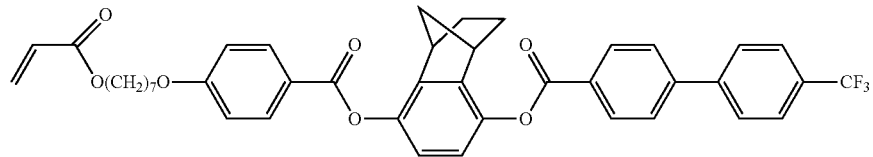
1-A-6
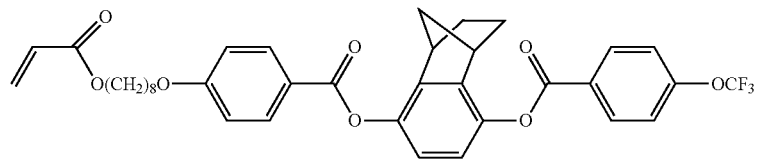
1-A-7
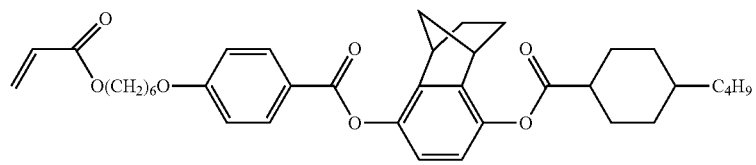
1-A-8
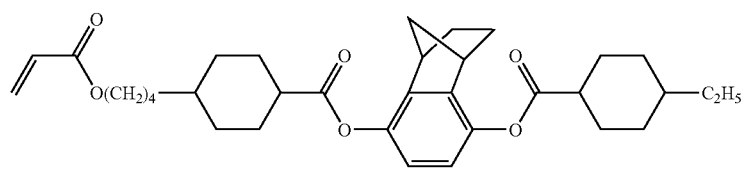
1-A-9
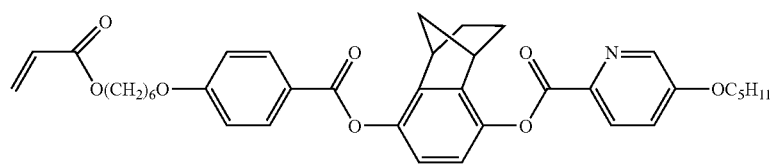
1-A-10
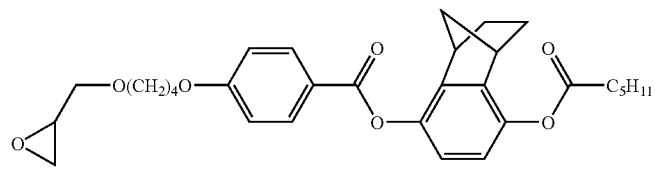
1-A-11
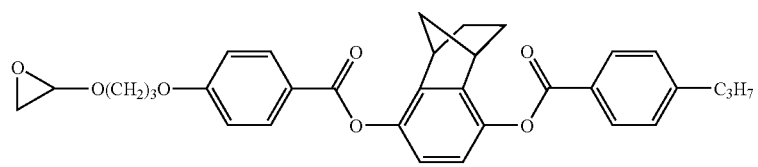
1-A-12
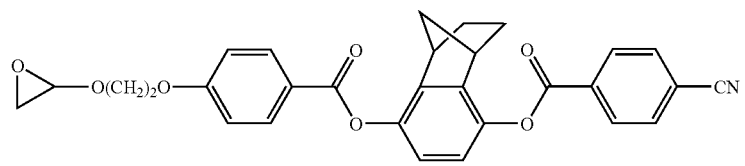
1-A-13
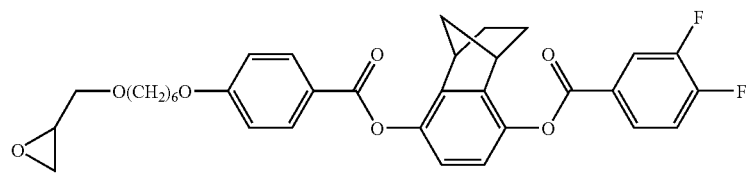
1-A-14

-continued
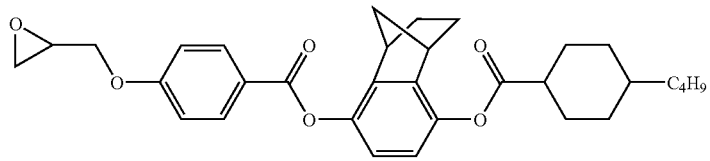
1-A-15
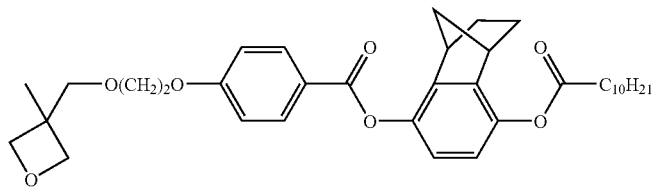
1-A-16
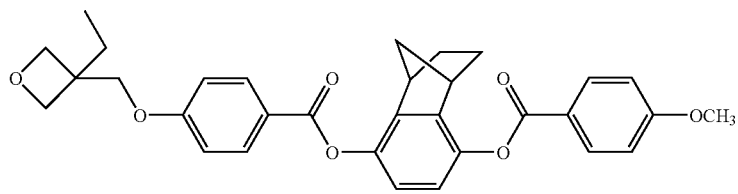
1-A-17
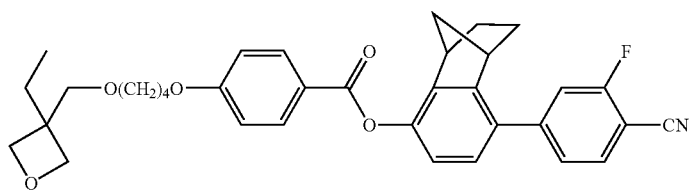
1-A-18
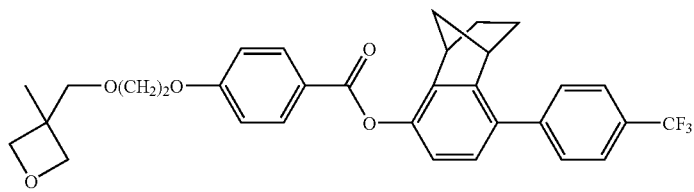
1-A-19
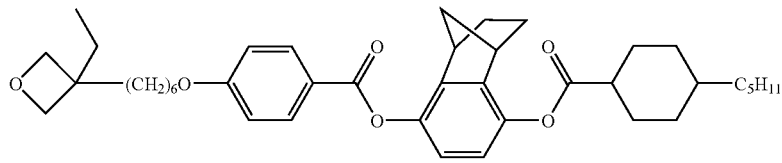
1-A-20
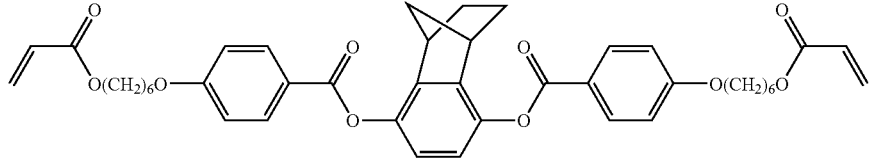
1-B-1
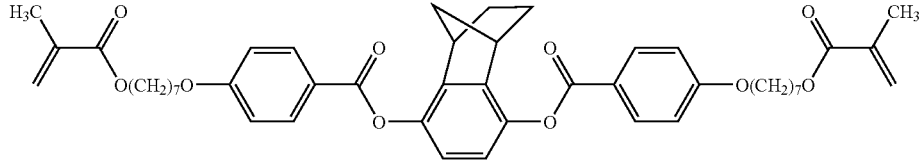
1-B-2
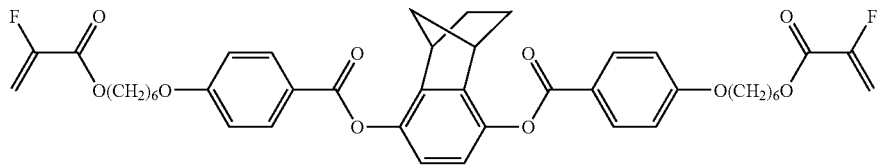
1-B-3

-continued
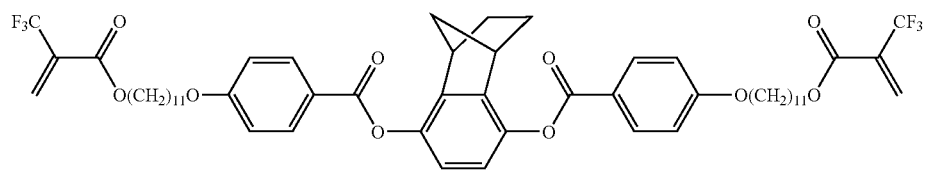
1-B-4
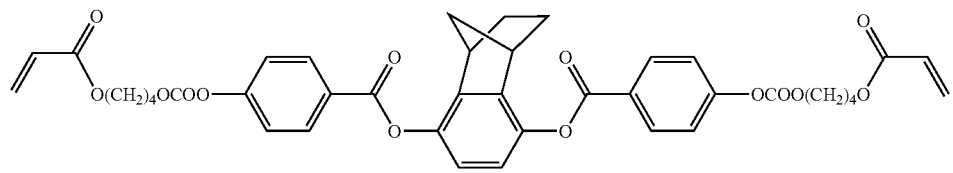
1-B-5
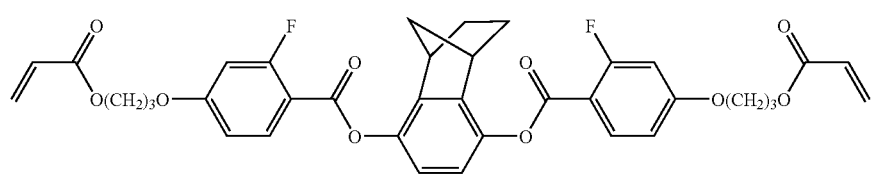
1-B-6
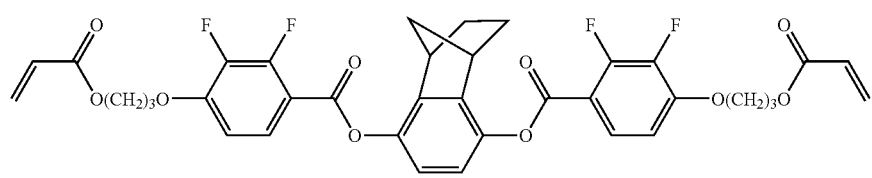
1-B-7
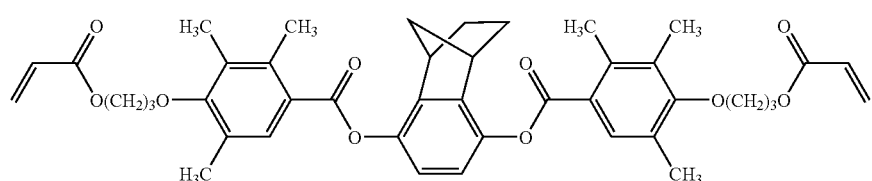
1-B-8
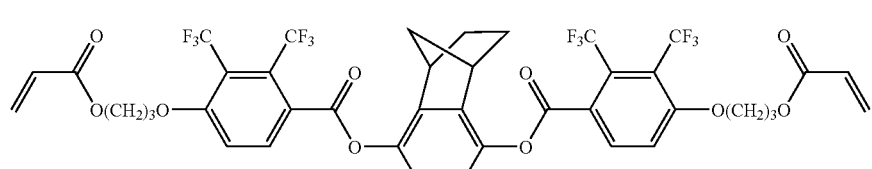
1-B-9
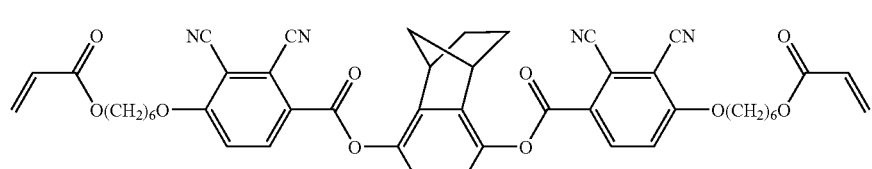
1-B-10
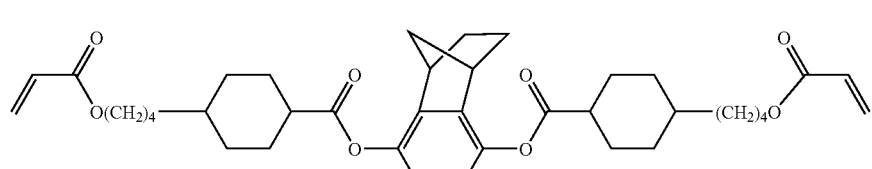
1-B-11
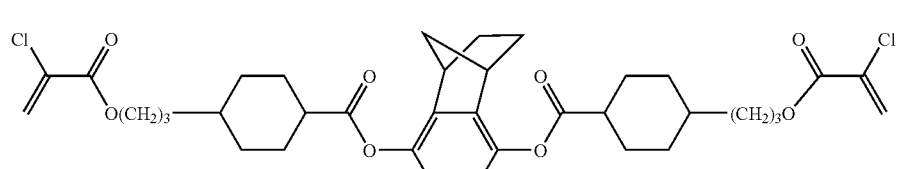
1-B-12

-continued
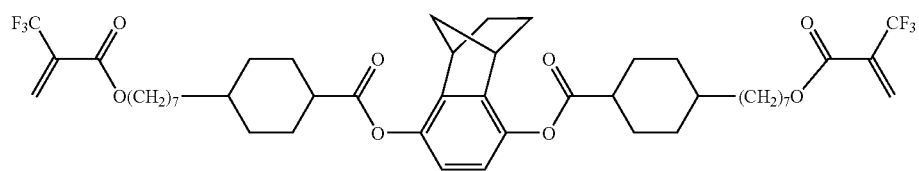
1-B-13
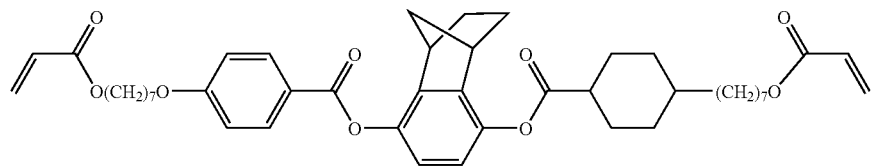
1-B-14
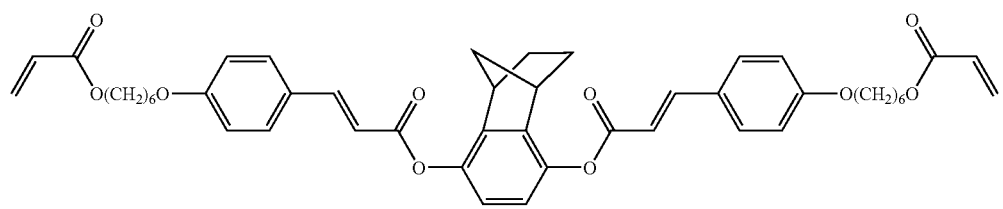
1-B-15
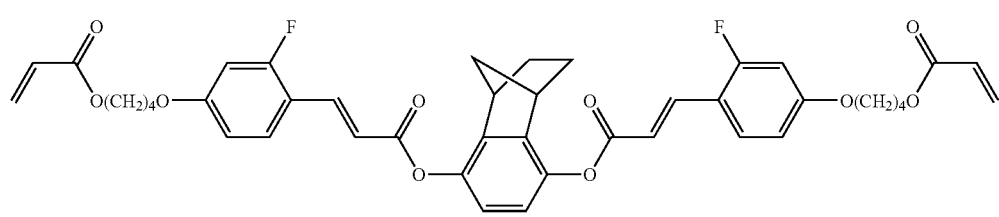
1-B-16
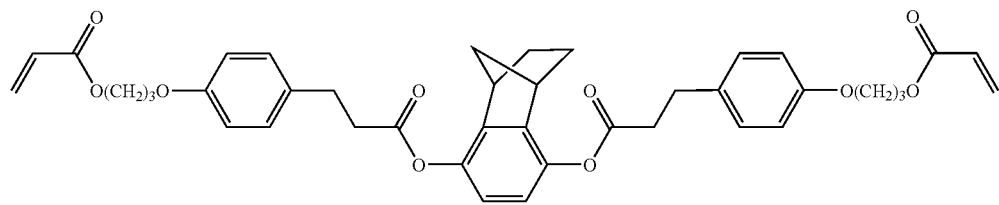
1-B-17
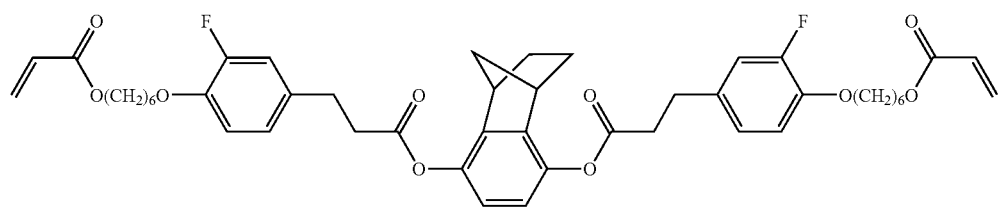
1-B-18
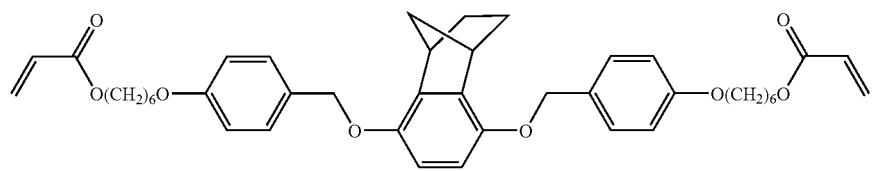
1-B-19
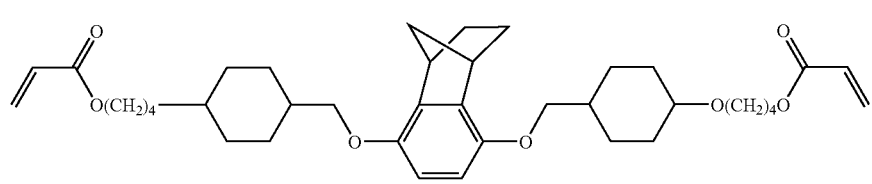
1-B-20

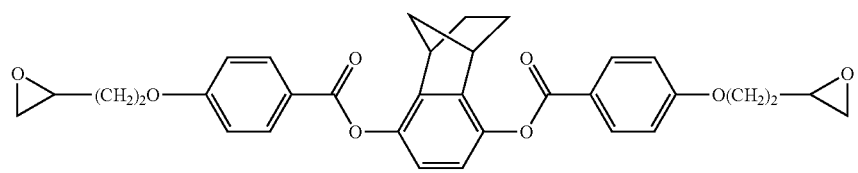
1-B-21
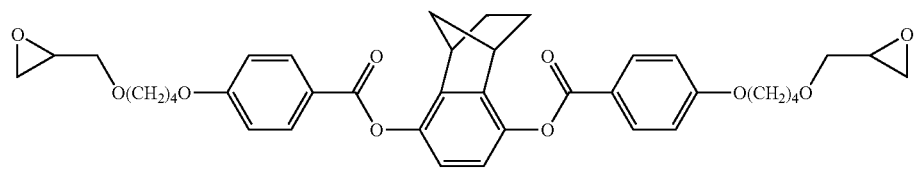
1-B-22
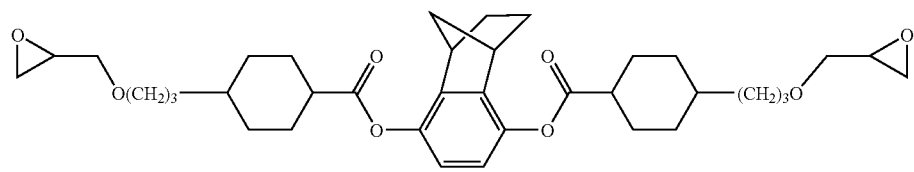
1-B-23
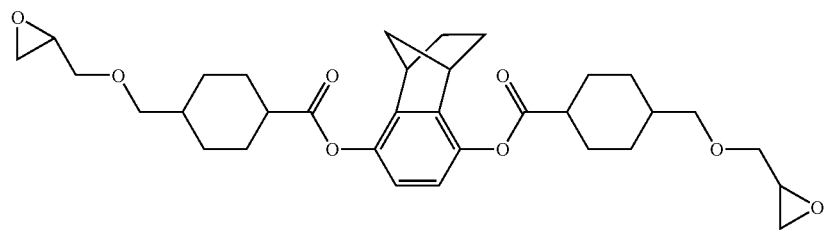
1-B-24
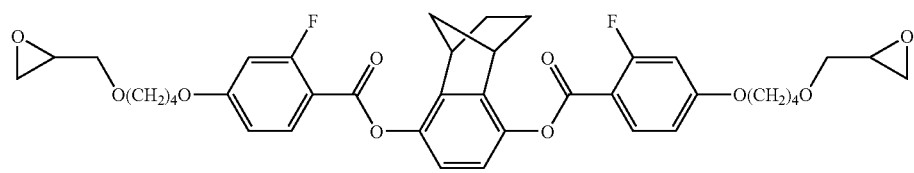
1-B-25
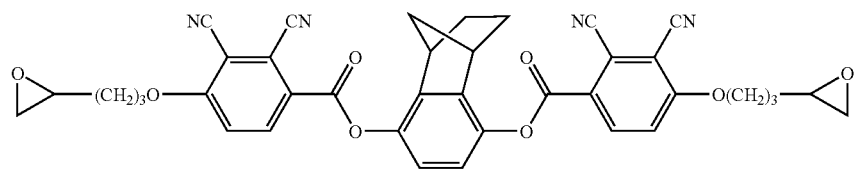
1-B-26
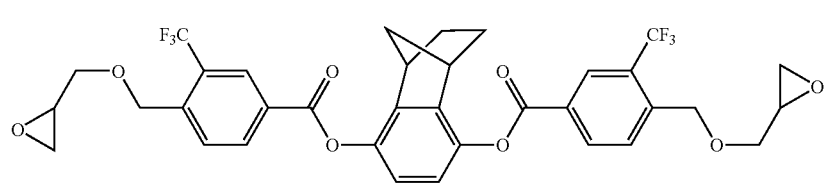
1-B-27
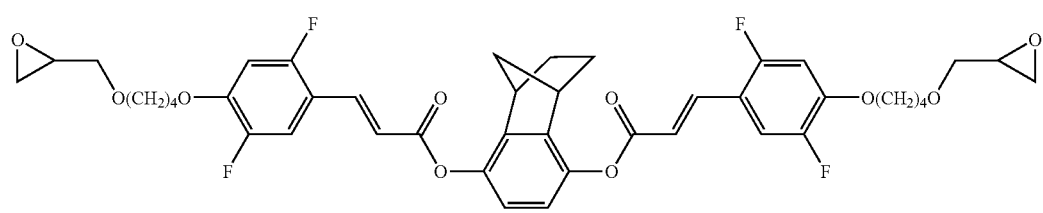
1-B-28

-continued
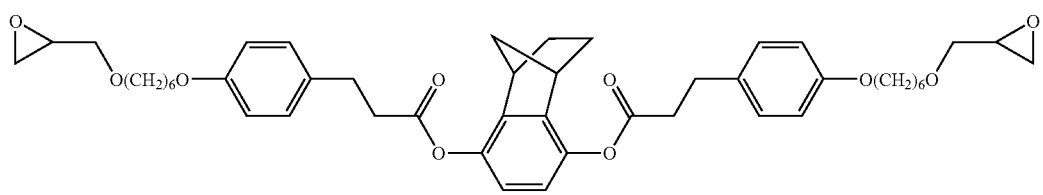
1-B-29
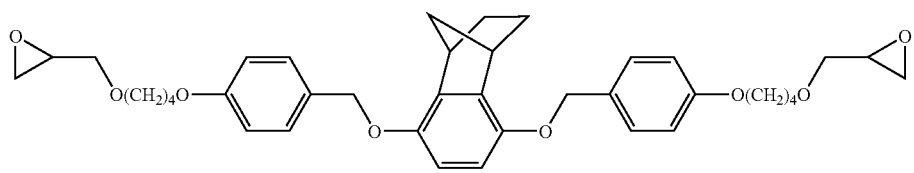
1-B-30
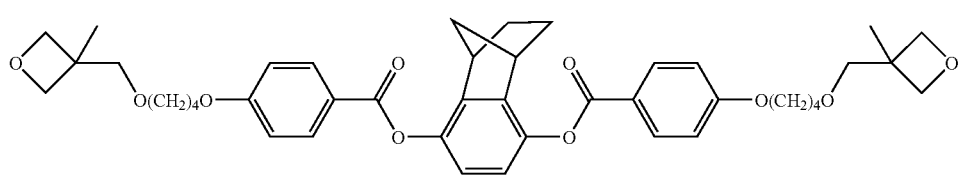
1-B-31
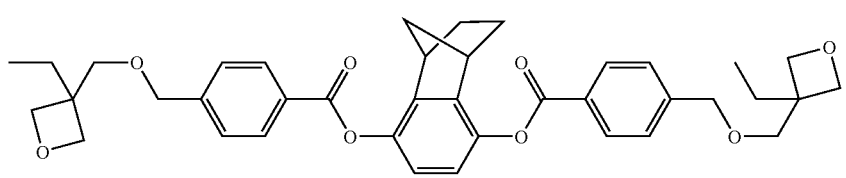
1-B-32
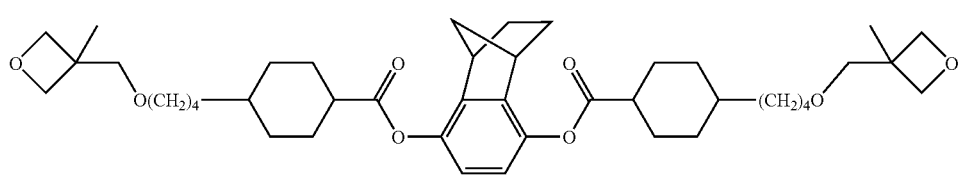
1-B-33
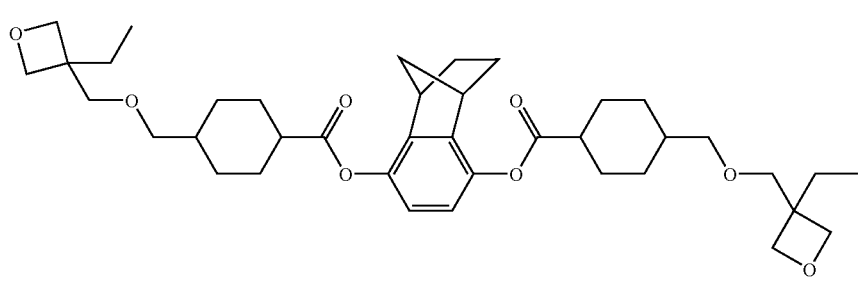
1-B-34
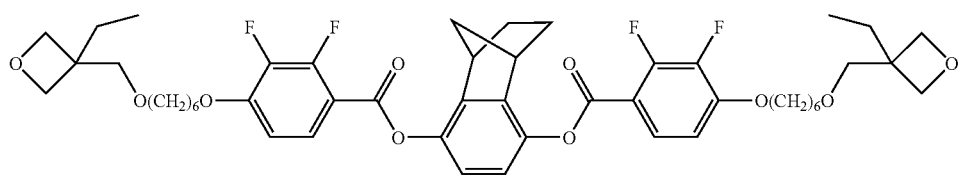
1-B-35
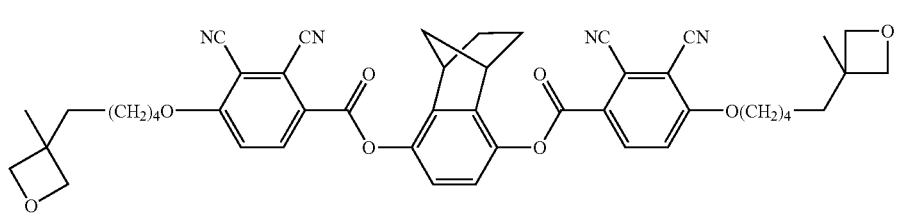
1-B-36

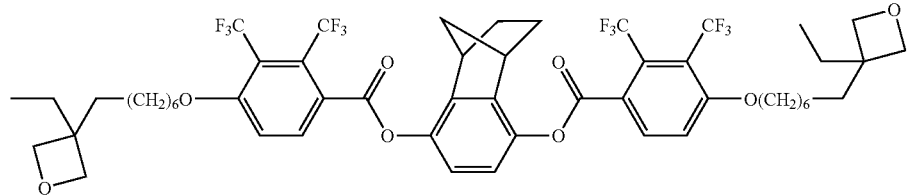

1-B-37

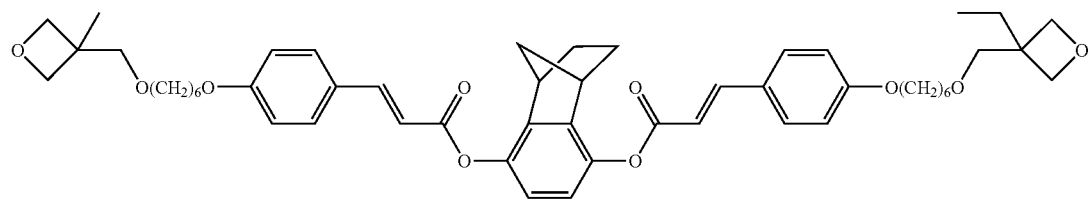

1-B-38

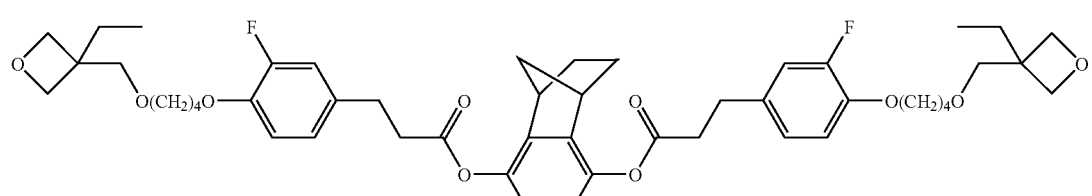

1-B-39

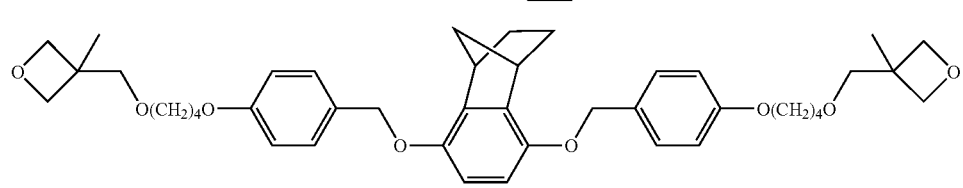

1-B-40

The composition (1) of the invention has good properties, such as coating property. In a first embodiment, the composition (1) contains one compound selected from the compounds (1). A homopolymer is obtained by polymerizing the composition. In a second embodiment, the composition (1) contains at least two compounds selected from the compounds (1). A copolymer is obtained by polymerizing the composition. These compositions may further contain additives. In a third embodiment, the composition (1) contains at least one compound selected from the compounds (1), and an additional polymerizable compound. The additional polymerizable compound is a compound having a polymerizable group but is different from the compound (1). A copolymer is obtained by polymerizing the composition. The composition (1) of the invention may further contain a liquid crystal compound, an optically active compound, a polymerization initiator, a solvent, a surfactant, an organic silicon compound, a chain transfer agent and other additives. These additional compounds are described below in the order of an additional polymerizable compound, a liquid crystal compound, an optically active compound, a polymerization initiator, a solvent, a surfactant, an organic silicon compound, a chain transfer agent and other additives.

The composition (1) may contain an additional polymerizable compound. The additional polymerizable compound is preferably such a compound that does not decrease the film forming property and the mechanical strength. The additional polymerizable compound is classified into a compound having liquid crystallinity and a compound having no liquid crystallinity.

The additional polymerizable compound having liquid crystallinity is preferred for controlling the temperature range of a liquid crystal phase, the optical anisotropy, the coating property and the like of the composition (1). Examples of the compound include liquid crystal compounds that have such a functional group as an acryloyloxy group, a methacryloyloxy group, a fumaroyloxy group, a maleimidyl group, an oxirane ring, an oxetane ring or the like, and are different from the compound (1).

For maintaining the properties of the polymer of the invention and for exhibiting the aforementioned properties of the copolymer, the polymer preferably contains a constitutional unit derived from the compound other than the compound (1) in a ratio of from 10 to 99% by weight, and more preferably from 15 to 97% by weight. The ratios of the constitutional unit having liquid crystallinity and the constitutional unit having no liquid crystallinity may vary freely within the aforementioned range, the total amount thereof may be within the range, and only one of them may be contained.

Preferred examples of the additional polymerizable compound having liquid crystallinity include compounds represented by the formulae (M1), (M2-1), (M2-2), (M3) and (M4).

(M1)

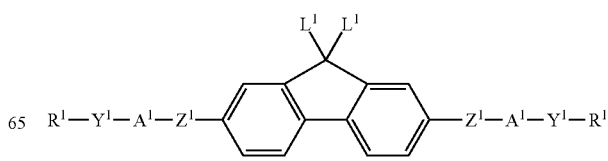

(M2-1)

R¹—Y¹—A¹—Z¹—[ring with L² L²]—Z¹—A¹—Y¹—R¹

(M2-2)

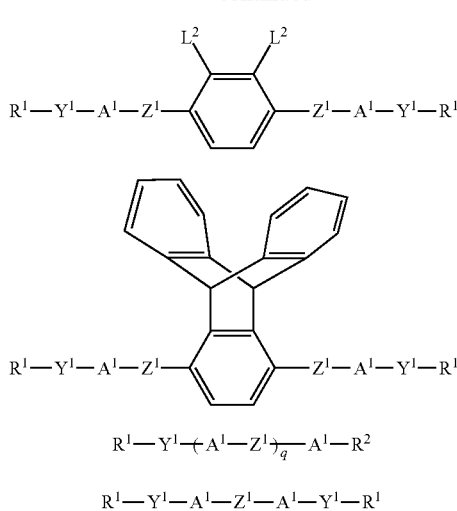

R¹—Y¹—A¹—Z¹—[triptycene]—Z¹—A¹—Y¹—R¹

(M3)

R¹—Y¹—(A¹—Z¹)$_q$—A¹—R²

(M4)

R¹—Y¹—A¹—Z¹—A¹—Y¹—R¹

In the formulae (M1), (M2-1), (M2-2), (M3) and (M4), $R^1$ independently represents a group represented by one of the formulae (p-4) to (p-6).

(p-4)

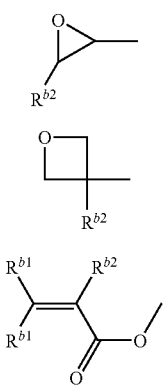

(p-5)

(p-6)

wherein $R^{b1}$ and $R^{b2}$ independently represent hydrogen, halogen, alkyl having from 1 to 5 carbon atoms or halogenated alkyl having from 1 to 5 carbon atoms. Preferred examples of $R^{b1}$ include hydrogen, and preferred examples of $R^{b2}$ include hydrogen, methyl and ethyl.

In the formula (M3), $R^2$ represents alkyl having from 1 to 10 carbon atoms, alkoxy having from 1 to 10 carbon atoms, chlorine, fluorine, cyano, —$CF_3$ or —$OCF_3$. Preferred examples of $R^2$ include alkyl having from 1 to 5 carbon atoms, alkoxy having from 1 to 5 carbon atoms, chlorine, fluorine, cyano, —$CF_3$ and —$OCF_3$. More preferred examples of $R^2$ include alkyl having from 1 to 5 carbon atoms, alkoxy having from 1 to 5 carbon atoms, fluorine, cyano and —$OCF_3$.

In the formulae (M1), (M2-1), (M2-2), (M3) and (M4), $A^1$ independently represents 1,4-cyclohexylene or 1,4-phenylene; in which arbitrary hydrogen in the 1,4-phenylene may be replaced by fluorine. Preferred examples of $A^1$ include 1,4-cyclohexylene, 1,4-phenylene, monofluoro-1,4-phenylene and difluoro-1,4-phenylene.

In the formulae (M1), (M2-1), (M2-2), (M3) and (M4), $Z^1$ independently represents a single bond, —$CH_2CH_2$—, —$CH_2O$—, —$OCH_2$—, —COO—, —OCO—, —CH=CH—, —C≡C—, —CH=CHCOO—, —OCOCH=CH—, —$(CH_2)_2COO$— or —$OCO(CH_2)_2$—. Preferred examples of $Z^1$ include a single bond, —$CH_2O$—, —$OCH_2$—, —COO—, —OCO—, —C≡C—, —CH=CHCOO—, —OCOCH=CH—, —$(CH_2)_2COO$— and —$OCO(CH_2)_2$—. More preferred examples of $Z^1$ include a single bond, —COO—, —OCO—, —CH=CHCOO—, —OCOCH=CH—, —$(CH_2)_2COO$— and —$OCO(CH_2)_2$—.

In the formulae (M1), (M2-1), (M2-2), (M3) and (M4), $Y^1$ independently represents a single bond or alkylene having from 1 to 20 carbon atoms; in which arbitrary —$CH_2$— in the alkylene may be replaced by —O—, —CO—, —COO—, —OCO—, —OCOO— or —CH=CH—. Preferred examples of $Y^1$ include a single bond and alkylene having from 1 to 10 carbon atoms; in which arbitrary —$CH_2$— in the alkylene may be replaced by —O—, —COO—, —OCO— or —OCOO—. More preferred examples of $Y^1$ include a single bond and alkylene having from 1 to 10 carbon atoms; in which in the alkylene, —$CH_2$— adjacent to the ring may be replaced by —O—, —COO—, —OCO— or —OCOO—.

In the formula (M1), $L^1$ independently represents hydrogen, fluorine or —$CH_3$. In the formula (M2-1), $L^2$ independently represents hydrogen, chlorine, fluorine, —$CH_3$ or —$CF_3$. Preferred examples of $L^1$ include hydrogen and —$CH_3$. Preferred examples of $L^2$ include hydrogen, fluorine, —$CH_3$ and —$CF_3$.

In the formula (M3), q represents 1 or 2, and preferably 2.

The compounds (M1), (M2-1), (M2-2) and (M4) exhibit a wide temperature range of a liquid crystal phase and have two polymerizable groups in the molecular structure thereof, and thus a three-dimensional structure is formed to enable formation of a polymer having high mechanical strength. In particular, the compound (M2-2) has a large internal free volume owing to the triptycene ring in the structure, and the combination use of the compound (M2-2) with the compound (1) lowers the birefringence. The compound (M3) is a monofunctional compound capable of introducing a substituent, such as a polar group, on the opposite side of the polymerizable group in the molecular long axis, thereby controlling the alignment in the liquid crystal state. In all the compounds (M1), (M2-1), (M2-2), (M3) and (M4), in the case where the ring structure $A^1$ is 1,4-phenylene, a composition having a large optical anisotropy Δn can be prepared, and in the case where the ring structure $A^1$ is 1,4-cyclohexylene, a composition having a low optical anisotropy Δn can be prepared.

Preferred examples of the compounds (M1), (M2-1), (M2-2), (M3) and (M4) include the following compounds (M1-1) to (M1-8), (M2-1-1) to (M2-1-12), (M2-2-1) to (M2-2-4), (M3-1) to (M3-42) and (M4-1) to (M4-5).

In the following compounds, $Y^1$ has the same meaning as $Y^1$ in the formulae (M1), (M2-1), (M2-2), (M3) and (M4), and $R^3$ represents a group represented by one of the following formulae (2-4-1), (2-5-1), (2-5-2) and (2-6-1).

(2-4-1)

(2-5-1)

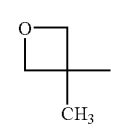

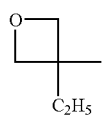 (2-5-2)
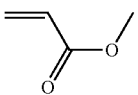 (2-6-1)
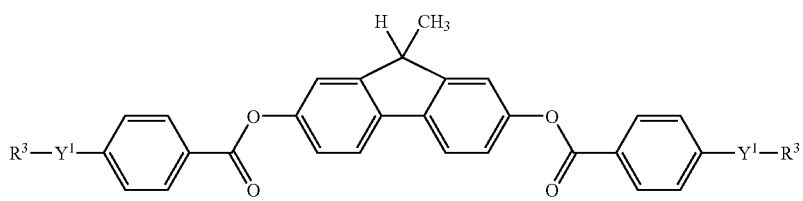 (M1-1)
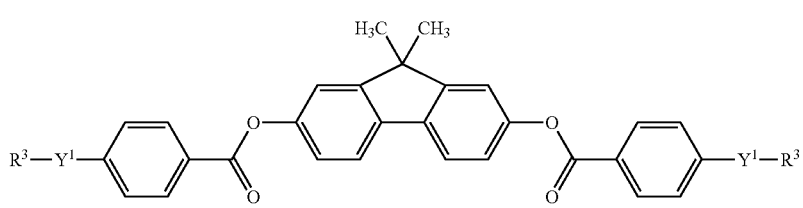 (M1-2)
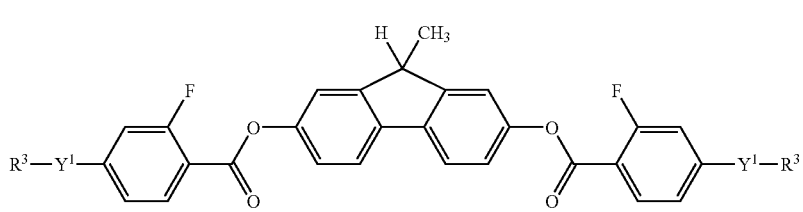 (M1-3)
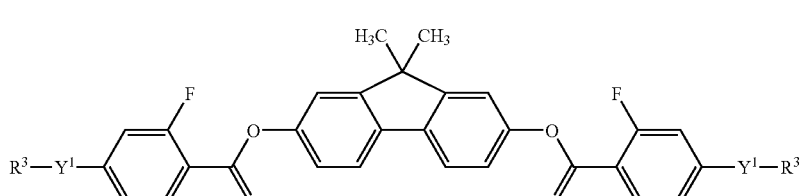 (M1-4)
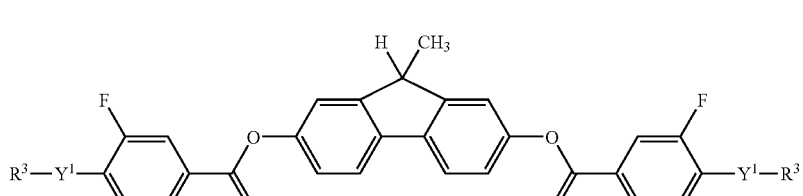 (M1-5)
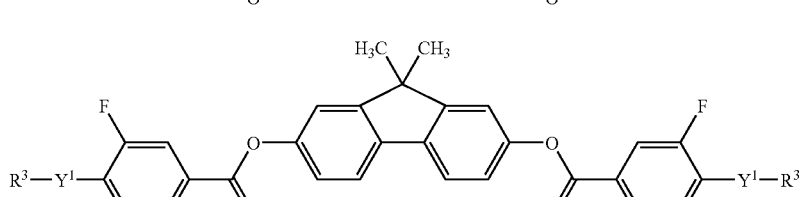 (M1-6)
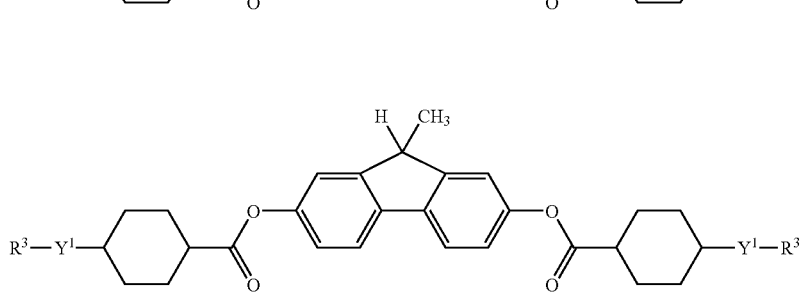 (M1-7)

-continued
(M1-8)
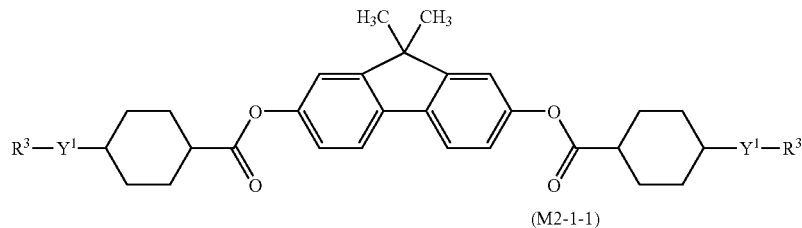
(M2-1-1)
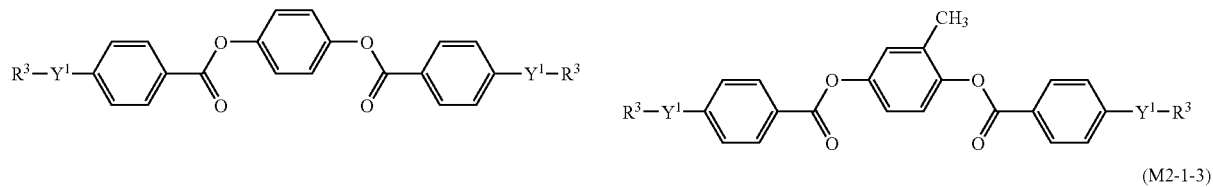
(M2-1-2)
(M2-1-3)
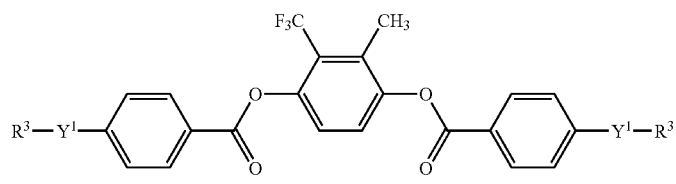
(M2-1-4)
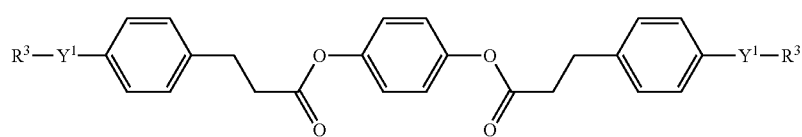
(M2-1-5)
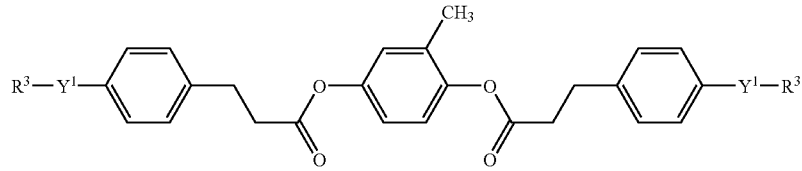
(M2-1-6)
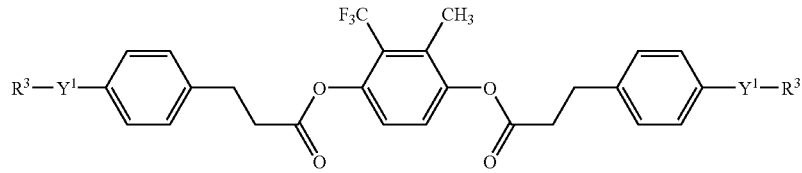
(M2-1-7)
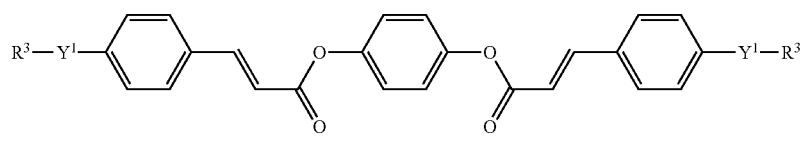
(M2-1-8)
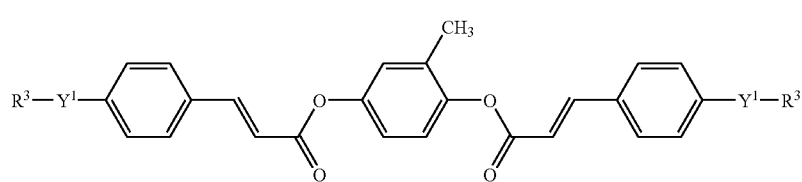
(M2-1-9)
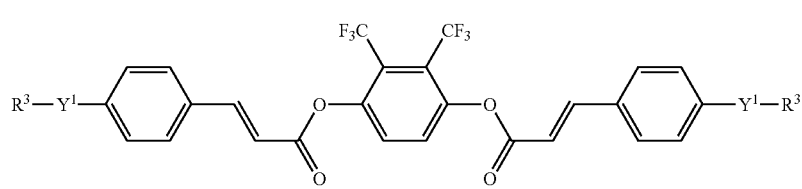

-continued
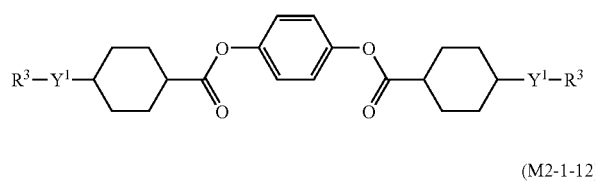
(M2-1-10)
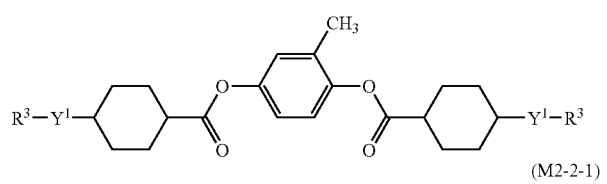
(M2-1-11)
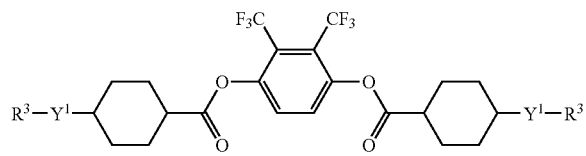
(M2-1-12)
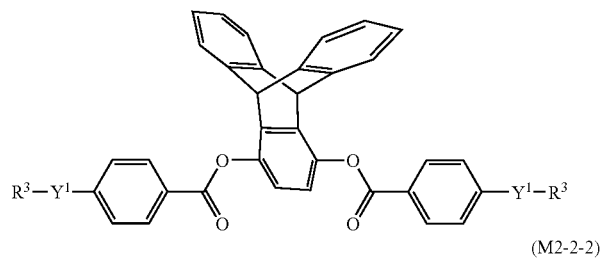
(M2-2-1)
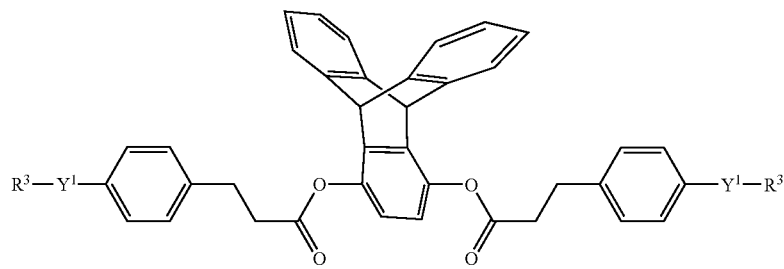
(M2-2-2)
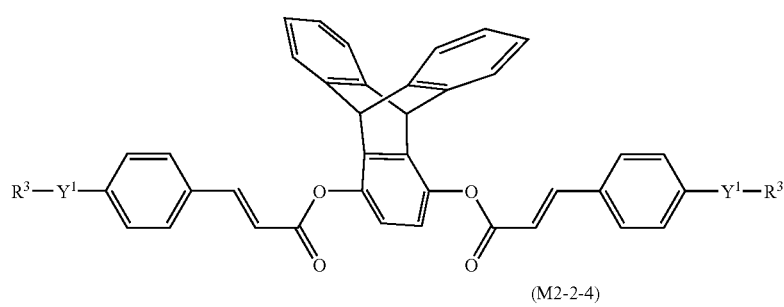
(M2-2-3)
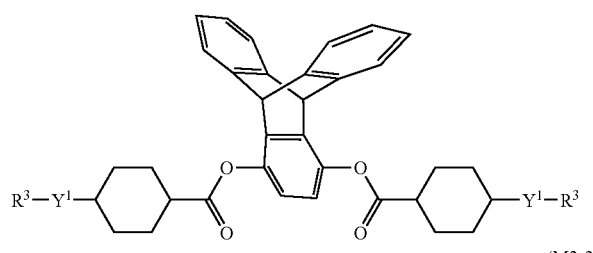
(M2-2-4)
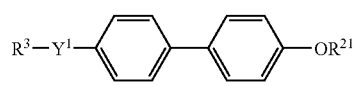
(M3-1)
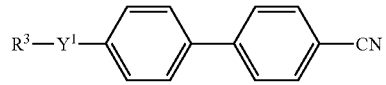
(M3-2)
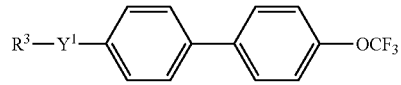
(M3-3)
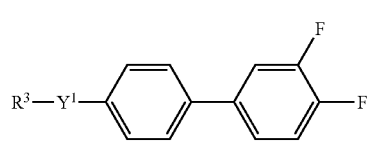
(M3-4)
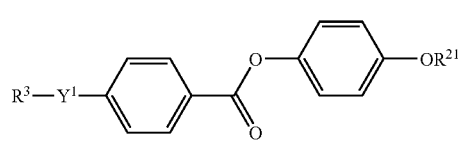
(M3-5)
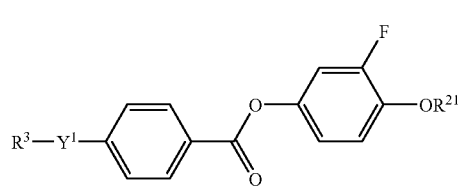
(M3-6)
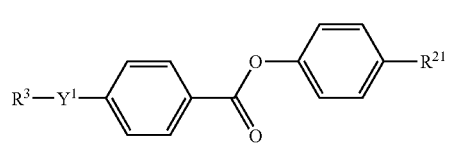
(M3-7)

-continued
(M3-8)
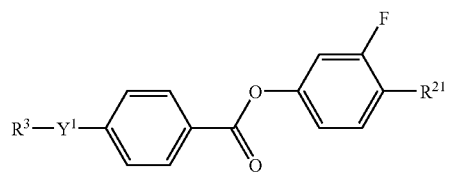
(M3-9)
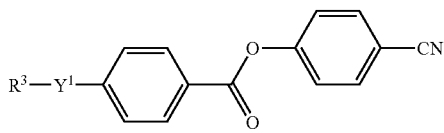
(M3-10)
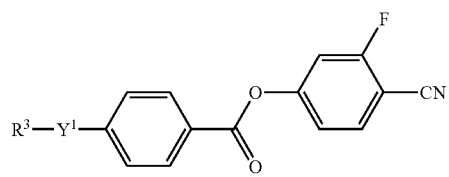
(M3-11)
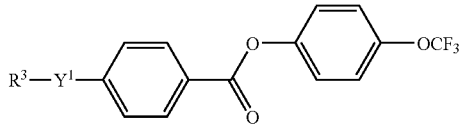
(M3-12)
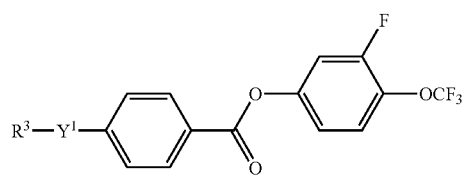
(M3-13)
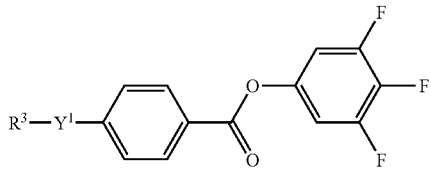
(M3-14)
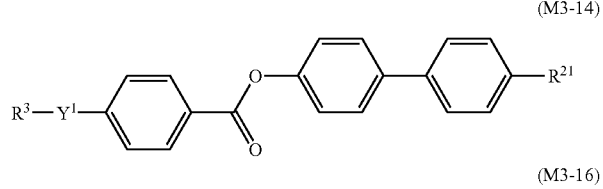
(M3-15)
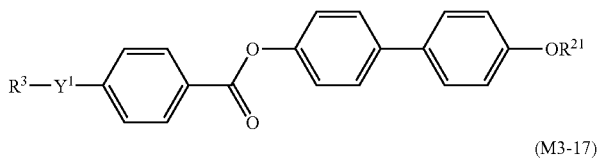
(M3-16)
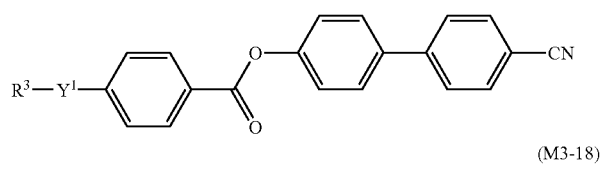
(M3-17)
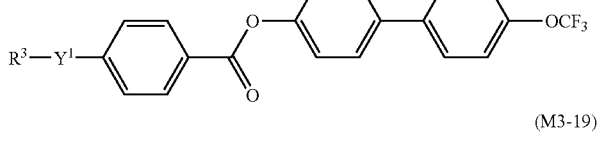
(M3-18)
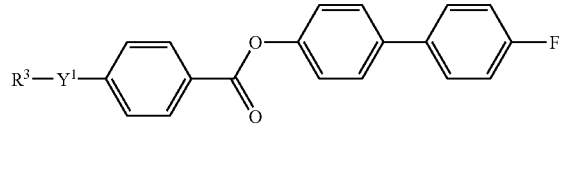
(M3-19)
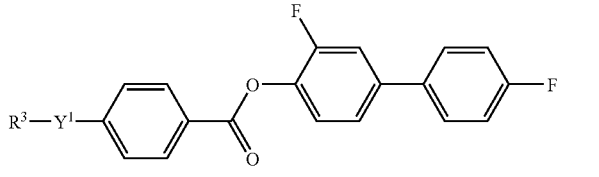
(M3-20)
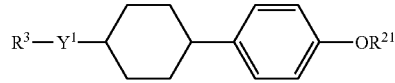
(M3-21)
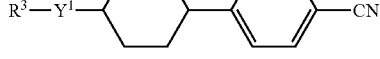
(M3-22)
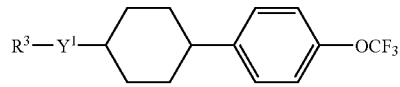
(M3-23)
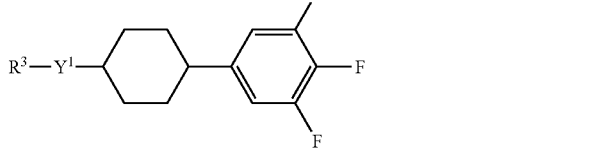
(M3-24)
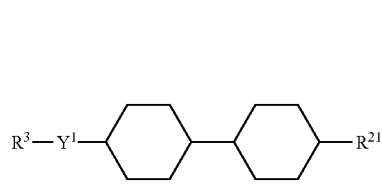
(M3-25)
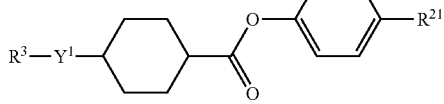
(M3-26)
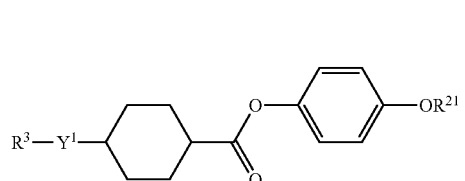
(M3-27)
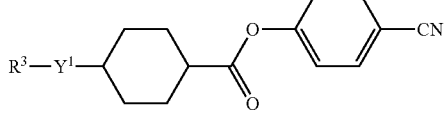

-continued
(M3-28) 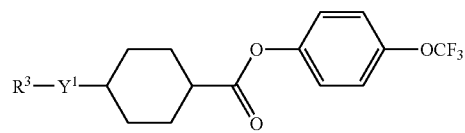
(M3-29) 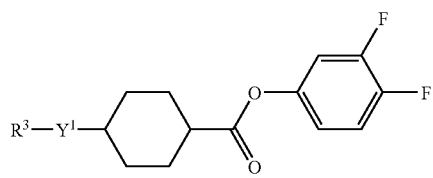
(M3-30) 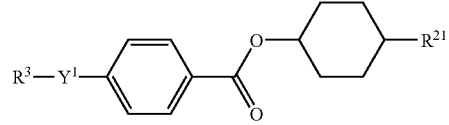
(M3-31) 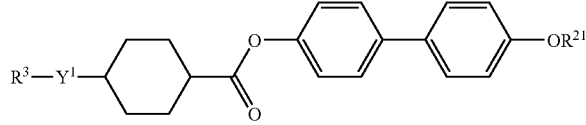
(M3-32) 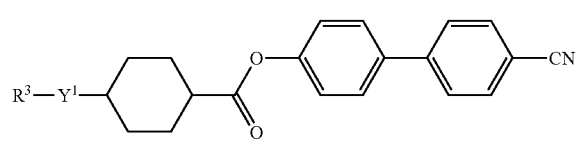
(M3-33) 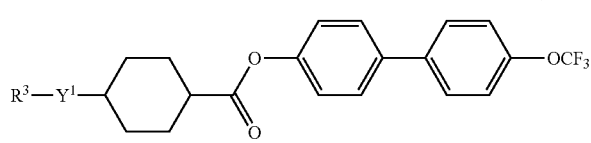
(M3-34) 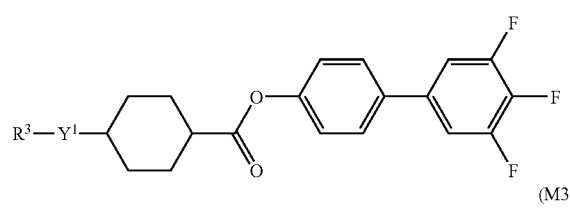
(M3-35) 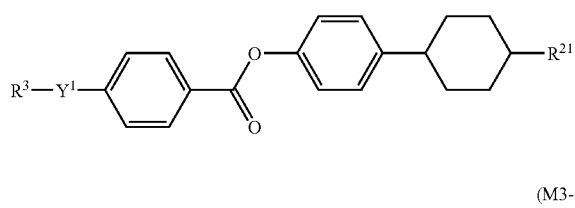
(M3-36) 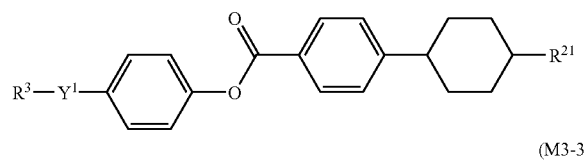
(M3-37) 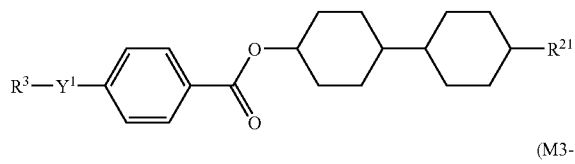
(M3-38) 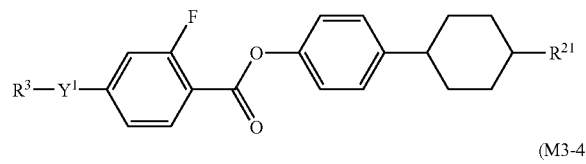
(M3-39) 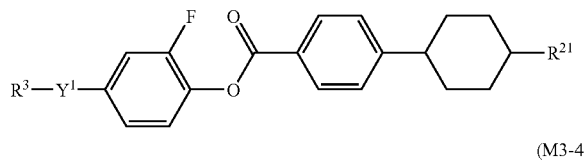
(M3-40) 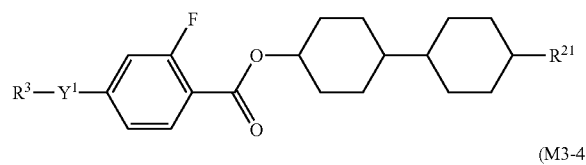
(M3-41) 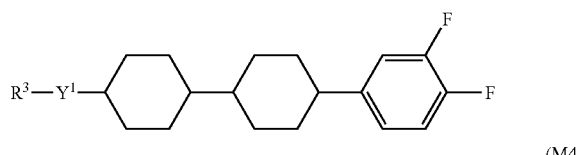
(M3-42) 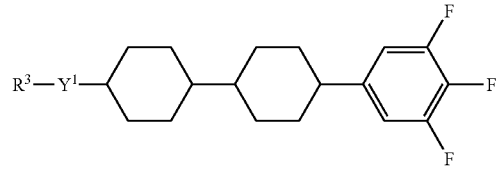
(M4-1) 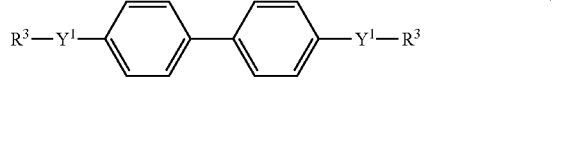
(M4-2) 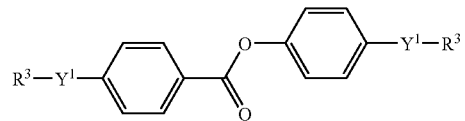
(M4-3) 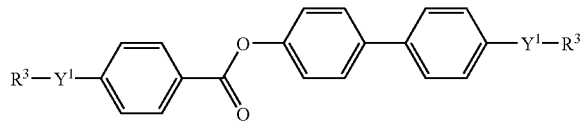
(M4-4) 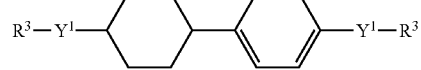
(M4-5)

Among the aforementioned preferred examples of the compounds (M1), (M2-1), (M2-2), (M3) and (M4), the compounds, wherein $R^3$ represents a group represented by the formula (2-6-1), and $Y^1$ represents alkyl having from 3 to 6 carbon atoms or alkoxy having from 3 to 6 carbon atoms, are more preferred.

Examples of the additional polymerizable compound having no liquid crystallinity include a vinyl derivative, a styrene derivative, a (meth)acrylic acid derivative, an oxirane derivative, an oxetane derivative, a sorbic acid derivative, a fumaric acid derivative and an itaconic acid derivative. These compounds are suitable for controlling the viscosity and the alignment of the composition, and have a large effect of making uniform the thickness of the coated film upon coating the composition. The additional polymerizable compound having no liquid crystallinity includes a compound having one polymerizable group, and a polyfunctional compound including a compound having two polymerizable group and a compound having three or more polymerizable groups.

Examples of the compound having one polymerizable group include the compounds disclosed in the paragraph 0097 of JP-A-2008-266632. These compounds are suitable for controlling the viscosity, the melting point and the like of the composition.

Examples of the compound having two or more polymerizable groups include the compounds disclosed in the paragraph 0098 of JP-A-2008-266632.

An epoxy acrylate resin may be used. Specific examples thereof include a phenol novolac epoxy acrylate resin, a cresol novolac epoxy acrylate resin, a phenol novolac acid-modified epoxy acrylate resin, a cresol novolac acid-modified epoxy acrylate resin and a trisphenolmethane acid-modified epoxy acrylate resin.

Various kinds of epoxy resin may be used in combination, and examples thereof include an epoxy resin derived from a divalent phenol compound, such as a bisphenol A epoxy resin, a bisphenol F epoxy resin, a bisphenol S epoxy resin, a bisphenol AD epoxy resin, a resorcin epoxy resin, a hydroquinone epoxy resin, a catechol epoxy resin, a dihydroxynaphthalene epoxy resin, a biphenyl epoxy resin and a tetramethylbiphenyl epoxy resin, an epoxy resin derived from a trivalent or higher phenol compound, such as a phenol novolac epoxy resin, a cresol novolac epoxy resin, a triphenylmethane epoxy resin, a tetraphenylethane epoxy resin, a dichloropentadiene-phenol-modified epoxy resin, a phenol aralkyl epoxy resin, a biphenyl aralkyl epoxy resin, a naphthol novolac epoxy resin, a naphthol aralkyl epoxy resin, a naphthol-phenol co-condensed novolac epoxy resin, a naphthol-cresol co-condensed novolac epoxy resin, an aromatic hydrocarbon formaldehyde resin-modified phenol resin type epoxy resin and a biphenyl-modified novolac epoxy resin, a tetrabromobisphenol A epoxy resin, a brominated phenol novolac epoxy resin, a polycarboxylic acid polyglycidyl ester, a polyol polyglycidyl ester, an aliphatic epoxy resin, an alicyclic epoxy resin, a glycidylamine epoxy resin, a triphenolmethane epoxy resin and a dihydroxybenzene epoxy resin, but the invention is not limited to these examples. The epoxy resins may be used solely or as a mixture of two or more kinds thereof.

Specific examples of the epoxy compound include those disclosed in the paragraph 0101 of JP-A-2008-266632. These epoxy compounds are suitable for controlling the mechanical strength of the polymer.

The following polymerizable compounds (N-1) to (N-16) having a bisphenol structure may be used. These compounds are suitable for assisting the film forming capability of the polymer and the alignment uniformity of the polymerizable liquid crystal.

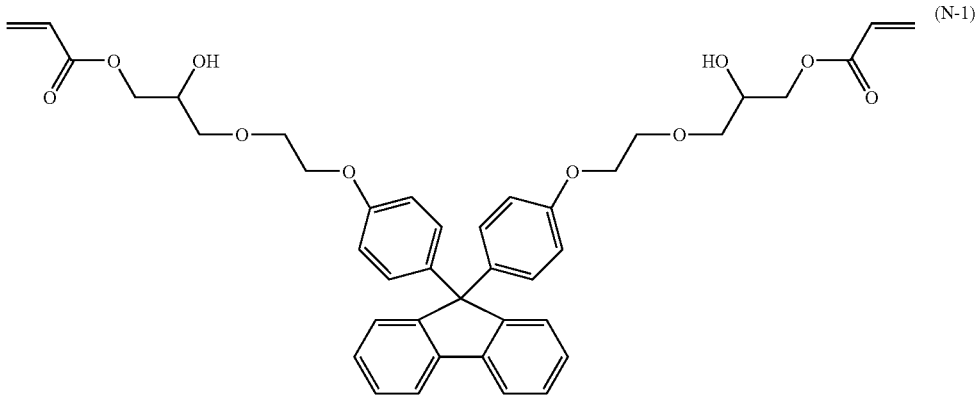

(N-1)

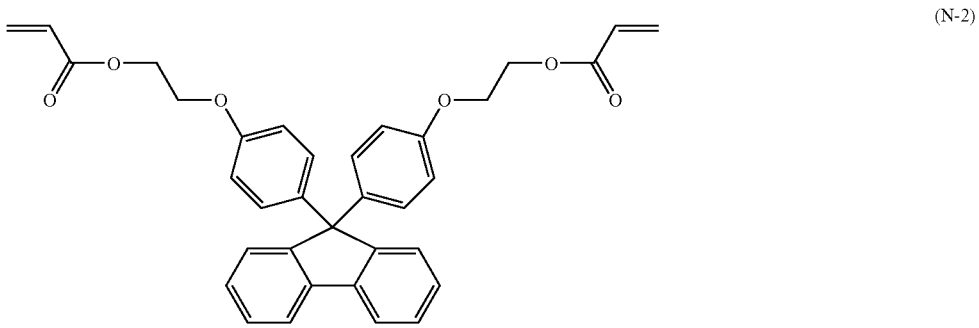

(N-2)

-continued
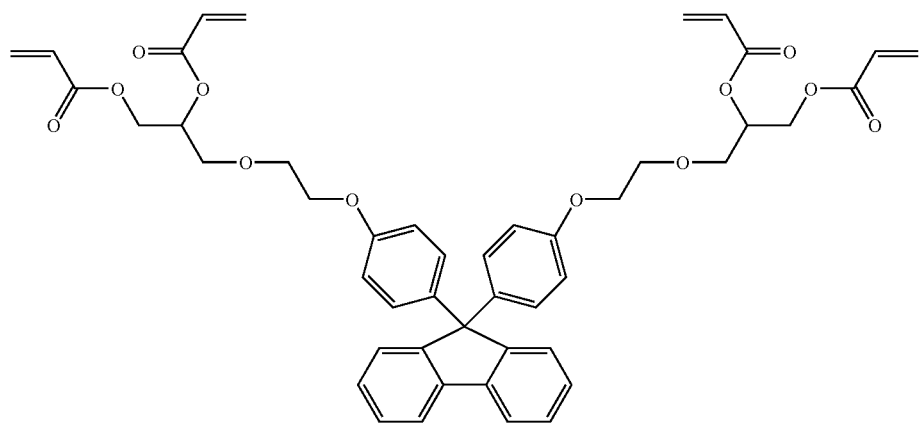
(N-3)
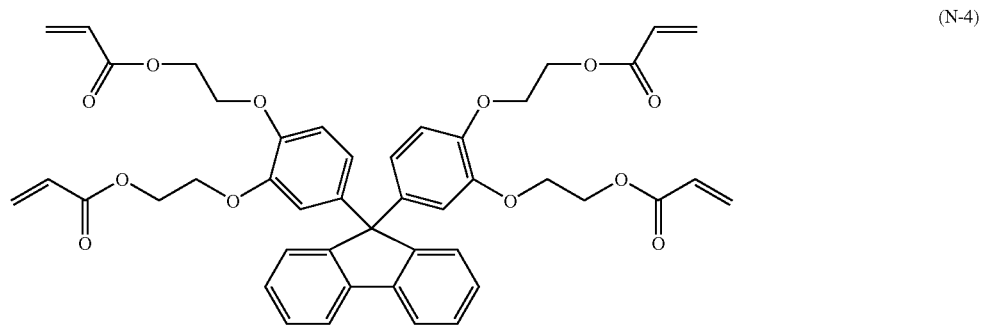
(N-4)
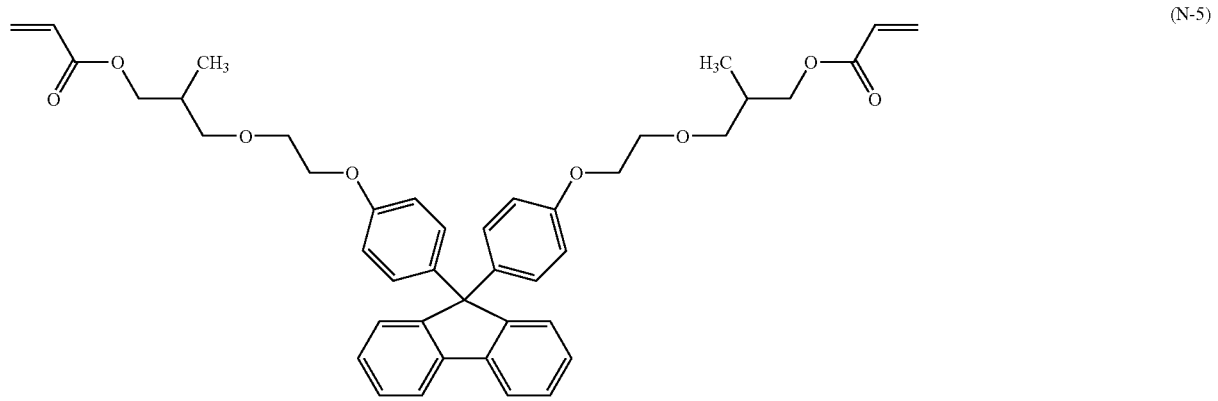
(N-5)
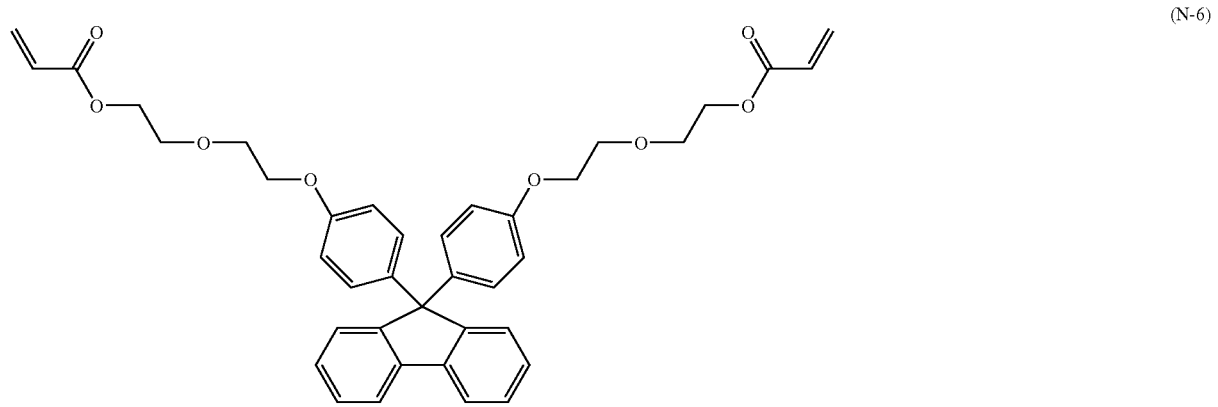
(N-6)

-continued
(N-7)
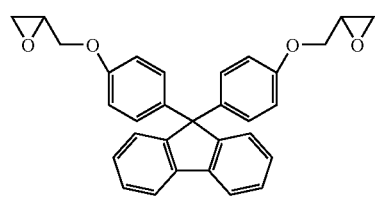
(N-8)
(N-9)
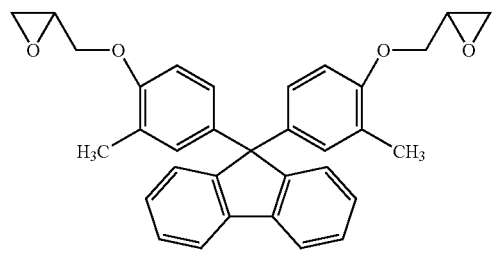
(N-10)
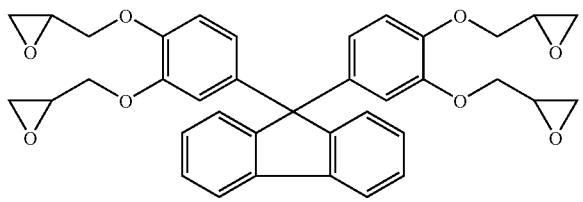
(N-11)
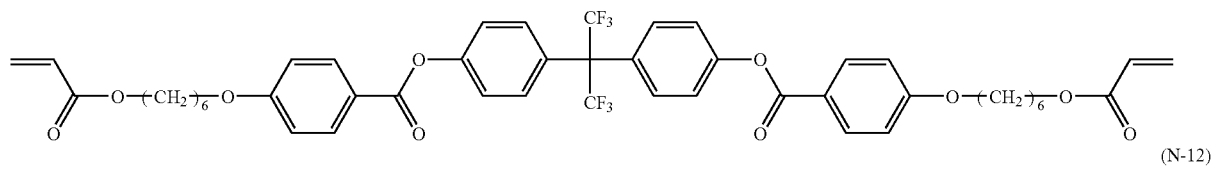
(N-12)
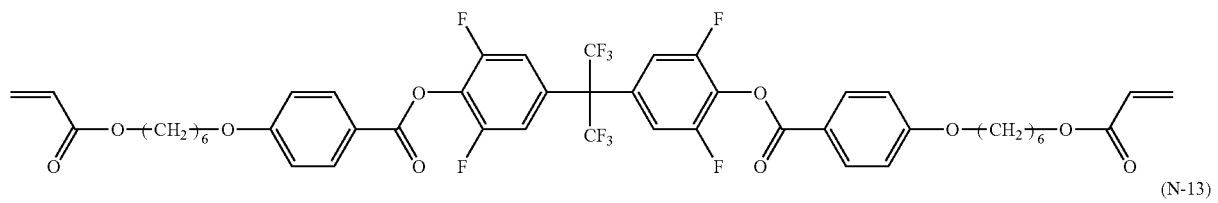
(N-13)
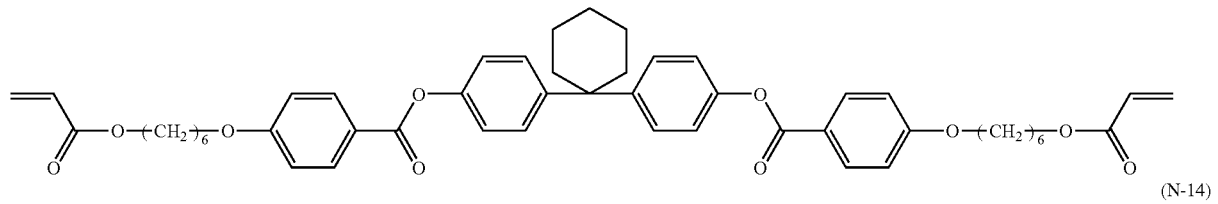
(N-14)
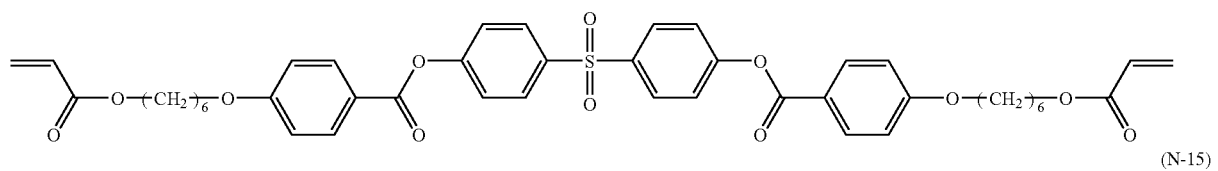
(N-15)
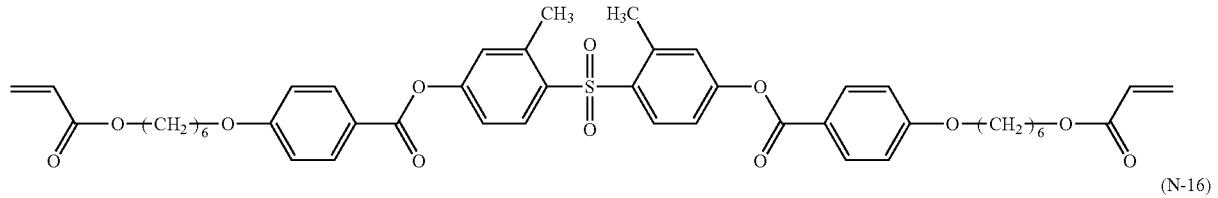
(N-16)
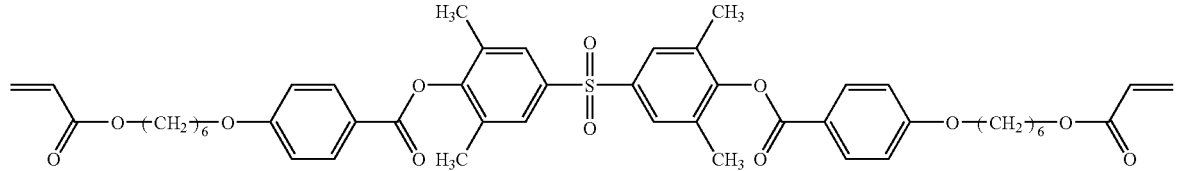

The synthesis methods of the compounds (N-11) to (N-16) are disclosed in JP-A-2007-16213 and JP-A-2008-133344. The compounds (N-1) to (N-16) may be referred to as a compound (N) as a generic term. The amount of the compound (N) in the case where it is added is generally from 0.1 to 25% by weight, and preferably from 1 to 15% by weight, based on the total amount of the composition (excluding the solvent). Plural kinds of the compound (N) may be used.

The composition (1) may contain a liquid crystal compound having no polymerizable group. Examples of the non-polymerizable liquid crystal compound are disclosed in the database of liquid crystal compounds, LiqCryst, LCI Publisher GmbH, Hamburg, Germany, or the like. The compound (1) exhibits good compatibility with another liquid crystal compound. Accordingly, the composition (1) containing a liquid crystal compound can be used as a liquid crystal composition to be charged in a liquid crystal display device. The composition (1) of this kind may further contain an additive, such as a dichroic dye. A composite material of the compound (1) and a liquid crystal compound can be obtained by polymerizing the composition (1) containing the liquid crystal compound.

The composition (1) may contain an optically active compound. The compound containing the optically active compound (1) in a suitable amount or the composition obtained by adding a suitable amount of an optically active compound to the optically inactive compound (1) is coated and polymerized on a substrate having been subjected to an alignment treatment, thereby providing a phase retardation film exhibiting a twisted structure. The twisted structure is fixed through polymerization of the compound (1). The properties of the resulting polymer having optical anisotropy depend on the helical pitch of the resulting twisted structure. The length of the helical pitch can be controlled by the kind and the addition amount of the optically active compound. Only one kind of the optically active compound may be added, and plural kinds of the optically active compounds may be used for canceling the temperature dependencies of the helical pitches.

Selective reflection, which is a characteristic property of a polymer having optical anisotropy, is such a phenomenon that the twisted structure acts on incident light to reflect circularly polarized light or elliptically polarized light. The selective reflection property is expressed by $\lambda = n \cdot \text{Pitch}$ (wherein $\lambda$ represents the center wavelength of selective reflection, n represents the average refractive index, and Pitch represents the helical pitch), and $\lambda$ and the range thereof ($\Delta\lambda$) can be appropriately controlled by n or Pitch. For improving the color purity, $\Delta\lambda$ may be decreased, and for providing reflection in a wide range, $\Delta\lambda$ may be increased. The selective reflection is influenced largely by the thickness of the polymer. For maintaining the color purity, the thickness is necessarily not too small. For maintaining the alignment uniformity, the thickness is necessarily not too large. Accordingly, the thickness is necessarily controlled appropriately, and is preferably from 0.5 to 25 µm, and more preferably from 1 to 10 µm.

The use of the helical pitch that is shorter than the wavelength of visible light provides a negative C plate disclosed in W. H. de Jeu, Physical Properties of Liquid Crystalline Materials, Gordon and Breach, New York (1980). For decreasing the helical pitch, an optically active compound having large helical twisting power (HTP) is used, and the addition amount thereof is increased. Specifically, a negative C plate can be prepared by decreasing $\lambda$ to 350 nm or less, and preferably 200 nm or less. The negative C plate can be used as an optical compensation film that is suitable for such a display device as a VAN type, a VAC type and an OCB type.

The use of the helical pitch that is longer than the wavelength of visible light provides a reflection film having a reflection wavelength range set in the near infrared range (wavelength: 800 to 2,500 nm) disclosed in JP-A-2004-333671. For increasing the helical pitch, an optically active compound having small helical twisting power is used, and the addition amount of the optically active compound is decreased.

As the optically active compound, any optically active compound may be used that induces a helical structure and can be appropriately mixed with the polymerizable liquid crystal composition as the base composition. The optically active compound may be either a polymerizable compound or a non-polymerizable compound, and the optimum compound depending on the purpose may be added. In consideration of heat resistance and solvent resistance, a polymerizable compound is preferably used. Examples of a molecular skeleton, which exhibits the optical activity, include alkylene or alkenylene having at least one asymmetric carbon atom, and those containing the following structures.

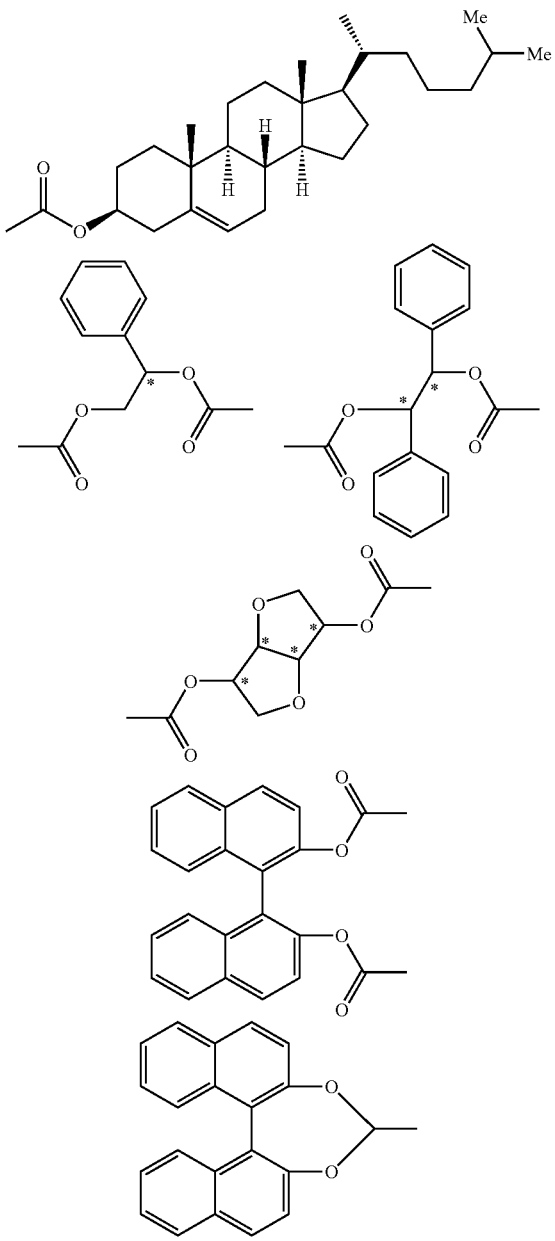

-continued

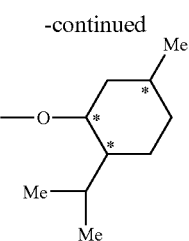

wherein Me represents methyl, and the carbon atom attached with asterisk is an asymmetric carbon atom.

Among optically active compounds containing the skeletons, a compound having large helical twisting power (HTP) is preferred for decreasing the helical pitch. Representative examples of the compound having large HTS are disclosed in GB 2298202 and DE 10221751.

Specific examples of the polymerizable optically active compound are shown below. In the specific examples, n and m independently represent an integer of from 2 to 12, and R represents alkyl having from 1 to 10 carbon atoms.

(OP-1)

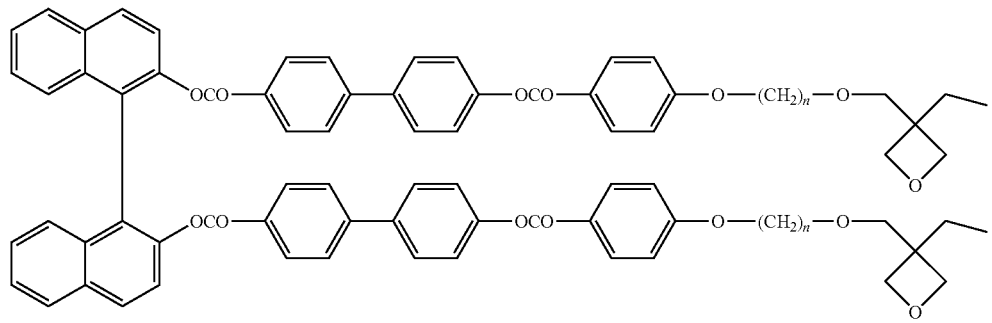

(OP-2)

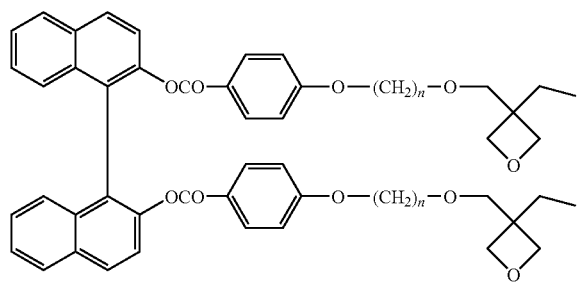

(OP-3)

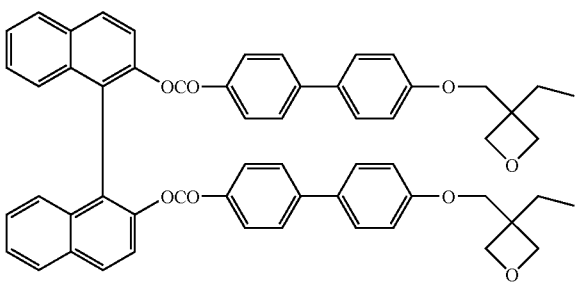

(OP-4)

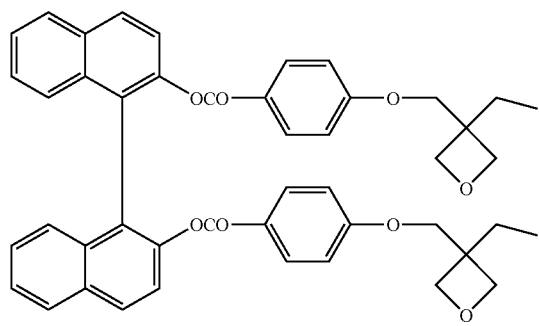

(OP-5)

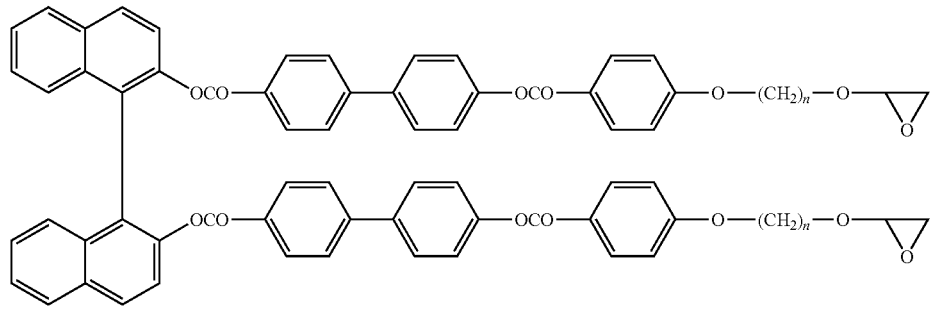

-continued
(OP-6)
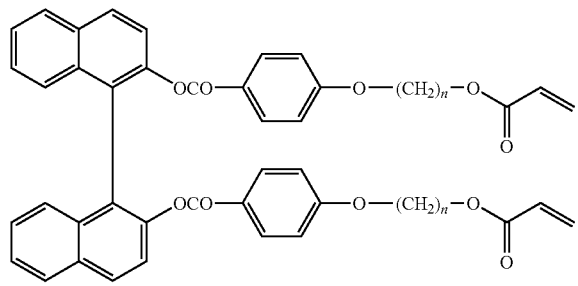
(OP-7)
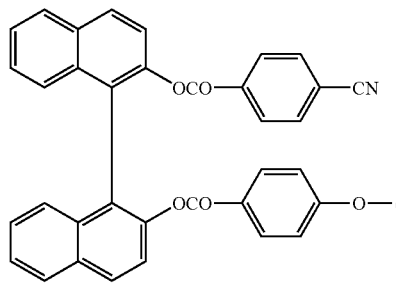
(OP-8)
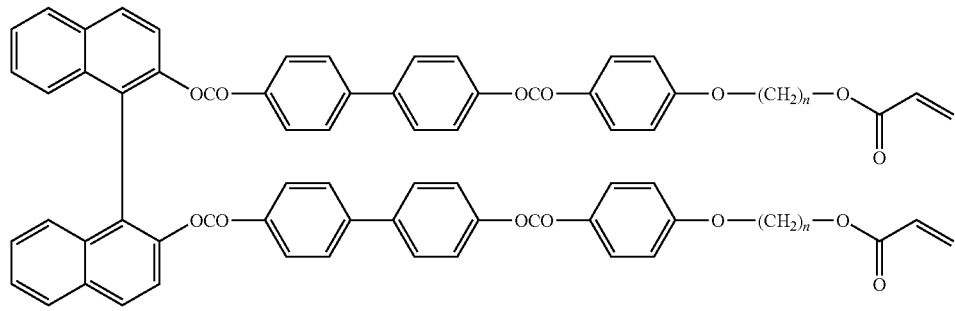
(OP-9)
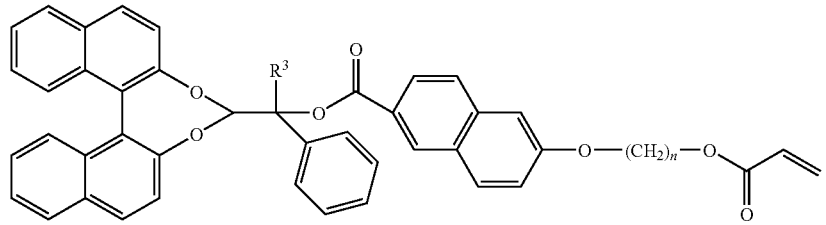
(OP-10)
(OP-11)
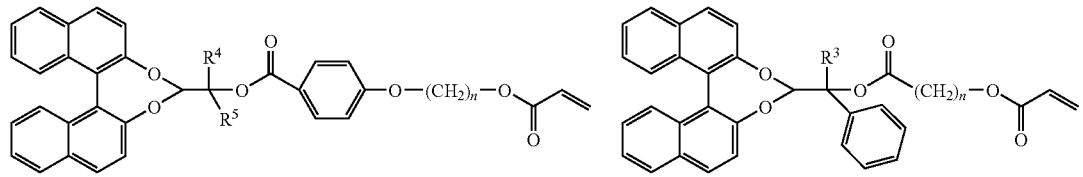
(OP-12)
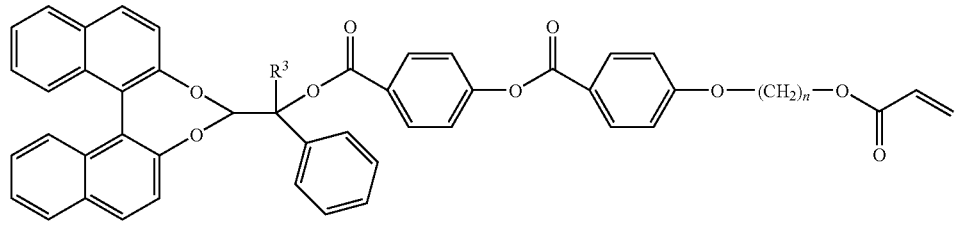
In the aforementioned structural formulae, R³ represents methyl, and R⁴ and R⁵ independently represent phenyl, alkyl having from 1 to 6 carbon atoms or trifluoromethyl.
(OP-13)
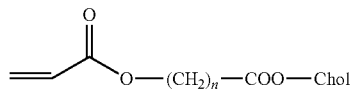
-continued
(OP-14)
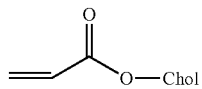
(OP-15)
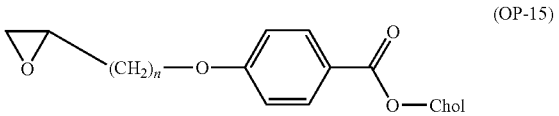

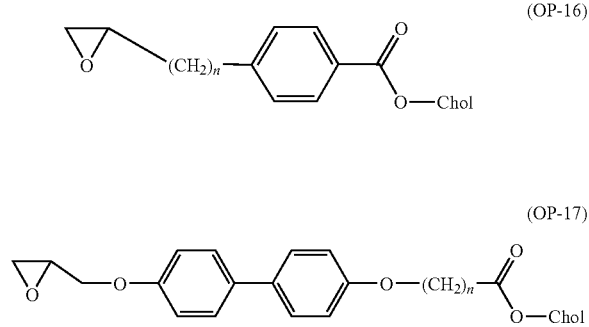
(OP-16)
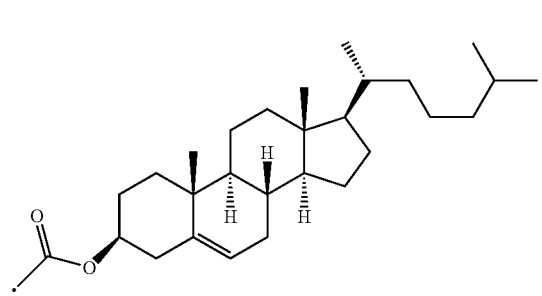
(OP-17)
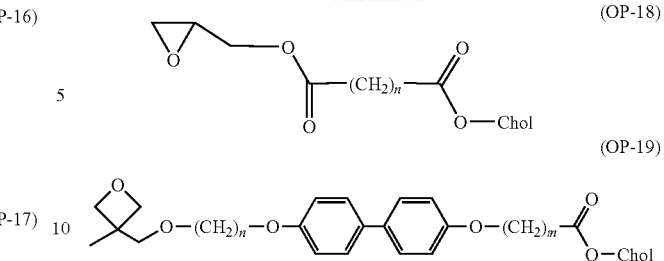
(OP-18)
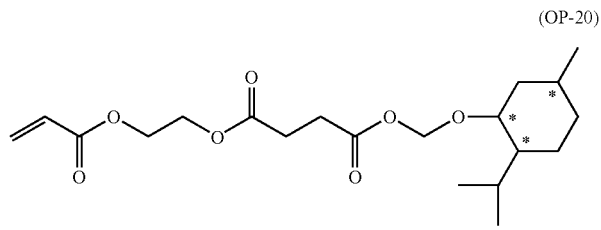
(OP-19)
In the aforementioned structural formulae, —COO-Chol represents a cholesterol ester group represented by the following formula.
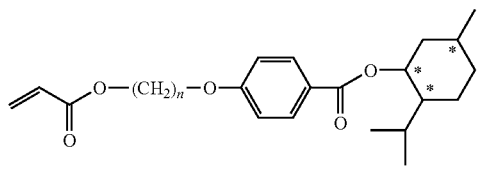
(OP-21)
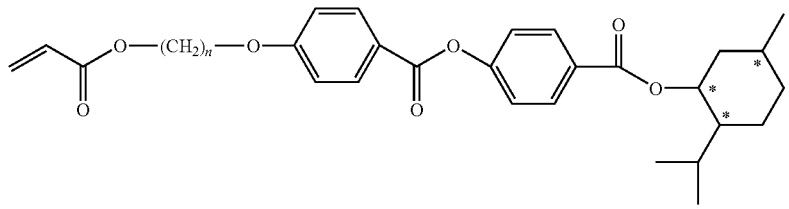
(OP-23)
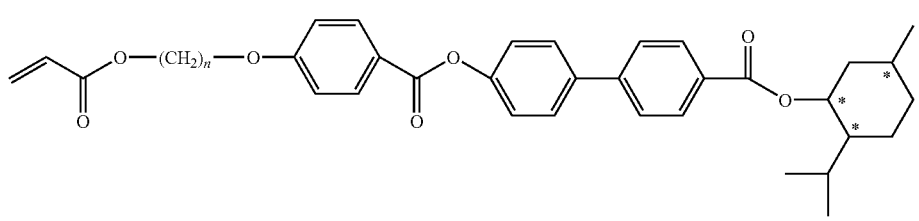
(OP-24)
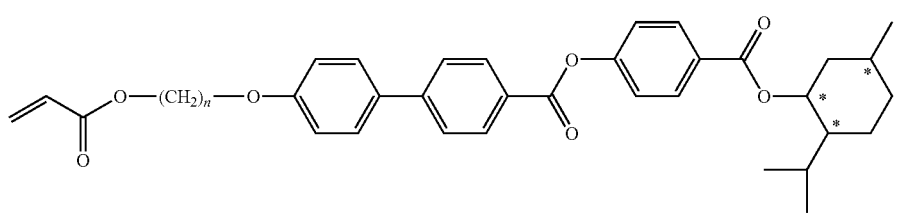
(OP-25)
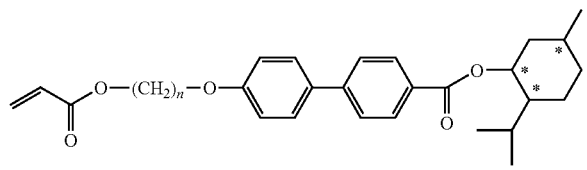
(OP-20)
(OP-22)

-continued
(OP-26)
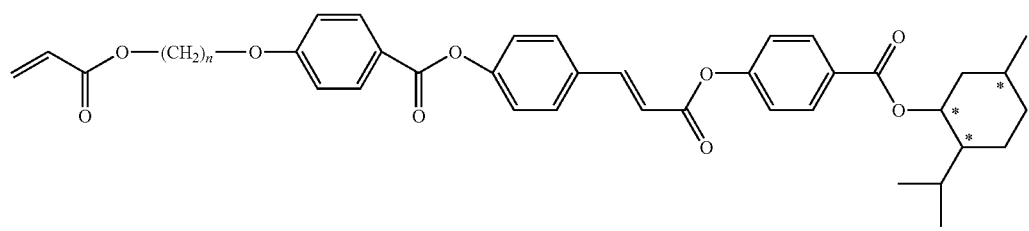
(OP-27)
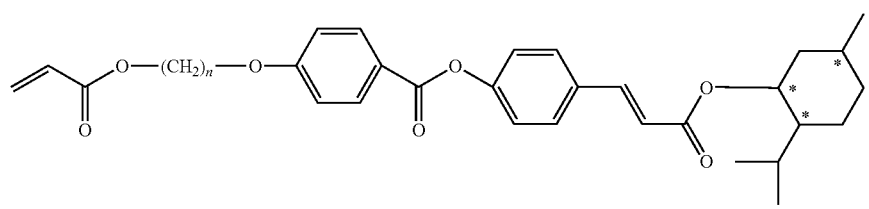
(OP-28) (OP-29)
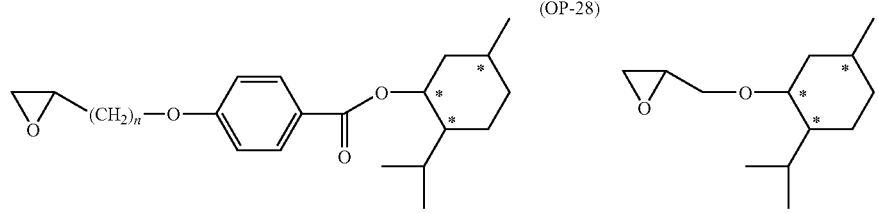
(OP-30)
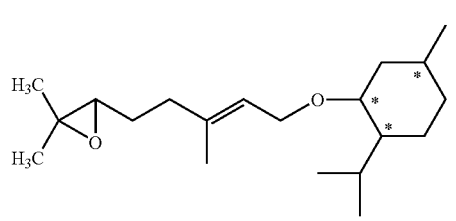
(OP-31)
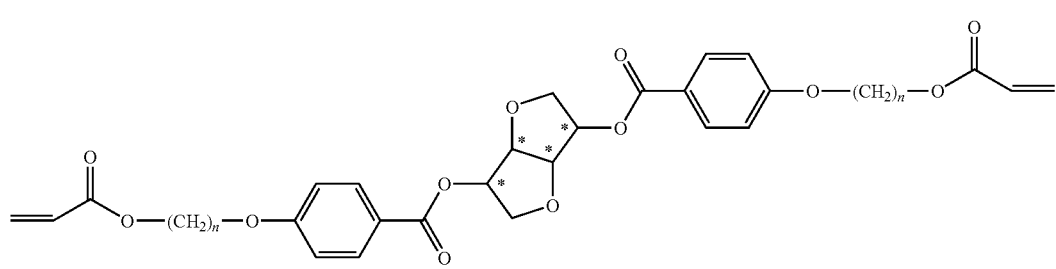
(OP-32)
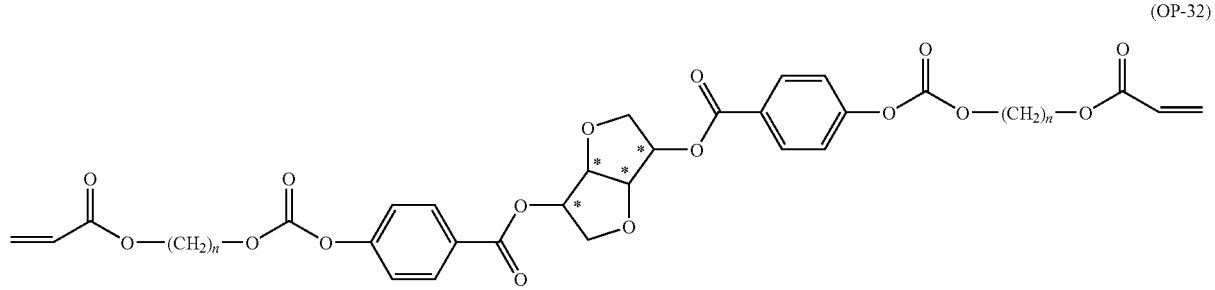

-continued
(OP-33)
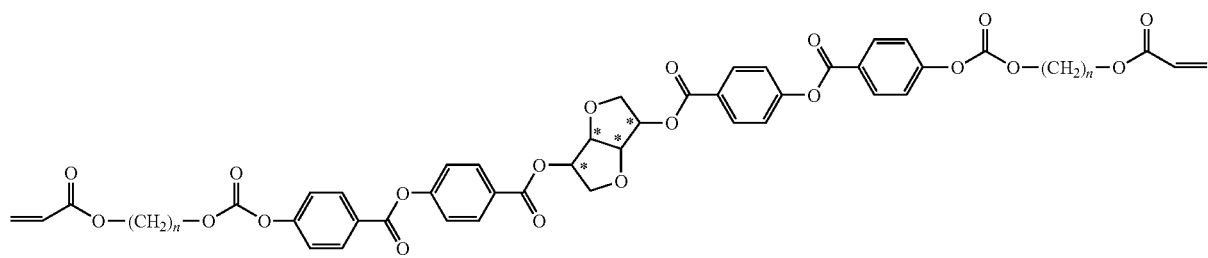
(OP-34)
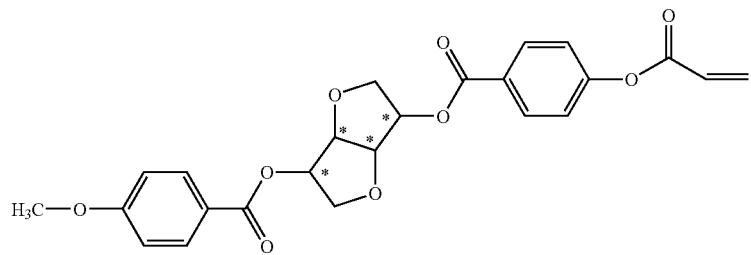
(OP-35)
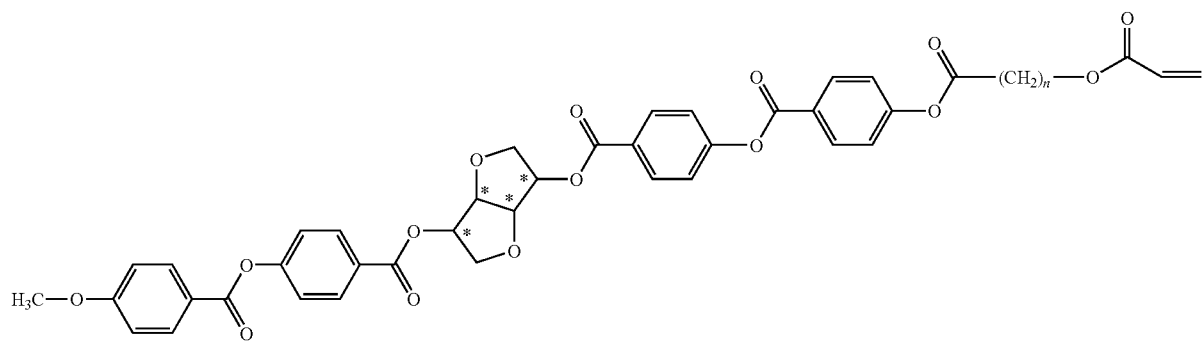
(OP-36)
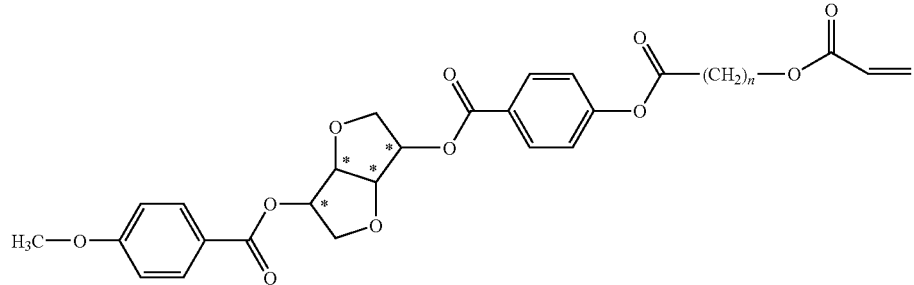
(OP-37)
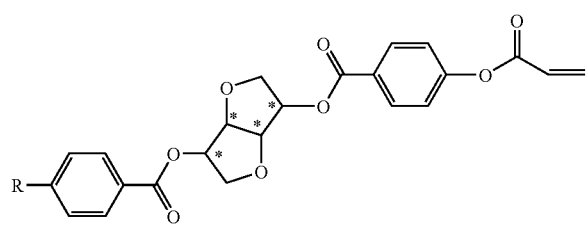
(OP-38)
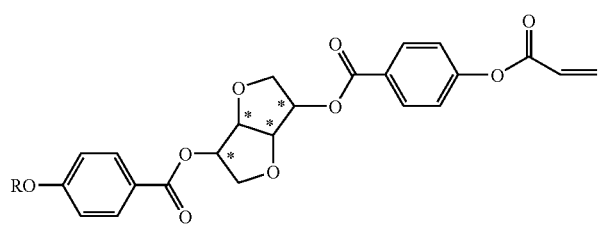

-continued
(OP-39)
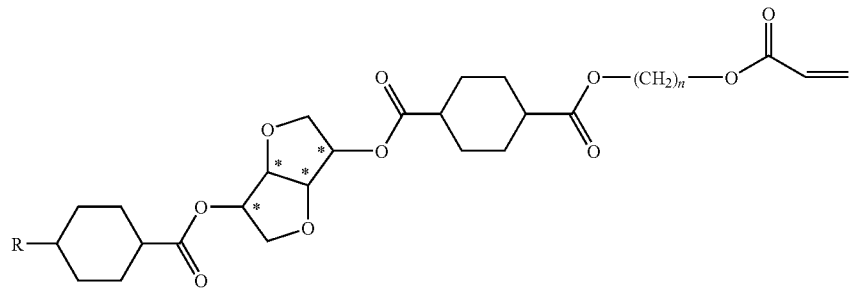
(OP-40)
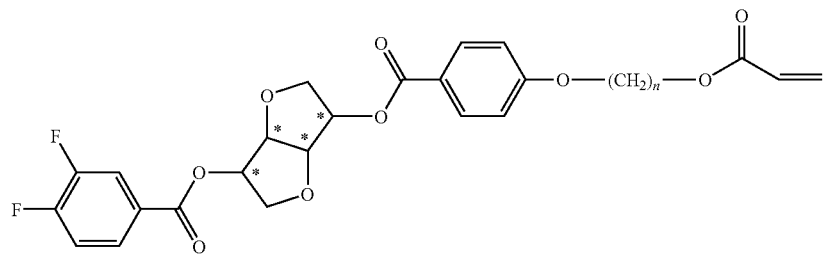
(OP-41)
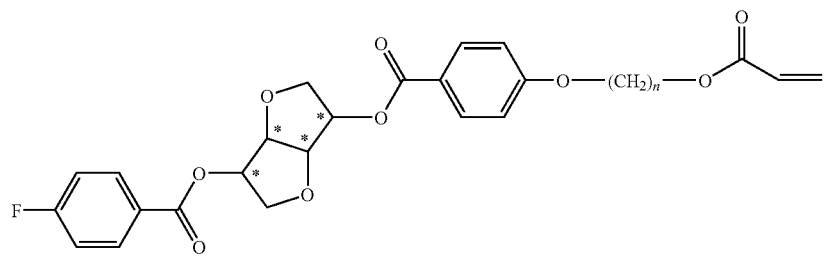
(OP-42)
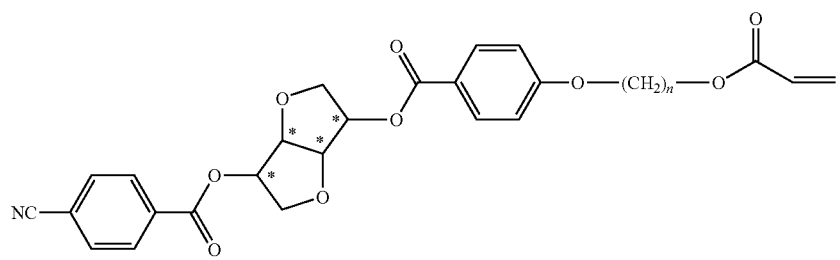
(OP-43)
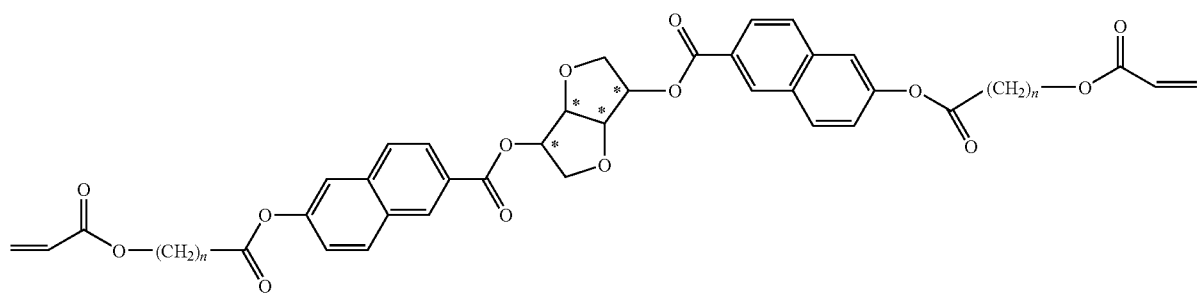

-continued
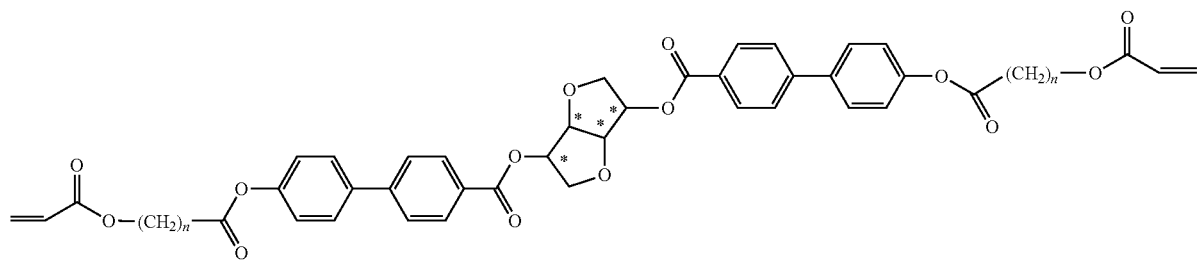
(OP-44)
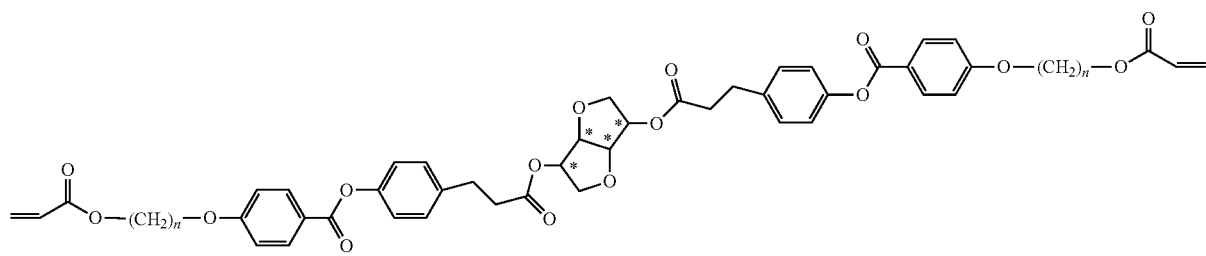
(OP-45)
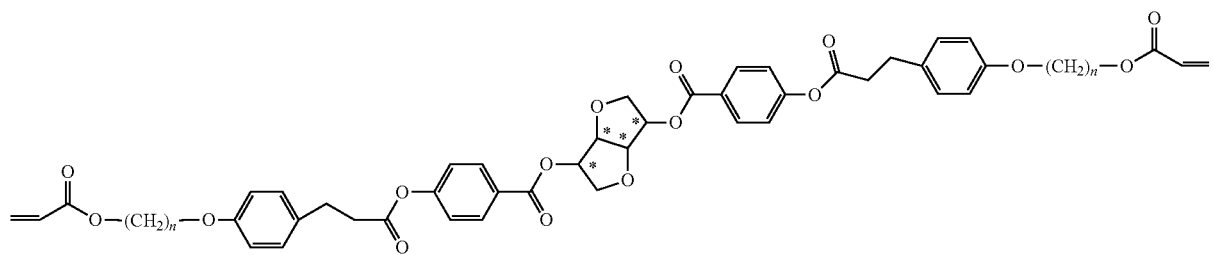
(OP-46)
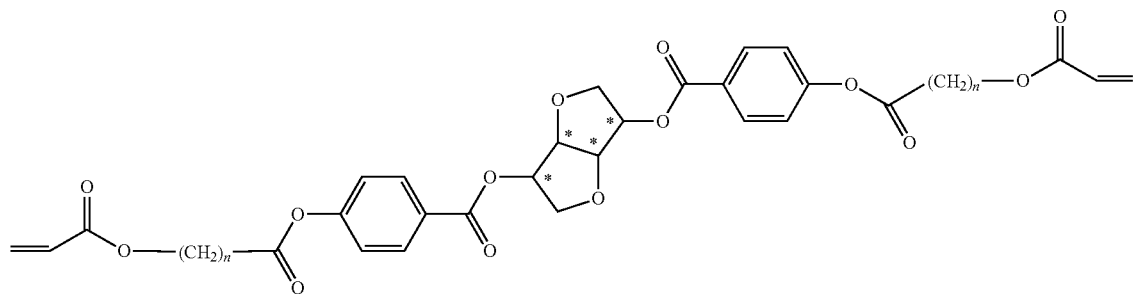
(OP-47)
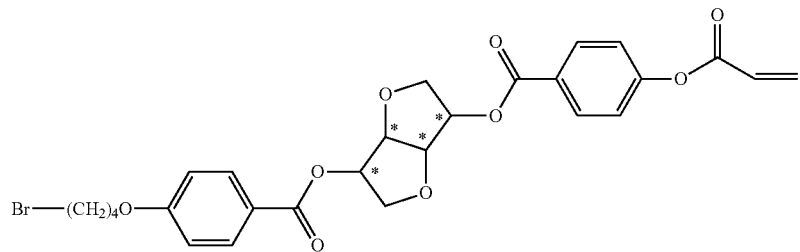
(OP-48)

-continued
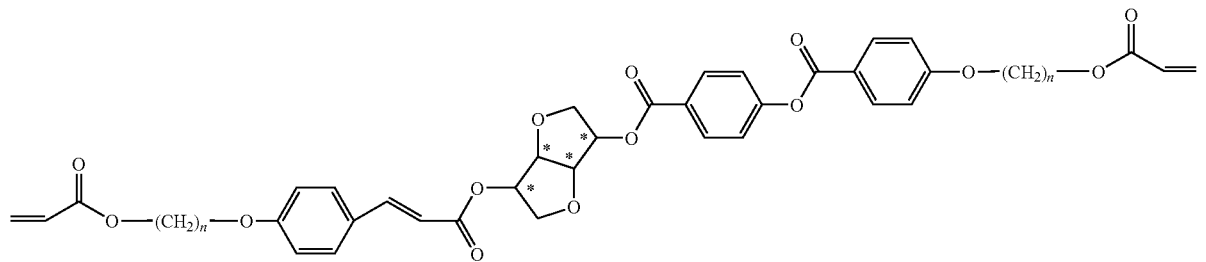
(OP-49)
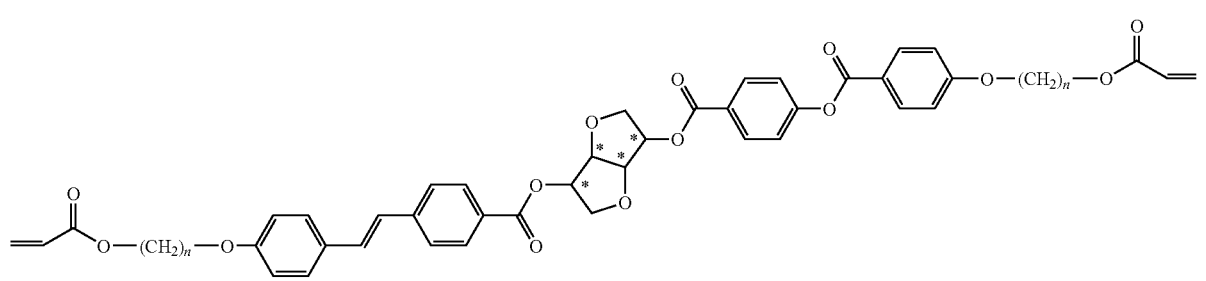
(OP-50)
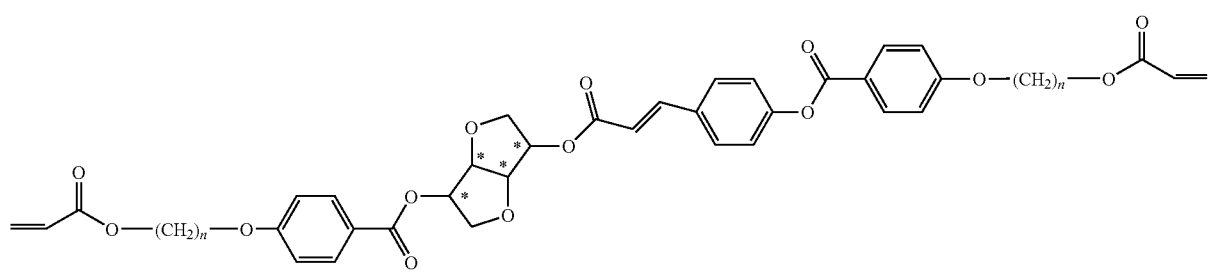
(OP-51)
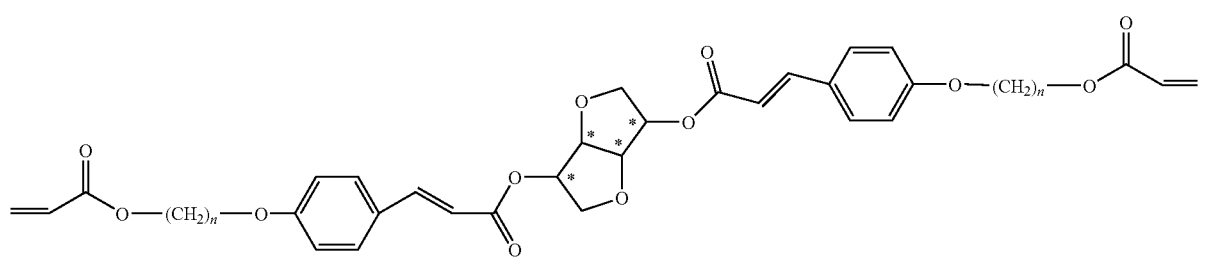
(OP-52)
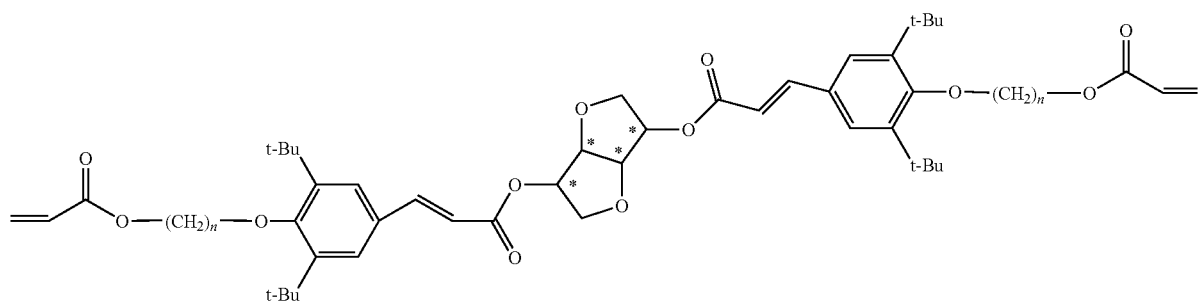
(OP-53)

-continued
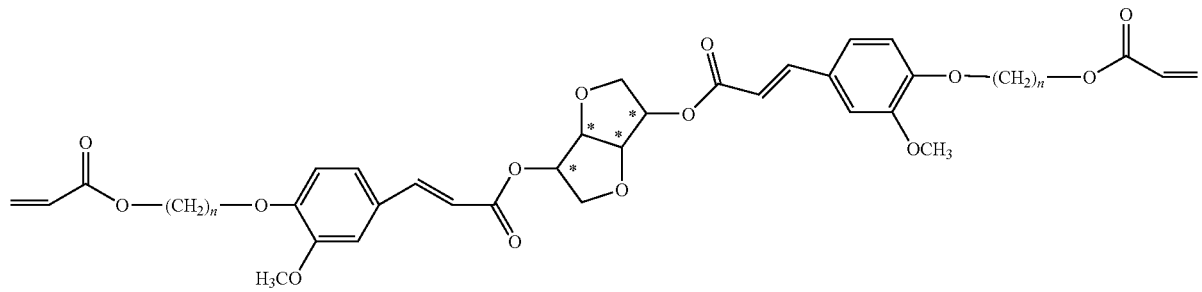
(OP-54)
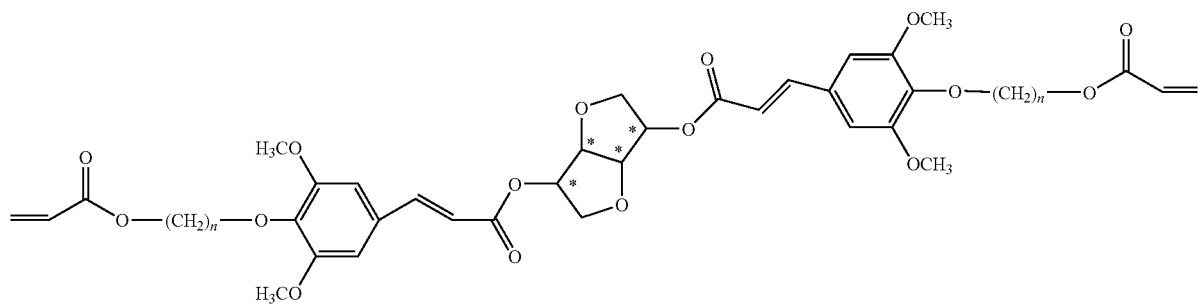
(OP-55)
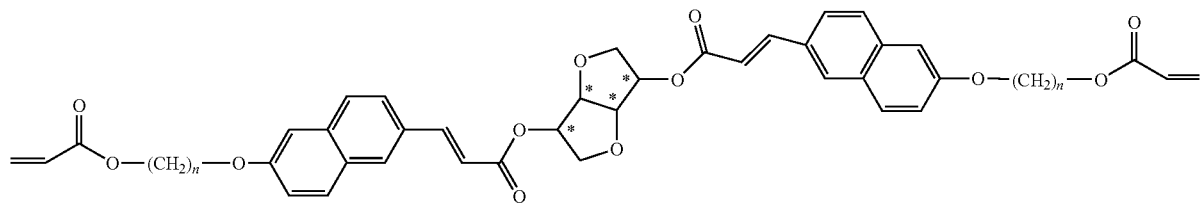
(OP-56)
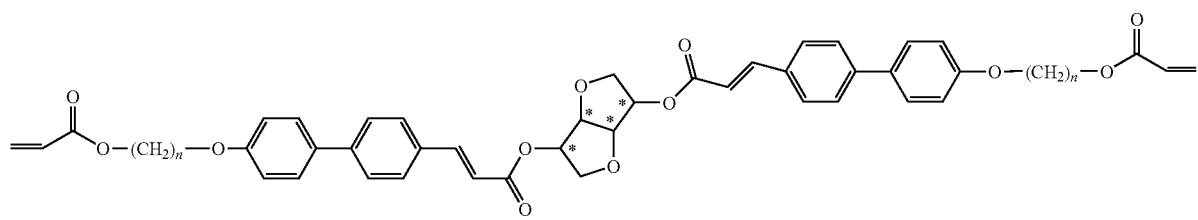
(OP-57)
In the formula (OP-53), t-Bu represents tertiary butyl group.
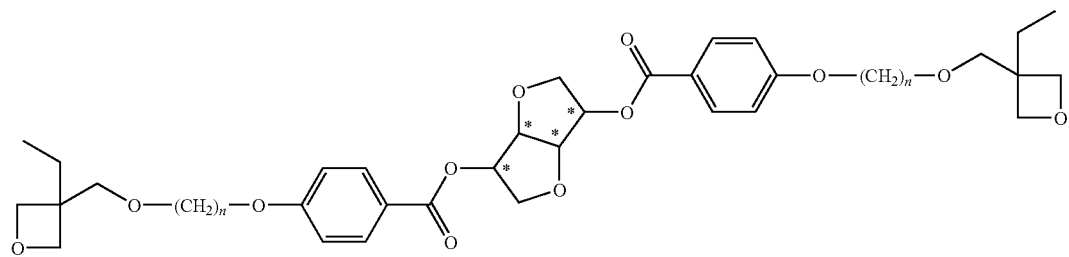
(OP-58)

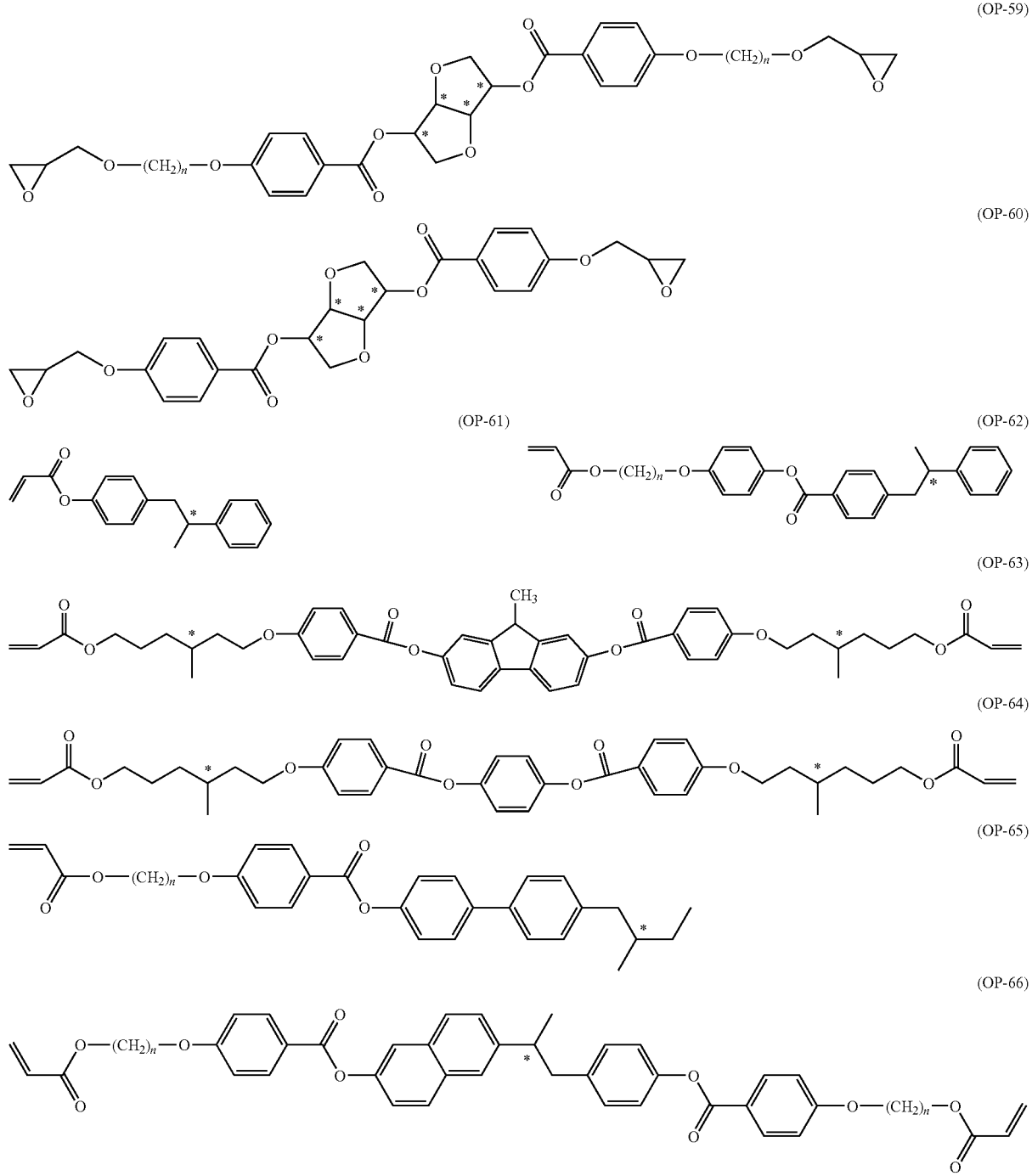

The composition (1) may contain a polymerization initiator. The polymerization initiator may be selected depending on the kind of polymerization. Preferred examples of the polymerization initiator are shown below.

Examples of a photoradical polymerization initiator include 2-hydroxy-2-methyl-1-phenylpropan-1-one (Darocure 1173), 1-hydrorxycyclohexyl phenyl ketone, 2,2-dimethoxy-1,2-diphenylethan-1-one (Irgacure 651), 1-hydroxycyclohexyl phenyl ketone (Irgacure 184), Irgacure 127, Irgacure 500 (a mixture of Irgacure 184 and benzophenone), Irgacure 2959, Irgacure 907, Irgacure 369, Irgacure 379, Irgacure 754, Irgacure 1300, Irgacure 819, Irgacure 1700, Irgacure 1800, Irgacure 1850, Irgacure 1870, Darocure 4265, Darocure MBF, Darocure TPO, Irgacure 784, Irgacure 754, Irgacure OXE01 and Irgacure OXE02. "Darocure" and "Irgacure" are trade names of the products available from Ciba Japan Co., Ltd. A known sensitizer may be added thereto, examples of which include isopropylthioxanthone, diethylthioxanthone, ethyl-4-dimethylaminobenzoate (Darocure EDB) and 2-ethylhexyl-4-dimethylaminobenzoate (Darocure EHA).

Examples of the photoradical polymerization initiator also include p-methoxyphenyl-2,4-bis(trichloromethyl)triazine, 2-(p-butoxystyryl)-5-trichloromethyl-1,3,4-oxadiazole, 9-phenylacridine, 9,10-benzphenazine, a mixture of benzophenone and Michler's ketone, a mixture of hexaarylbiimidazole and mercaptobenzimidazole, 1-(4-isopropylphenyl)-2-hydroxy-2-methylpropan-1-one, benzyldimethylketal, 2-methyl-1-(4-(methylthio)phenyl)-2-morpholinopropan-1-one, a mixture of 2,4-diethylxanthone and methyl p-dimethylaminobenzoate, and a mixture of benzophenone and methyltriethanolamine, and any known compound may be used in the invention.

Preferred examples of the initiator used in radical polymerization under heat include benzoyl peroxide, diisopropyl peroxy dicarbonate, tert-butyl peroxy 2-ethylhexanoate, tert-butyl peroxy pivalate, di-tert-butyl peroxide, tert-butyl peroxy diisobutyrate, lauroyl peroxide, 3,3'-bismethoxycarbonyl-4,4'-bis-tert-butyl peroxy carbonylbenzophenone, 3,4'-bismethoxycarbonyl-4,3'-bis-tert-butyl peroxy carbonylbenzophenone, 4,4'-bismethoxycarbonyl-3,3'-bis-tert-butyl peroxy carbonylbenzophenone, dimethyl 2,2'-azobisisobutyrate, azobisisobutyronitrile and azobiscyclohexanecarbonitrile, and any known compound may be used in the invention. Examples of the commercially available azo initiator include V-70, V-65, V-60, V-59, V-40, V-30, V-501, V-601, VE-073, VA-080, VA-086, VF-096, VAm-110, VAm-111, VA-044, VA-046B, VA-060, VA-061, V-50, VA-057, VA-067, VR-110, VPE-0201, VPE-0401, VPE-0601 and VPS-1001, available from Wako Pure Chemical Industries, Ltd.

Preferred examples of the initiator for cationic photopolymerization include a diaryliodonium salt (hereinafter abbreviated as DAS) and a triarylsulfonium salt (hereinafter abbreviated as TAS).

Examples of the DAS include diphenyliodonium tetrafluoroborate, diphenyliudonium hexafluorophosphonate, diphenyliodonium hexafluoroarsenate, diphenyliodonium tetra(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, bis(4-tert-butylphenyl)iodonium diphenyliodonium tetrafluoroborate, bis(4-tert-butylphenyl)iodonium diphenyliodonium hexafluoroarsenate and bis(4-tert-butylphenyl)iodonium diphenyliodonium trifluoromethanesulfonate. The DAS may be preferably combined with a photosensitizer. Examples of the photosensitizer include thioxanthone, phenothiazine, chlorothioxanthonse, xanthone, anthracene, diphenylanthracene and rubrene, and any known compound may be used in the invention.

Examples of the TAS include triphenylphosphonium tetrafluoroborate, triphenylsulfonium hexafluoroarsenate, triphenylsulfonium tetra(pentafluorophenyl)borate, 4-methoxyphenyldiphenylsulfonium tetrafluoroborate, 4-methoxyphenyldiphenylsulfonium hexafluorophosphonate, 4-methoxyphenyldiphenylsulfonium hexafluoroarsenate, 4-methoxyphenyldiphenylsulfonium trifluoromethanesulfonate, 4-methoxyphenyldiphenylsulfonium triphenylsulfonium tetra(pentafluorophenyl)borate, 4-phenylthiophenyldiphenylsulfonium tetrafluoroborate, 4-phenylthiophenyldiphenylsulfonium hexafluorophosphonate and 4-phenylthiophenyldiphenylsulfonium hexafluoroarsenate, and any known compound may be used in the invention.

Examples of the commercially available cationic photopolymerization initiator include DTS-102, available from Midori Kagaku Co., Ltd., Cyracure UVI-6990, Cyracure UVI-6974 and Cyracure UVI-6992, available from Union Carbide Corporation, Adeka Optomer SP-150, SP-152, SP-170 and SP-172, available from Adeka Corporation, Photoinitiator 2074, available from Rhodia, Inc., Irgacure 250, available from Ciba Japan Co., Ltd., and UV-9380C, available from GE Silicones, and any known compound may be used in the invention. An amine curing agent and the like disclosed in "Sosetsu Epoxy Jushi" (Epoxy Resin Review), edited by (The Japan Society of Epoxy Resin Technology may be added depending on the required properties.

A thermal cationic polymerization initiator may be used in combination. Specific examples of the trade name thereof include San-Aid (base agent) SI-60, SI-80, SI-100, SI-110, SI-145, SI-150, SI-160 and SI-180 and San-Aid (auxiliary agent) SI, available from Sanshin Chemical Industry, Co., Ltd. The thermal cationic polymerization initiator may be used in combination with the photoradical polymerization initiator and the cationic photoradical polymerization initiator or used in combination with the photoradical polymerization initiator.

The polymerizable liquid crystal composition (1) may be coated as it is on the surface of the substrate. In general, however, for facilitating the coating operation, the polymerizable liquid crystal composition is diluted with a solvent, or in alternative, the components of the polymerizable liquid crystal composition are each dissolved in a solvent, thereby preparing a solution of the polymerizable liquid crystal composition containing the polymerizable liquid crystal composition and the solvent, and the solution is coated. A solvent may be used solely or as a mixture of two or more kinds thereof. Examples of the solvent include an ester solvent, an amide solvent, an alcohol solvent, an ether solvent, a glycol monoalkyl ether solvent, an aromatic hydrocarbon solvent, a halogenated aromatic hydrocarbon solvent, an aliphatic hydrocarbon solvent, a halogenated aliphatic hydrocarbon solvent, an alicyclic hydrocarbon solvent, a ketone solvent and an acetate solvent.

Preferred examples of the ester solvent include alkyl acetate (such as methyl acetate, ethyl acetate, propyl acetate, isopropyl acetate, butyl acetate, 3-methoxybutyl acetate, isobutyl acetate, pentyl acetate and isopentyl acetate), ethyl trifluoroacetate, alkyl propionate (such as methyl propionate, methyl 3-methoxypropyonate, ethyl propionate, propyl propionate and butyl propionate), alkyl butyrate (such as methyl butyrate, ethyl butyrate, butyl butyrate, isobutyl butyrate and propyl butyrate), dialkyl malonate (such as diethyl malonate), alkyl glycolate (such as methyl glycolate and ethyl glycolate), alkyl lactate (such as methyl lactate, ethyl lactate, isopropyl lactate, n-propyl lactate, butyl lactate and ethylhexyl lactate), monoacetin, γ-butyrolactone and γ-valerolactone.

Preferred examples of the amide solvent include N-methyl-2-pyrrolidone, N,N-diemthylacetamide, N-methylpropyonamide, N,N-dimethylormamide, N,N-diethylformamide, N,N-diethylacetamide, N,N-diemthylacetamide dimethylacetal, N-methylcaprolactam and dimethylimidazolidinone.

Preferred examples of the alcohol solvent include methanol, ethanol, 1-propanol, 2-propanol, 1-methoxy-2-propanol, t-butyl alcohol, sec-butyl alcohol, butanol, 2-ethylbutanol, n-hexanol, n-heptanol, n-octanol, 1-dodecanol, ethylhexanol, 3,5,5-trimethylhexanol, n-amyl alcohol, hexafluoro-2-propanol, glycerin, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxybutanol, cyclohexanol and methylcyclohexanol.

Preferred examples of the ether solvent include ethylene glycol dimethyl ether, diethylene glycol dimethyl ether, bis(2-propyl)ether, 1,4-dioxane, cyclopentyl methyl ether, terpinyl methyl ether, dihydroterpinyl methyl ether, 1,8-cineole, 1,4-cineole and tetrahydrofuran (THF).

Preferred examples of the glycol monoalkyl ether solvent include ethylene glycol monoalkyl ether (such as ethylene glycol monomethyl ether and ethylene glycol monobutyl ether), diethylene glycol monoalkyl ether (such as diethylene glycol monoethyl ether), triethylene glycol monoalkyl ether, propylene glycol monoalkyl ether (such as propylene glycol monobutyl ether), dipropylene glycol monoalkyl ether (such as dipropylene glycol monomethyl ether), ethylene glycol monoalkyl ether acetate (such as ethylene glycol monobutyl ether acetate), diethylene glycol monoalkyl ether acetate (such as diethylene glycol monoethyl ether acetate), triethylene glycol monoalkyl ether acetate, propylene glycol monoalkyl ether acetate (such as propylene glycol monomethyl ether acetate, propylene glycol monoethyl ether acetate and propylene glycol monobutyl ether acetate), dipropylene glycol monoalkyl ether acetate (such as dipropylene glycol monomethyl ether acetate), and diethylene glycol methyl ethyl ether.

Preferred examples of the aromatic hydrocarbon solvent include benzene, toluene, xylene, mesitylene, ethylbenzene, diethylbenzene, i-propylbenzene, n-propylbenzene, tert-butylbenzene, sec-butylbenzene, n-butylbenzene, anisole, p-cymene, limonene, terpinolene and tetralin. Preferred examples of the halogenated aromatic hydrocarbon solvent include chlorobenzene. Preferred examples of the aliphatic hydrocarbon solvent include hexane and heptane. Preferred examples of the halogenated aliphatic hydrocarbon solvent include chloroform, dichloromethane, carbon tetrachloride, dichloroethane, trichloroethylene and tetrachloroethylene. Preferred examples of the alicyclic hydrocarbon solvent include cyclohexane and decalin.

Preferred examples of the ketone solvent include acetone, methyl ethyl ketone, methyl isobutyl ketone, cyclohexanone, cyclopentanone, dihydrocarvone, menthone, piperitenone and methyl propyl ketone.

Preferred examples of the acetate solvent include ethylene glycol monomethyl ether acetate, propylene glycol monomethyl ether acetate, propylene glycol monoethyl ether acetate, methyl acetoacetate, α-terpinyl acetate, perillyl acetate, 3-octyl acetate, 2-octyl acetate, myrtenyl acetate, isobornyl acetate, dihydroterpinyl acetate, dihydrocarbyl acetate, carbyl acetate and 1-methoxy-2-propyl acetate.

An amide solvent, an aromatic hydrocarbon solvent and a ketone solvent are preferably used from the standpoint of solubility of the polymerizable liquid crystal compound, and an ester solvent, an alcohol solvent, an ether solvent and a glycol monoalkyl ether solvent are also preferably used in combination therewith from the standpoint of the boiling point of the solvent. There is no particular limitation on selecting the solvent. In the case where a plastic substrate is used as the supporting substrate, it is necessary to lower the drying temperature to prevent the substrate from being deformed, and is also necessary to prevent the substrate from being damaged with the solvent. Preferred examples of the solvent used in this case include an aromatic hydrocarbon solvent, a ketone solvent, an ester solvent, an ether solvent, an alcohol solvent, an acetate solvent and a glycol monoalkyl ether solvent.

The ratio of the solvent in the solution of the polymerizable liquid crystal composition is generally from 50 to 95% based on the total weight of the solution. The lower limit is determined in consideration of the solubility of the polymerizable liquid crystal compound and the optimum viscosity upon coating the solution. The upper limit is determined in consideration of the economical issues, such as the cost for the solvent and the time and amount of heat necessary for evaporating the solvent. The ratio of the solvent is preferably from 60 to 90%, and more preferably from 70 to 85%.

Examples of a coating method for obtaining a coated film having a uniform thickness upon coating the polymerizable liquid crystal composition or a solution thereof include a spin coating method, a microgravure coating method, a gravure coating method, a wire bar coating method, a dip coating method, a spray coating method, a meniscus coating method and a die coating method.

The polymerizable liquid crystal composition of the invention may contain a surfactant. A surfactant has functions of facilitating the coating operation of the composition on a supporting substrate or the like to a uniform thickness and controlling the alignment of the liquid crystal phase. Preferred examples of the surfactant include a cationic surfactant, an anionic surfactant and a nonionic surfactant, and more preferred examples of the surfactant include a nonionic surfactant. Preferred examples of the nonionic surfactant include a silicone nonionic surfactant, a fluorine nonionic surfactant and a hydrocarbon nonionic surfactant.

Examples of the silicone nonionic surfactant include those containing modified silicone as a major component, available from Kyoeisha Chemical Co., Ltd., such as Polyflow ATF-2, Glanol 100, Glanol 115, Glanol 400, Glanol 410, Glanol 435, Glanol 440, Glanol 450, Glanol B-1484, Polyflow KL-250, Polyflow KL-260, Polyflow KL-270, Polyflow KL-280, BYK-300, BYK-302, BYK-306, BYK-307, BYK-310, BYK-315, BYK-320, BYK-322, BYK-323, BYK-325, BYK-330, BYK-331, BYK-333, BYK-337, BYK-341, BYK-344, BYK-345, BYK-346, BYK-347, BYK-348, BYK-370, BYK-375, BYK-377, BYK-378, BYK-3500, BYK-3510 and BYK-3570.

Examples of the fluorine nonionic surfactant include BYK-340, Ftergent 251, Ftergent 221MH, Ftergent 250, FTX-215M, FTX-218M, FTX-233M, FTX-245M, FTX-290M, FTX-209F, FTX-213F, Ftergent 222F, FTX-233F, FTX-245F, FTX-208G, FTX-218G, FTX-240G, FTX-206D, Ftergent 212D, FTX-218, FTX-220D, FTX-230D, FTX-240D, FTX-720C, FTX-740C, FTX-207S, FTX-211S, FTX-220S, FTX-230S, KB-L82, KB-L85, KB-L97, KB-L109, KB-L110, KB-F2L, KB-F2M, KB-F2S, KB-F3M and KB-FaM.

Examples of the hydrocarbon nonionic surfactant include those containing an acrylic polymer as a major component, such as Polyflow No. 3, Polyflow No. 50EHF, Polyflow No. 54N, Polyflow No. 75, Polyflow No. 77, Polyflow No. 85HF, Polyflow No. 90, Polyflow No. 95, BYK-350, BYK-352, BYK-354, BYK-355, BYK-358N, BYK-361N, BYK-380N, BYK-381, BYK-392 and BYK-Silclean3700.

"Polyflow" and "Glanol" are trade names of the products available from Kyoeisha Chemical Co., Ltd. "BYK" is a trade name of the products available from BYK Chemie Co., Ltd. "Ftergent", "FTX" and "KB" are trade names of the products available from Neos Co., Ltd.

The amount of the surfactant used varies depending on the kind of the surfactant and the compositional ratios of the composition, and is generally from 0.01 to 3% by weight, and preferably from 0.03 to 2% by weight, based on the total weight of the composition (1) (excluding the solvent).

The composition (1) may contain an organosilicon compound for controlling the alignment. Specific examples of the organosilicon compound include an amine organosilicon compound, such as 3-aminopropyltrimethoxysilane, 3-aminopropyltriethoxysilane, 3-aminopropyldimethylethoxysilane, 3-aminopropyldiisopropylethoxysilane, 3-aminopropylmethyldiethoxysilane, 3-aminopropylpentamethyldisiloxane, 3-aminopropylmethylbis(trimethylsiloxy)silane, 3-aminopropyltris(trimethylsiloxy)silane, 3-aminobutyltriethoxysilane, N-(2-aminoethyl)-3-aminopropylmethyldimethoxysilane, N-(2-aminoetyyl)-3-aminopropyltrimethoxysilane, N-(6-aminohexyl)-3-aminopropyltrimethoxysilane and (3-trimethoxysilylpropyl) diethylenetriamine, and a ketimine organosilicon compound, such as 3-triethoxysilyl-N-(1,3-dimethylbutylydene). The composition (1) may contain an organosilicon compound other than those described above for controlling the adhesiveness to the supporting substrate. Specific examples thereof include vinyltrialkoxysilane, 3-isocyanatepropyltriethoxysilane, 3-glycidoxypropyltrialkoxysilane, 3-chlorotrialkoxysilane, 3-acryloxypropyltrimethoxysilane and 3-methacryloxypropyltrialkoxysilane, and further examples thereof include dialkoxymethylsilane; in which one of the three alkoxy groups in these compounds is replaced by methyl. The content of the organosilicon compound varies depending on the kind of the organosilicon compound and the compositional ratios of the composition, and is generally from 1 to 30% by weight, and preferably from 3 to 15% by weight, based on the total weight of the composition (1) (excluding the solvent).

The composition (1) may contain one kind or two or more kinds of a chain transfer agent for controlling the mechanical properties of the polymer. The use of a chain transfer agent enables to control the length of the polymer chain or the distance between two crosslinked polymer chains in the polymer film. These lengths can be controlled simultaneously. Increase of the amount of the chain transfer agent decreases the length of the polymer chain. Preferred examples of the chain transfer agent include a thiol compound. Examples of a monofunctional thiol compound include dodecanethiol and 2-ethylhexyl-(3-mercaptopropyonate). Examples of a polyfunctional thiol compound include trimethylolpropane tris(3-mercaptopropyonate), pentaerythritol tetrakis(3-mercaptopropyonate), 1,4-bis(3-mercaptobutyryloxy)butane (Karenz MT BD1), pentaerythritol tetrakis(3-mercaptobutyrate) (Karenz MT PE1), and 1,3,5-tris(3-mercaptobutyloxyethyl)-1,3,5-triazine-2,4,6(1H,3H,5H)-trione (Karenz MT NR1). "Karenz" is a trade name of the products available from Showa Denko Co., Ltd.

A polymerization inhibitor may be added to the composition (1) for preventing initiation of polymerization upon storing. A known polymerization inhibitor may be used, and preferred examples thereof include 2,5-di(t-butyl)hydroxytoluene (BHT), hydroquinone, Methylene Blue, diphenylpicric acid hydrazide (DPPH), benzothiadine, 4-nitrosodimethylaniline (NIDI) and o-hydroxybenzophenone.

An oxygen inhibitor may be added to the composition (1) for improving the storage stability thereof. A radical formed in the composition reacts with oxygen in the atmosphere to provide a peroxide radical, which accelerates unfavorable reaction with the polymerizable compound. An oxygen inhibitor is preferably added to prevent the phenomenon. Examples of the oxygen inhibitor include a phosphate ester compound.

In order to improve the weather resistance of the polymerizable liquid crystal composition, an ultraviolet ray absorbent, a light stabilizer (radical scavenger) and an antioxidant may be added. Examples of the ultraviolet ray absorbent include Tinuvin PS, Tinuvin P, Tinuvin 99-2, Tinuvin 109, Tinuvin 213, Tinuvin 234, Tinuvin 326, Tinuvin 328, Tinuvin 329, Tinuvin 384-2, Tinuvin 571, Tinuvin 900, Tinuvin 928, Tinuvin 1130, Tinuvin 400, Tinuvin 405, Tinuvin 460, Tinuvin 479, Tinuvin 5236, ADK STAB LA-32, ADK STAB LA-34, ADK STAB LA-36, ADK STAB LA-31, ADK STAB 1413 and ADK STAB LA-51. "Tinuvin" is a trade name of the products available from Ciba Japan Co., Ltd., and "ADK STAB" is a trade name of the products available from ADEKA Corporation.

Examples of the light stabilizer include Tinuvin 111FDL, Tinuvin 123, Tinuvin 144, Tinuvin 152, Tinuvin 292, Tinuvin 622, Tinuvin 770, Tinuvin 765, Tinuvin 780, Tinuvin 905, Tinuvin 5100, Tinuvin 5050, Tinuvin 5060, Tinuvin 5151, Chimassorb 119FL, Chimassorb 944FL, Chimassorb 944LD, ADK STAB LA-52, ADK STAB LA-57, ADK STAB LA-62, ADK STAB LA-67, ADK STAB LA-63P, ADK STAB LA-68LD, ADK STAB LA-77, ADK STAB LA-82, ADK STAB LA-87, Cyasorb UV-3346, available from Nihon Cytec Industries Inc., and Good-rite UV-3034, available from Goodrich Corp. "Chimassorb" is a trade name of a commercial product available from Ciba Japan Co., Ltd.

Examples of the antioxidant include ADK STAB AO-20, AO-30, AO-40, AO-50, AO-60 and AO-80, Sumilizer BHT, Sumilizer BBM-S and Sumilizer GA-80, available from Sumitomo Chemical Co., Ltd., and Irganox 1076, Irganox 1010, Irganox 3114 and Irganox 245, available from Ciba Japan Co., Ltd.

The anisotropic polymer can be produced in the following manner. The solution of the polymerizable liquid crystal composition is coated on a supporting substrate, and then dried to form a coated film. The coated film is then subjected to such a treatment as light irradiation, electron beam irradiation, heating, or light irradiation under heating to polymerize the polymerizable liquid crystal composition, thereby fixing the nematic alignment formed by the composition in a liquid crystal state in the coated film. Examples of the supporting substrate that can be used herein include glass and a plastic film. Examples of the plastic film include films of polyimide, polyamideimide, polyamide, polyetherimide, polyeretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, cellulose, triacetyl cellulose, a partially saponified product of triacetyl cellulose, an epoxy resin, a phenol resin and a cycloolefin resin.

Examples of the cycloolefin resin include a norbornene resin and a dicyclopentadiene resin, but the invention is not limited thereto. Among these, those having no unsaturated bond or having unsaturated bonds that have been hydrogenated are preferably used. Examples thereof include a hydrogenated product of a ring-opening (co)polymer of one or plural kinds of norbornene monomers, an addition (co)polymer of one or plural kinds of norbornene monomers, an addition copolymer of a norbornene monomer and an olefin monomer (such as ethylene and an α-olefin), an addition copolymer of a norbornene monomer and a cycloolefin monomer (such as cyclopentene, cyclooctene and 5,6-dihyroxycyclopentadiene), and modified products thereof. Specific examples thereof include Zeonex and Zeonor (available from Nippon Zeon Corporation), Arton (available from JSR Corporation), TOPAS (available from Ticona, Inc.), Apel (available from Mitsui Chemicals, Inc.), Escena (available from Sekisui Chemical Co., Ltd.) and Optorez (available from Hitachi Chemical Co., Ltd.).

The plastic film may be a uniaxially stretched film or a biaxially stretched film. The plastic film may be subjected to a surface treatment, such as a hydrophilic treatment, e.g., a corona treatment and a plasma treatment, and a hydrophobic treatment. While the method for the hydrophilic treatment is not particularly limited, a corona treatment and a plasma treatment are preferred, and a plasma treatment is particularly preferred. The plasma treatment can be effected by a method disclosed, for example, in JP-A-2002-226616 and JP-A-2002-121648. The hydrophilic treatment may be used in the case where the polymerizable liquid crystal composition is controlled to have a homeotropic alignment. An anchor coating layer may be formed for improving adhesion between the anisotropic polymer and the plastic film. The anchor coating layer may be formed of an inorganic material or an organic material as far as the layer improves adhesion between the anisotropic polymer and the plastic film. The plastic film may be a laminated film. Instead of the plastic film, a metallic substrate, such as aluminum, iron and copper, having slit grooves formed on the surface thereof, and a glass substrate, such as alkali glass, borosilicate glass and flint glass, having been etched to form grooves in a slit form may also be used.

The supporting substrate, such as the glass substrate and the plastic film, may be subjected to a physical or mechanical surface treatment, such as rubbing, before forming a coated film of the polymerizable liquid crystal composition. The rubbing treatment may be carried out by the following methods. A rubbing cloth formed of such a material as rayon, cotton or polyamide is wound on a metallic roll or the like, and the roll is rotated and moved in a state where the roll is in contact with the supporting substrate or a polymer coated film formed thereon, or the supporting substrate is moved with the rotated roll staying. The rubbing treatment may be carried out directly on the supporting substrate, or on the plastic film that is formed on the supporting substrate in advance. Depending on the species of the supporting substrate, the surface thereof may be subjected to a corona treatment or a plasma treatment to improve the wettability. In this case, the corona treatment or plasma treatment is preferably performed before the rubbing treatment. Instead of the rubbing treatment, a photo alignment treatment with a polarized ultraviolet ray, and various kinds of photo alignment film materials may be used.

Upon coating the solution of the polymerizable liquid crystal composition of the invention, the solvent is removed after coating to form a polymerizable liquid crystal layer, i.e., a layer of the polymerizable liquid crystal composition, having a uniform thickness on the supporting substrate. The conditions for removing the solvent are not particularly limited, and the coated film may be dried to such an extent that the solvent has been substantially removed, and the coated film of the polymerizable liquid crystal composition loses flowability. The solvent can be removed by air drying at room temperature, drying with a hot plate, drying in a drying furnace, blowing warm air or hot air, or the like. The polymerizable liquid crystal composition in the coated film may complete a nematic alignment during the drying operation of the coated film in some cases, depending on the kinds and the compositional ratios of the compounds used in the polymerizable liquid crystal composition. In this case, accordingly, the coated film after completing the drying step can be subjected to a polymerizing step without subjecting to a heat-treating step described later.

Preferred ranges of the conditions, such as the temperature and time for the heat treatment of the coated film, the wavelength of light used for light irradiation, and the amount of light radiated from a light source, vary depending on the kinds and compositional ratios of the compounds used in the polymerizable liquid crystal composition, the presence or absence and the addition amount of the photopolymerization initiator, and the like. Accordingly, the conditions including the temperature and time for the heat treatment of the coated film, the wavelength of light used for light irradiation, and the amount of light radiated from a light source described later are considered to be approximate ranges.

The heat treatment of the coated film is preferably carried out under such conditions that the solvent is removed, and a uniform alignment property of the polymerizable liquid crystal is obtained. The heat treatment may be carried out at a temperature higher than the liquid crystal phase transition temperature of the polymerizable liquid crystal composition. One example of the heat-treating method is a method of heating the coated film to a temperature where the polymerizable liquid crystal composition exhibits a nematic liquid crystal phase, whereby the polymerizable liquid crystal composition in the coated film forms a nematic alignment. A nematic alignment may be formed by changing the temperature of the coated film within a temperature range where the polymerizable liquid crystal composition exhibits a nematic liquid crystal phase. In this method, the coated film is heated to a high temperature region within the aforementioned temperature range to complete substantially a nematic alignment of the coated film, and then the temperature is decreased to make an alignment with higher regularity. In both cases using the heat-treating methods, the heat-treating temperature may be from room temperature to 120° C., preferably room temperature to 100° C., more preferably from room temperature to 90° C., and further preferably from room temperature to 85° C. The heat-treating time is generally from 5 seconds to 2 hours, preferably from 10 seconds to 40 minutes, and more preferably from 20 seconds to 20 minutes. In order to increase the temperature of the layer containing the polymerizable liquid crystal composition to the prescribed temperature, the heat-treating time is preferably 5 seconds or more. In order to prevent the productivity from being deteriorated, the heat-treating time is preferably 2 hours or less. The polymerizable liquid crystal layer of the invention is thus completed in this manner.

The nematic alignment state of the polymerizable liquid crystal compounds formed in the polymerizable liquid crystal layer is fixed by polymerizing the polymerizable liquid crystal compounds through any one of the above-mentioned treatments. The wavelength of the light used for the light irradiation is not particularly limited, and an ultraviolet ray, a visible ray, an infrared ray (heat ray) and the like may be used. In general, an ultraviolet ray or a visible ray may be used. The wavelength is generally in a range of from 150 to 500 nm, preferably in a range of from 250 to 450 nm, and more preferably in a range of from 300 to 400 nm. Examples of the light source include a low pressure mercury lamp (such as a bactericidal lamp, a fluorescent chemical lamp and a black light lamp), a high pressure discharge lamp (such as a high pressure mercury lamp and a metal halide lamp), and a short arc discharge lamp (such as a super high pressure mercury lamp, a xenon lamp and a mercury xenon lamp). Preferred examples of the light source include a metal halide lamp, a xenon lamp, a super high pressure mercury lamp and a high pressure mercury lamp. The wavelength range of the light source used for irradiation may be selected by inserting a filter between the light source and the polymerizable liquid crystal layer to pass only the specific wavelength range. The amount of light radiated from the light source is generally from 2 to 5,000 mJ/cm$^2$, preferably from 10 to 3,000 mJ/cm$^2$, and more preferably from 100 to 2,000 mJ/cm$^2$. The temperature condition upon irradiation of light is preferably set similarly to the heat-treating temperature. The atmosphere upon polymerization may be any of a nitrogen atmosphere, an inert gas atmosphere and an air atmosphere, and a nitrogen atmosphere and an inert gas atmosphere are preferred from the standpoint of enhancement of the curing property.

In the polymerization under heating, the polymerization initiating temperature of the heat polymerization initiator and the heating temperature may be controlled. In order to prevent the heat polymerization reaction from being initiated in the drying process, the temperature difference between the half-life period temperature of the heat polymerization initiator and the temperature in the drying process is preferably as large as possible. In the case where a heat polymerization initiator generating radicals upon heat polymerization is used, from the standpoint of enhancement of curing property, the heating operation is preferably carried out under a nitrogen atmosphere or an inert gas atmosphere to decrease oxygen inhibition.

In the case where the anisotropic polymer obtained by polymerizing the polymerizable liquid crystal composition of the invention through light or heat is used in various optical devices, and in the case where the anisotropic polymer is used as an optical compensation device used in a liquid crystal display device, it is considerably important to control the distribution of the tilt angle thereof in the thickness direction.

Examples of the method for controlling the tilt angle include a method of controlling the kinds and the compositional ratios of the liquid crystal compounds used in the polymerizable liquid crystal composition. The tilt angle may also be controlled by adding a surfactant to the polymerizable liquid crystal compounds. The tilt angle of the anisotropic polymer can also be controlled by the kind of the solvent and the concentration of the solute in the polymerizable liquid crystal composition, the kind and amount of the surfactant added. The tilt angle of the liquid crystal film can be controlled by the kind and the rubbing condition of the supporting substrate and the polymer film, the drying condition and the heat treatment condition for the coated film of the polymerizable liquid crystal composition, and the like. The irradiation atmosphere in the photopolymerization step after alignment and the temperature upon irradiation also influence the tilt angle of the anisotropic polymer. In other words, it can be considered that substantially all the conditions in the production process of the anisotropic polymer influence the tilt angle in any way. Accordingly, a tilt angle suitable for a target product can be provided by appropriately selecting the conditions in the production process of the anisotropic polymer, in addition to optimization of the polymerizable liquid crystal composition.

In a homogeneous alignment, the tilt angle is uniformly distributed around 0°, particularly from 0 to 5°, over the substrate interface to the free interface. This alignment state is obtained by using the compound (1), the compounds (M1), (M2-1), (M2-2), (M3) and (M4) and the nonionic surfactant. In the case where the compound (N) is used for controlling the properties, the amount thereof is preferably the minimum amount. For providing a uniform homogeneous alignment state in the invention, the ratio of the compound (1) in the mixture of the polymerizable compounds is preferably from 1 to 90% by weight, and more preferably from 3 to 85% by weight, as described above. Preferred examples of the compound (1) include the compounds (1-B-1) to (1-B-6), (1-B-11), (1-B-15), (1-B-17), (1-B-19) to (1-B-23), (1-B-25), (1-B-29) to (1-B-32), (1-B-38) and (1-B-40). Preferred examples of the compounds (M1), (M2-1), (M2-2), (M3) and (M4) include compounds; in which $R^3$ represents a group represented by the formula (2-6-1), and $Y^1$ represents alkyl or alkoxy each having from 2 to 6 carbon atoms. Preferred examples of the nonionic surfactant include fluorine, silicone and hydrocarbon nonionic surfactants, and a fluorine nonionic surfactant is more preferred. The amount of the surfactant added is generally from 0.01 to 3% by weight, and preferably from 0.03 to 2% by weight, based on the total weight of the composition (1) (excluding the solvent).

The suitable thickness of the anisotropic polymer varies depending on the retardation of the target device and the birefringence of the anisotropic polymer. Therefore, the suitable range thereof cannot be determined strictly and may be generally from 0.05 to 50 µm, preferably from 0.5 to 20 µm, and more preferably from 1 to 10 µm. The anisotropic polymer preferably has a haze of 1.5% or less and a transmittance of 80% or more, and more preferably has a haze of 1.0% or less and a transmittance of 95% or more. The conditions of transmittance are preferably satisfied in the visible ray region.

The anisotropic polymer can be effectively utilized as an optical compensation device applied to a liquid crystal display device (particularly, a liquid crystal display device of an active matrix type or a passive matrix type). Examples of the type of the liquid crystal display device, to which the anisotropic polymer is suitably applied as an optical compensation film, include an IPS (in-plane switching) type, a display having switch in an optically isotropic phase (described, for example, in WO 02/93244), a TN (twisted nematic) type, an STN (super twisted nematic) type, an ECB (electrically controlled birefringence) type, a DAP (deformation of aligned phases) type, a CSH (color super homeotropic) type, a VA (vertical alignment) type, a VAN/VAC (vertically aligned nematic/cholesteric) type, an MVA (multi-domain vertical alignment) type, a PVA (patterned vertical alignment) type, an OCB (optically compensated birefringence) type, an R-OCB (reflective optically compensated birefringence) type, an HAN (hybrid aligned nematic) type, an OMI (optical mode interference) type and an SBE (super birefringence effect) type. Furthermore, the anisotropic polymer can be used as a phase retarder for a display device of a guest-host type, a ferroelectric type, an antiferroelectric type or the like. Preferred examples of the type of the liquid crystal display device include a TN type, an STN type, a VA type and an IPS type, and particularly an active matrix type display. The optimum values of the parameters demanded for the anisotropic polymer, such as the distribution of tilt angle in the thickness direction and the thickness, strongly depend on the kind and the optical parameters of the liquid crystal display device that is to be compensated, and thus vary depending on the kind of the device.

The anisotropic polymer can be used as an optical device having a polarizing plate and the like integrated therewith, and in this case, the anisotropic polymer is disposed outside the liquid crystal cell. The anisotropic polymer as an optical compensation device can be disposed inside the liquid crystal cell since it suffers no or less elution of impurities into the liquid crystal charged in the cell. For example, by applying the techniques disclosed in JP-A-2006-285014, the polymerizable liquid crystal layer of the invention can be formed on a color filter to enhance the function of the color filter.

When the compound (1) has optical activity, the anisotropic polymer has a fixed helical structure. When the compound (1) has no optical activity, the polymer (1) having a fixed helical structure can be obtained by adding an optically active compound to the composition thereof.

The polymer (1) having a molecular alignment and a helical structure, both of which have been fixed, is suitable for such purposes as a phase retardation film, a polarizing device, a circularly polarizing device, an elliptically polarizing device, a reflection film, a selective reflection film, a color compensation film, a viewing angle compensation film and a liquid crystal alignment film.

The polymer (1) having a molecular alignment having been fixed is suitable for such purposes as a phase retardation film, a circularly polarizing device, an elliptically polarizing device, a selective reflection film, a color compensation film, a viewing angle compensation film and a liquid crystal alignment film. The polymer (1) having a helical structure having been fixed is suitable for such purposes as a reflection film and a color compensation film. The polymer (1) having a molecular alignment and a helical structure, both of which have not been fixed, is suitable for such purposes as a reflection film and a liquid crystal alignment film. In all the cases, the polymer (1) can be utilized as an adhesive, a synthetic polymer having mechanical anisotropy, a cosmetic material, an ornamental material, a nonlinear optical material, an information recording material and the like. The heat polymerization and the photopolymerization described above are suitable for fixing the molecular alignment and for fixing the helical structure.

Upon polymerizing a composition containing an optically active compound on a substrate having been subjected to an alignment treatment, a polymer having a molecular alignment and a helical structure, both of which have been fixed, is obtained. The properties of the polymer depend on the pitch of the helical structure. The helical pitch can be controlled by the kind and the amount of the optically active compound added. The amount of the optically active compound added is generally from 0.01 to 50% by weight, and preferably from 1 to 30% by weight, based on the total amount of the composition (excluding the solvent). Only one kind of the optically active compound may be added, and plural kinds of the optically active compounds may be added for controlling the temperature dependencies of the helical pitches.

The polymer having been isolated can be dissolved in a solvent and then processed into a film or the like, and in this case, two or more kinds of the polymers may be mixed, and the polymers may be laminated. Preferred examples of the solvent include N-methyl-2-pyrrolidone, dimethylsulfoxide, N,N-dimethylacetamide, N,N-dimethylformamide, N,N-dimethylacetamide dimethylacetal, tetrahydrofuran, chloroform, 1,4-dioxane, bis(methoxyethyl)ether, γ-butyrolactone, tetramethylurea, trifluoroacetic acid, ethyl trifluoroacetate, hexafluoro-2-propanol, 2-methoxyethyl acetate, methyl ethyl ketone, cyclopentanone and cyclohexanone. These solvents may be used after mixing with an ordinary organic solvent, such as acetone, benzene, toluene, heptane and methylene chloride.

EXAMPLE

The invention will be described in more detail with reference to examples below, but the invention is not limited to the examples.

In the examples, the structures of the compounds were confirmed by nuclear magnetic resonance spectrum, infrared absorption spectrum, mass spectrum and the like. The unit for the phase transition temperatures is degree centigrade (° C.); in which C denotes crystal, N denotes a nematic phase, and I denotes an isotropic liquid phase. The polymerization conditions and the measurement methods for the properties are shown below.
<Polymerization Conditions>
In a nitrogen atmosphere or in the air, light (365 nm) having an intensity of 30 mW/cm² was radiated at room temperature for 30 seconds with a 250 W super high pressure mercury lamp.
Production of Glass Substrate with Orientation Film having been subjected to Rubbing Treatment
An alignment agent (Lixon Aligner PIA-5370, a trade name, available from Chisso Corporation) was spin-coated on a glass substrate having a thickness of 1.1 mm. After evaporating the solvent, the substrate was baked at 230° C. for 30 minutes and then subjected to a rubbing treatment.
Confirmation of Liquid Crystal Orientation State
A substrate having a liquid crystal film formed thereon was observed with a polarizing microscope to confirm the presence of alignment defects.
<Measurement with Ellipsometer>
A substrate having a liquid crystal film formed thereon was irradiated with light having a wavelength of 550 nm with Optipro Ellipsometer, available from Shintech Co., Ltd. The retardation was measured by decreasing the incident angle of the light with respect to the film surface from 90°. The retardation is expressed by Δn×d, wherein Δn represents the refractive index anisotropy, and d represents the thickness of the polymer film.
<Measurement of Thickness of Film>
A glass substrate having a liquid crystal film formed thereon was ground for only the liquid crystal film, and the step thus formed was measured with a minute shape measuring apparatus (Alfastep IQ, available from KLA-Tencor Corporation).
<Evaluation of Δn>
A liquid crystal film having a homogeneous alignment was measured for retardation and thickness, and Δn was calculated as a value obtained by dividing a retardation by the thickness.

Example 1

The compound (1-A-2) was synthesized in the following manner.

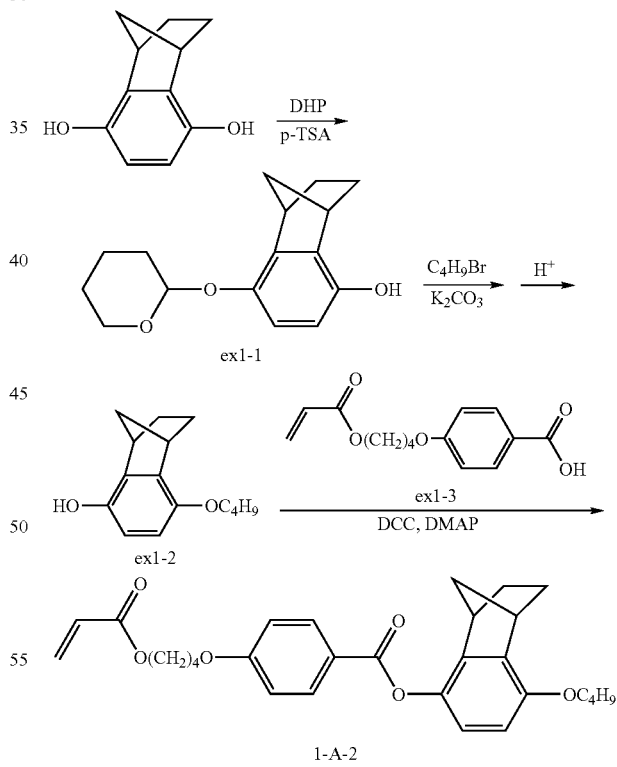

<First Step>
85 mmol of 3',6'-dihydroxybenzonorbornene, 130 mmol of 3,4-dihydro-2H-pyran and 10 mmol of p-toluenesulfonic acid were added to 300 mL of dichloromethane, and the mixture was stirred in a nitrogen atmosphere at 50° C. for 5 hours. The organic layer was washed with water and then dried over anhydrous magnesium sulfate. The solvent was distilled off under reduced pressure, and the residue was purified by column chromatography and then recrystallized from heptane to provide 30 mmol of a compound (ex1-1).
<Second Step>
30 mmol of the compound (ex1-1), 36 mmol of bromobutane and 36 mmol of potassium carbonate were added to 300 mL of 2-butanone, and the mixture was refluxed under heating in a nitrogen atmosphere for 5 hours. Toluene and water were added to the reaction mixture, and the organic layer was washed with water. The solvent was distilled off under reduced pressure, and 3N hydrochloric acid and 300 mL of acetone were added thereto, followed by stirring at room temperature for 1 hour. Ethyl acetate was added to the reaction mixture, and the organic layer was washed with water and then dried over anhydrous magnesium sulfate. The solvent was distilled off under reduced pressure, and the residue was recrystallized from heptane to provide 24 mmol of a compound (ex1-2).
<Third Step>
24 mmol of the compound (ex1-2), 50 mmol of the compound (ex1-3) shown above and 14 mmol of 4-dimethylaminopyridine (DMAP) were added to 150 mL of dichloromethane, and the mixture was stirred under a nitrogen atmosphere. A solution containing 50 mmol of 1,3-dicyclohexylcarbodiimide (DCC) dissolved in 100 mL of dichloromethane was added dropwise thereto. After completing the dropwise addition, the reaction mixture was stirred at room temperature for 8 hours. A precipitate thus deposited was removed by filtering, and the organic layer was washed with water and then dried over anhydrous magnesium sulfate. The solvent was distilled off under reduced pressure, and the residue was purified by column chromatography and then recrystallized from ethanol to provide 16 mmol of the compound (1-A-2).

Example 2

The compound (1-B-1) was synthesized in the following manner.

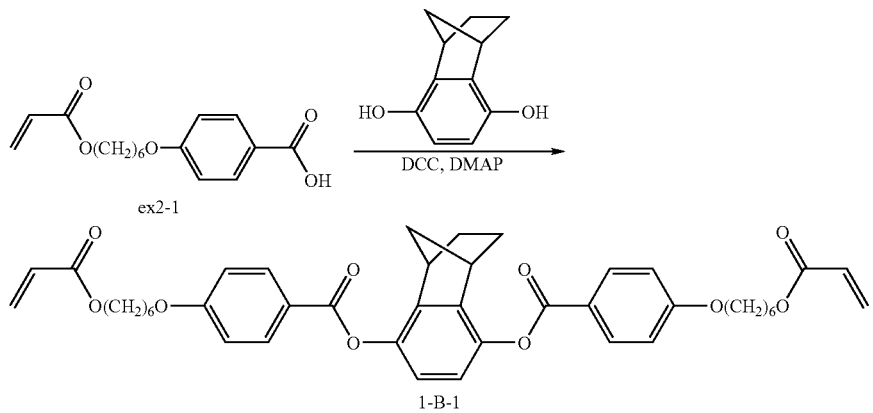

74 mmol of the compound (ex2-1) shown above, 35 mmol of 3',6'-dihydroxybenzonorbornene and 21 mmol of 4-dimethylaminopyridine (DMAP) were 200 mL of dichloromethane, and the mixture was stirred under a nitrogen atmosphere. A solution containing 74 mmol of 1,3-dicyclohexylcarbodiimide (DCC) dissolved in 100 mL of dichloromethane was added dropwise thereto. After completing the dropwise addition, the reaction mixture was stirred at room temperature for 8 hours. A precipitate thus deposited was removed by filtering, and the organic layer was washed with water and then dried over anhydrous magnesium sulfate. The solvent was distilled off under reduced pressure, and the residue was purified by column chromatography and then recrystallized from ethanol to provide 15 mmol of the compound (1-B-1).

The resulting compound (1-B-1) had a melting point shown below.

Phase transition temperature: C 77 I

The compounds used in the following Examples and Comparative Examples are shown below.

(M1-1-1)

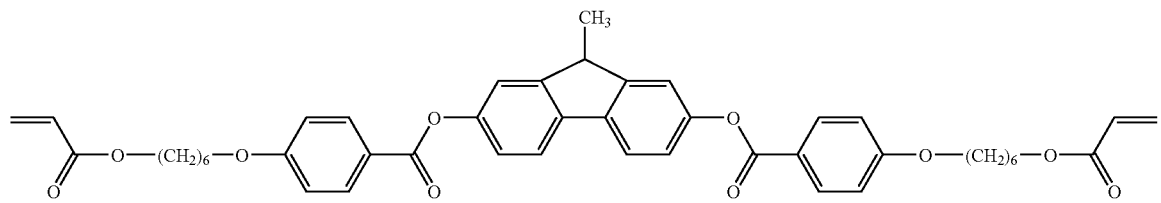

-continued

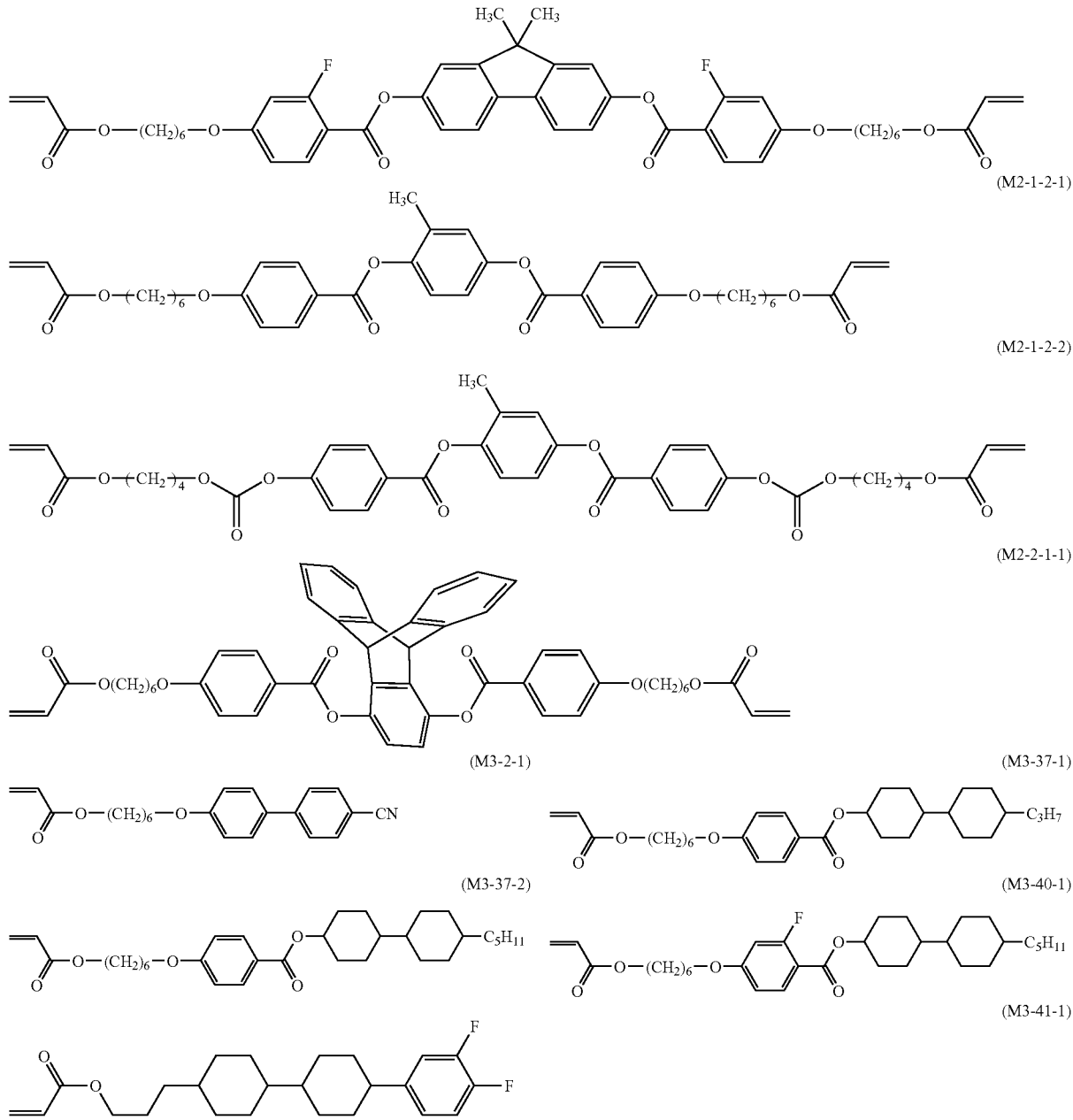

The compound (M1-1-1) was synthesized according to the method disclosed in JP-A-2003-238491.

The compound (M1-4-1) was synthesized according to the method disclosed in JP-A-2006-307150.

The compound (M2-1-2-1) was synthesized according to the method disclosed in Makromol. Chem., vol. 190, pp. 2255-2268 (1989).

The compound (M2-1-2-2) was synthesized according to the method disclosed in WO 97/00600.

The compound (M2-2-1-1) was synthesized according to the method disclosed in JP-A-2006-111571.

The compound (M3-2-1) was synthesized according to a method disclosed in Macromolecules, vol. 26, pp. 6132-6134 (1993).

The compounds (M3-37-1) and (M3-37-2) were synthesized according to the method disclosed in WO 97/34862.

The compound (M3-40-1) was synthesized by combining the method disclosed in JP-A-2006-307150 and the method disclosed in WO 97/34862.

The compound (M3-41-1) was synthesized according to the method disclosed in JP-A-2005-179557.

Example 3

The compounds (M1-1-1), (M3-2-1) and (1-B-1) were mixed at a ratio (M1-1-1)/(M3-2-1)/(1-B-1)=30/30/40 by weight. The resulting mixture was designated as MIX 1. A nonionic fluorine surfactant (Ftergent FTX-218, available from Neos Co., Ltd.) in a weight ratio of 0.002 with respect to MIX 1 and a polymerization initiator (Irgacure 907, available from Ciba Japan Co., Ltd.) in a weight ratio of 0.03 with respect to MIX 0.1 were added to MIX 1. A mixed solvent of cyclopentanone and propylene glycol monoethyl ether acetate (PGMEA) (cyclopentanone/PGMEA=1/1 by weight) was added to the resulting composition to prepare a polymerizable liquid crystal composition (1) having a solvent ratio of 80% by weight.

The polymerizable liquid crystal composition (1) was coated by a spin coating method on the glass substrate with an alignment film having been subjected to the rubbing treatment. The substrate was heated to 80° C. for 3 minutes and cooled at room temperature for 3 minutes, and the coated film, from which the solvent was removed, was polymerized with an ultraviolet ray under a nitrogen stream to provide an anisotropic polymer having the alignment state of the liquid crystal having been fixed. The observation of the anisotropic polymer with a polarizing microscope revealed that the anisotropic polymer had a uniform alignment without alignment defect. The measurement of the retardation of the anisotropic polymer provided the results shown in FIG. 1, which showed a homogeneous alignment. The measured retardation value at 90° with respect to the film surface was 138 nm, and the thickness was 970 nm, from which $\Delta n$ was calculated as 0.14.

Example 4

A polymerizable liquid crystal composition (2) was prepared in the same manner as in Example 3 by using MIX 1 prepared in Example 3 except that a polymerization initiator Irgacure 907 in a weight ratio of 0.03 with respect to MIX 1 and a polymerization initiator Irgacure 369 in a weight ratio of 0.03 with respect to MIX 1 were added to MIX 1. The polymerizable liquid crystal composition (2) was evaluated in the same manner as in Example 3 except that the coated film was polymerized in the air, and thus an anisotropic polymer having no alignment defect was obtained. The anisotropic polymer had retardation with the similar tendency as in FIG. 1, and $\Delta n$ calculated was 0.11.

Example 5

The compounds (M1-1-1), (M2-2-1-1) and (1-B-1) were mixed at a ratio (M1-1-1)/(M2-2-1-1)/(1-B-1)=40/30/30 by weight. The resulting mixture was designated as MIX 2. A polymerizable liquid crystal composition (3) was prepared and evaluated in the same manner as in Example 4 except that MIX 2 was used, and thus an anisotropic polymer having no alignment defect was obtained. The anisotropic polymer had retardation with the similar tendency as in FIG. 1, and $\Delta n$ calculated was 0.13.

Comparative Example 1

The compounds (M1-1-1) and (M2-2-1-1) were mixed at a ratio (M1-1-1)/(M2-2-1-1)=35/65 by weight. The resulting mixture was designated as MIX 3. A polymerizable liquid crystal composition (4) was prepared and evaluated in the same manner as in Example 4 except that MIX 3 was used, and thus alignment defects occurred frequently due to crystallization, resulting in a polymer having a white turbid appearance. The polymer was difficult to be measured for retardation.

Example 6

The compounds (M1-1-1), (M2-2-1-1) and (1-B-1) were mixed at a ratio (M1-1-1)/(M2-2-1-1)/(1-B-1)=20/40/40 by weight. The resulting mixture was designated as MIX 4. A polymerizable liquid crystal composition (5) was prepared and evaluated in the same manner as in Example 4 except that MIX 4 was used, and thus an anisotropic polymer having no alignment defect was obtained. The anisotropic polymer had retardation with the similar tendency as in FIG. 1, and $\Delta n$ calculated was 0.11.

Example 7

The compounds (M3-41-1), (M2-2-1-1) and (1-B-1) were mixed at a ratio (M3-41-1)/(M2-2-1-1)/(1-B-1)=20/40/40 by weight. The resulting mixture was designated as MIX 5. A polymerizable liquid crystal composition (6) was prepared and evaluated in the same manner as in Example 4 except that MIX 5 was used, and thus an anisotropic polymer having no alignment defect was obtained. The anisotropic polymer had retardation with the similar tendency as in FIG. 1, and $\Delta n$ calculated was 0.08.

Example 8

The compounds (M1-1-1) and (1-B-1) were mixed at a ratio (M1-1-1)/(1-B-1)=20/80 by weight. The resulting mixture was designated as MIX 6. A polymerizable liquid crystal composition (7) was prepared and evaluated in the same manner as in Example 4 except that MIX 6 was used, and thus an anisotropic polymer having no alignment defect was obtained. The anisotropic polymer had retardation with the similar tendency as in FIG. 1, and $\Delta n$ calculated was 0.10.

Example 9

The compounds (M2-1-2-1) and (1-B-1) were mixed at a ratio (M2-1-2-1)/(1-B-1)=20/80 by weight. The resulting mixture was designated as MIX 7. A polymerizable liquid crystal composition (8) was prepared and evaluated in the same manner as in Example 4 except that MIX 7 was used, and thus an anisotropic polymer having no alignment defect was obtained. The anisotropic polymer had retardation with the similar tendency as in FIG. 1, and $\Delta n$ calculated was 0.10.

Example 10

The compounds (M2-1-2-1), (M3-37-1) and (1-B-1) were mixed at a ratio (M2-1-2-1)/(M3-37-1)/(1-B-1)=25/25/50 by weight. The resulting mixture was designated as MIX 8. A polymerizable liquid crystal composition (9) was prepared and evaluated in the same manner as in Example 4 except that MIX 8 was used, a mixed solvent of cyclopentanone and PGMEA (cyclopentanone/PGMEA=9/1 by weight) was used as the solvent, and the solvent ratio of the composition was changed to 75% by weight, and thus an anisotropic polymer having no alignment defect was obtained. The anisotropic polymer had retardation with the similar tendency as in FIG. 1, and $\Delta n$ calculated was 0.12.

Example 11

The compounds (1-B-1), (M3-37-1) and (M3-37-2) were mixed at a ratio (1-B-1)/(M3-37-1)/(M3-37-2)=30/30/40 by weight. The resulting mixture was designated as MIX 9. A polymerizable liquid crystal composition (10) was prepared and evaluated in the same manner as in Example 4 except that MIX 9 was used, the compound (N-13) in a weight ratio of 0.02 with respect to MIX 9 was added to MIX 9, a mixed solvent of cyclopentanone and PGMEA (cyclopentanone/

PGMEA=9/1 by weight) was used as the solvent, and the solvent ratio of the composition was changed to 75% by weight, and thus an anisotropic polymer having no alignment defect was obtained. The anisotropic polymer had retardation with the similar tendency as in FIG. 1, and Δn calculated was 0.11.

Example 12

The compounds (1-B-1), (M3-37-1) and (M3-37-2) were mixed at a ratio (1-B-1)/(M3-37-1)/(M3-37-2)=30/30/40 by weight. The resulting mixture was designated as MIX 10. A polymerizable liquid crystal composition (11) was prepared and evaluated in the same manner as in Example 4 except that MIX 10 was used, a mixed solvent of cyclopentanone and PGMEA (cyclopentanone/PGMEA=9/1 by weight) was used as the solvent, and the solvent ratio of the composition was changed to 75% by weight, and thus an anisotropic polymer having no alignment defect was obtained. The anisotropic polymer had retardation with the similar tendency as in FIG. 1, and Δn calculated was 0.11.

Example 13

The compounds (1-B-1), (M2-2-1-1), (M3-37-1) and (M3-37-1) were mixed at a ratio (1-B-1)/(M2-2-1-1)/(M3-37-1)/(M3-37-2)=20/20/30/30 by weight. The resulting mixture was designated as MIX 11. A polymerizable liquid crystal composition (12) was prepared and evaluated in the same manner as in Example 4 except that MIX 11 was used, a polymerization initiator Irgacure 907 in a weight ratio of 0.06 with respect to MIX 11 was added to MIX 11, a mixed solvent of cyclopentanone and PGMEA (cyclopentanone/PGMEA=9/1 by weight) was used as the solvent, and the solvent ratio of the composition was changed to 75% by weight, and thus an anisotropic polymer having no alignment defect was obtained. The anisotropic polymer had retardation with the similar tendency as in FIG. 1, and Δn calculated was 0.11.

Example 14

A polymerizable liquid crystal composition (13) was prepared and evaluated in the same manner as in Example 13 except that the compound (N-13) in a weight ratio of 0.02 with respect to MIX 11 was added to MIX 11, and thus an anisotropic polymer having no alignment defect was obtained. The anisotropic polymer had retardation with the similar tendency as in FIG. 1, and Δn calculated was 0.11.

Example 15

The compounds (M2-1-2-2) and (1-B-1) were mixed at a ratio (M2-1-2-2)/(1-B-1)=50/50 by weight. The resulting mixture was designated as MIX 12. A polymerizable liquid crystal composition (14) was prepared and evaluated in the same manner as in Example 4 except that MIX 12 was used, and a polymerization initiator Irgacure 907 in a weight ratio of 0.06 with respect to MIX 12 was added to MIX 12, and thus an anisotropic polymer having no alignment defect was obtained. The anisotropic polymer had retardation with the similar tendency as in FIG. 1, and Δn calculated was 0.12.

Example 16

The compounds (M2-1-2-2) and (1-B-1) were mixed at a ratio (M2-1-2-2)/(1-B-1)=30/70 by weight. The resulting mixture was designated as MIX 13. A polymerizable liquid crystal composition (15) was prepared and evaluated in the same manner as in Example 4 except that MIX 13 was used, and a polymerization initiator Irgacure 907 in a weight ratio of 0.06 with respect to MIX 13 was added to MIX 13, and thus an anisotropic polymer having no alignment defect was obtained. The anisotropic polymer had retardation with the similar tendency as in FIG. 1, and Δn calculated was 0.11.

Example 17

The compounds (M1-4-1), (M2-1-2-1) and (1-B-1) were mixed at a ratio (M1-4-1)/(M2-1-2-1)/(1-B-1)=30/30/40 by weight. The resulting mixture was designated as MIX 14. A nonionic fluorine surfactant (Ftergent FTX-218, available from Neos Co., Ltd.) in a weight ratio of 0.001 with respect to MIX 14, a polymerization initiator Irgacure 907 in a weight ratio of 0.06 with respect to MIX 14, and a polymerization initiator VAm-111 (available from Wako Pure Chemical Industries, Ltd.) in a weight ratio of 0.09 with respect to MIX 14 were added to MIX 14. A mixed solvent of cyclopentanone and propylene glycol monoethyl ether acetate (PGMEA) (cyclopentanone/PGMEA=1/1 by weight) was added to the resulting composition to prepare a polymerizable liquid crystal composition (16) having a solvent ratio of 65% by weight.

The polymerizable liquid crystal composition (16) was coated by a spin coating method on the glass substrate with an alignment film having been subjected to the rubbing treatment. The substrate was heated to 80° C. for 3 minutes and cooled at room temperature for 3 minutes. A mask of quartz glass having been arbitrarily chromium-patterned was placed on the coated film, from which the solvent was removed, and the coated film was polymerized by irradiating with light (365 nm) having an intensity of 30 mW/cm² for 3 seconds through the mask. Thereafter, the mask was removed from the substrate, which was placed on a hot plate at 140° C. for a heat treatment under a nitrogen stream for 20 minutes. The exposed portion had a uniform alignment and retardation with the similar tendency as in FIG. 1. The non-exposed portion was cured in a state having an isotropic phase and lost retardation. As a result, an anisotropic polymer having a homogeneous alignment having been patterned was obtained.

Example 18

The compounds (M3-37-1), (M3-40-1) and (1-B-1) were mixed at a ratio (M3-37-1)/(M3-40-1)/(1-B-1)=30/30/40 by weight. The resulting mixture was designated as MIX 15. A polymerizable liquid crystal composition (17) was prepared and evaluated in the same manner as in Example 4 except that MIX 15 was used, a polymerization initiator Irgacure 907 in a weight ratio of 0.06 with respect to MIX 15 was added to MIX 15, a mixed solvent of cyclohexanone and PGMEA (cyclohexanone/PGMEA=9/1 by weight) was used as the solvent, and the solvent ratio of the composition was changed to 75% by weight, and thus an anisotropic polymer having no alignment defect was obtained. The anisotropic polymer had retardation with the similar tendency as in FIG. 1, and Δn calculated was 0.12.

Comparative Example 2

The compounds (M1-1-1) and (M3-2-1) were mixed at a ratio (M1-1-1)/(M3-2-1)=70/30 by weight. The resulting mixture was designated as MIX 16. A polymerizable liquid crystal composition (18) was prepared and evaluated in the same manner as in Example 3 except that MIX 16 was used, and thus an anisotropic polymer having no alignment defect was obtained. The anisotropic polymer had retardation with the similar tendency as in FIG. 1, but Δn calculated was a large value of 0.20.

It is understood from the results of Examples and Comparative Examples that the anisotropic polymers obtained from the polymerizable liquid crystal compositions of the invention have a low value for Δn while maintaining the alignment of the liquid crystal. Furthermore, it is also understood that a polymerizable liquid crystal composition containing a large amount of a polymerizable compound having a triptycene skeleton can be prevented from suffering progress of crystallization by utilizing the compound of the invention.

According to the invention, the use of a polymerizable liquid crystal composition containing a polymerizable compound having a norbornene skeleton in the molecular short axis provides an anisotropic polymer having a uniform homogeneous alignment and enables to control the birefringence (refractive index anisotropy). The polymer of the invention is suitable for such purposes as a phase retardation film, a polarizing device, a circularly polarizing device, an elliptically polarizing device, a reflection film, a selective reflection film, a color compensation film, a viewing angle compensation film and a liquid crystal alignment film.

The invention claimed is:

1. A polymerizable liquid crystal compound represented by the formula (1):

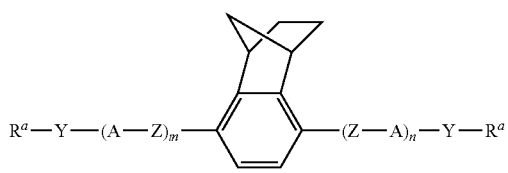

(1)

wherein $R^a$ independently represents a polymerizable group represented by one of the formulae (p-1) to (p-6), chlorine, fluorine, cyano, alkyl having from 1 to 10 carbon atoms, alkoxy having from 1 to 10 carbon atoms, —CF$_3$ or —OCF$_3$:

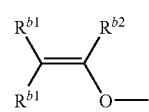
(p-1)

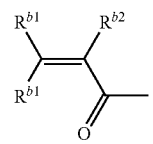
(p-2)

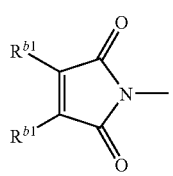
(p-3)

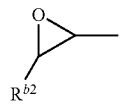
(p-4)

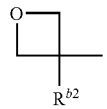
(p-5)

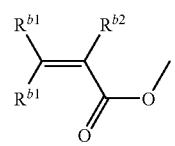
(p-6)

wherein $R^{b1}$ and $R^{b2}$ independently represent hydrogen, halogen, alkyl having from 1 to 5 carbon atoms or halogenated alkyl having from 1 to 5 carbon atoms, and wherein at least one $R^a$ represents a polymerizable group represented by one of the formulae (p-1) to (p-6);

A independently represents 1,4-cyclohexylene, 1,4-cyclohexenylene, 1,4-phenylene, naphthalen-2,6-diyl, tetrahydronaphthalen-2,6-diyl, fluoren-2,7-diyl or bicycle [2.2.2]octan-1,4-diyl; in which one or two —CH$_2$— in the 1,4-cyclohexylene may be replaced by —O— provided that two —CH$_2$— adjacent to each other are not replaced simultaneously, one or two —CH═ in the 1,4-phenylene may be replaced by —N═, and arbitrary hydrogen in the 1,4-phenylene may be replaced by halogen, cyano, alkyl having from 1 to 5 carbon atoms or halogenated alkyl having from 1 to 5 carbon atoms;

Z independently represents a single bond or alkylene having from 1 to 20 carbon atoms; in which in the alkylene, arbitrary —CH$_2$— may be replaced by —O—, —CO—, —COO—, —OCO—, —CH═CH—, —CF═CF— or —C≡C—, and arbitrary hydrogen may be replaced by halogen;

Y independently represents a single bond or alkylene having from 1 to 20 carbon atoms; in which in the alkylene, arbitrary —CH$_2$—may be replaced by —O—, —CO—, —COO—, —OCO—, —OCOO— or —CH═CH—, and arbitrary hydrogen may be replaced by halogen; and m and n independently represent an integer of from 0 to 5.

2. The polymerizable liquid crystal compound according to claim 1, wherein the polymerizable group is a group represented by one of the formulae (p-4) to (p-6):

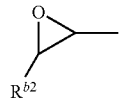
(p-4)

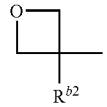
(p-5)

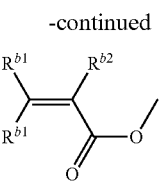

(p-6)

wherein $R^{b1}$ and $R^{b2}$ independently represent hydrogen, halogen, alkyl having from 1 to 5 carbon atoms or halogenated alkyl having from 1 to 5 carbon atoms.

3. The polymerizable liquid crystal compound according to claim 1, wherein m+n is from 1 to 3 in the formula (1).

4. The polymerizable liquid crystal compound according to claim 1, wherein m+n is 2 in the formula (1).

5. The polymerizable liquid crystal compound according to claim 1, wherein in the formula (1), A independently represents 1,4-cyclohexylene, 1,4-phenylene, pyridin-2,5-diyl, pyridazin-3,6-diyl or pyrimidin-2,5-diyl; in which arbitrary hydrogen in the 1,4-phenylene may be replaced by chlorine, fluorine, cyano, alkyl having from 1 to 3 carbon atoms or fluoroalkyl having from 1 to 3 carbon atoms.

6. The polymerizable liquid crystal compound according to claim 1, wherein in the formula (1), A independently represents 1,4-cyclohexylene or 1,4-phenylene; in which arbitrary hydrogen in the 1,4-phenylene may be replaced by chlorine, fluorine, cyano, —CH$_3$ or —CF$_3$.

7. The polymerizable liquid crystal compound according to claim 1, wherein in the formula (1), Z independently represents a single bond, —CH$_2$O—, —OCH$_2$—, —COO—, —OCO—, —CH═CH—, —(CH$_2$)$_2$COO—, —OCO(CH$_2$)$_2$—, —CH═CH—COO—, —OCO—CH═CH— or —C≡C—.

8. The polymerizable liquid crystal compound according to claim 1, wherein in the formula (1), Z independently represents a single bond, —CH$_2$O—, —OCH$_2$—, —COO— or —OCO—.

9. The polymerizable liquid crystal compound according to claim 1, wherein in the formula (1), Y independently represents alkylene having from 1 to 10 carbon atoms; in which arbitrary —CH$_2$— in the alkylene may be replaced by —O—, —COO—, —OCO— or —OCOO—.

10. A polymerizable liquid crystal composition comprising at least one polymerizable liquid crystal compound selected from the group of the polymerizable liquid crystal compounds according to claim 1.

11. A polymerizable liquid crystal composition comprising at least one polymerizable liquid crystal compound selected from the group of compounds represented by the formula (1), and at least one polymerizable compound selected from the group of compounds represented by the formulae (M1), (M2-1), (M2-2) and (M3):

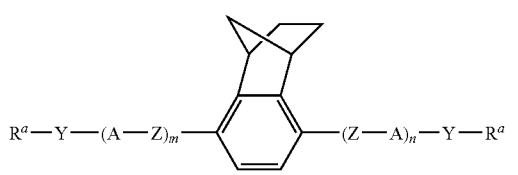

(1)

wherein
$R^a$ independently represents a polymerizable group represented by one of the formulae (p-1) to (p-6), chlorine, fluorine, cyano, alkyl having from 1 to 10 carbon atoms, alkoxy having from 1 to 10 carbon atoms, —CF$_3$ or —OCF$_3$:

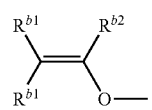

(p-1)

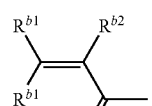

(p-2)

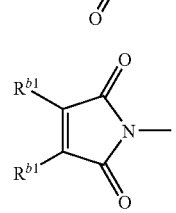

(p-3)

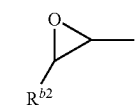

(p-4)

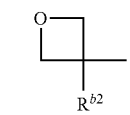

(p-5)

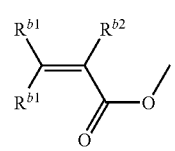

(p-6)

wherein $R^{b1}$ and $R^{b2}$ independently represent hydrogen, halogen, alkyl having from 1 to 5 carbon atoms or halogenated alkyl having from 1 to 5 carbon atoms, and wherein at least one $R^a$ represents a polymerizable group represented by one of the formulae (p-1) to (p-6);

A independently represents 1,4-cyclohexylene, 1,4-cyclohexenylene, 1,4-phenylene, naphthalen-2,6-diyl, tetrahydronaphthalen-2,6-diyl, fluoren-2,7-diyl or bicyclo[2.2.2]octan-1,4-diyl; in which one or two —CH$_2$— in the 1,4-cyclohexylene may be replaced by —O— provided that two —CH$_2$— adjacent to each other are not replaced simultaneously, one or two —CH═ in the 1,4-phenylene may be replaced by —N═, and arbitrary hydrogen in the 1,4-phenylene may be replaced by halogen, cyano, alkyl having from 1 to 5 carbon atoms or halogenated alkyl having from 1 to 5 carbon atoms;

Z independently represents a single bond or alkylene having from 1 to 20 carbon atoms; in which in the alkylene, arbitrary —CH$_2$— may be replaced by —O—, —CO—, —COO—, —OCO—, —CH═CH—, —CF═CF— or —C≡C—, and arbitrary hydrogen may be replaced by halogen;

Y independently represents a single bond or alkylene having from 1 to 20 carbon atoms; in which in the alkylene, arbitrary —CH$_2$— may be replaced by —O—, —CO—, —COO—, —OCO—, —OCOO— or —CH═CH—, and arbitrary hydrogen may be replaced by halogen; and m and n independently represent an integer of from 0 to 5,

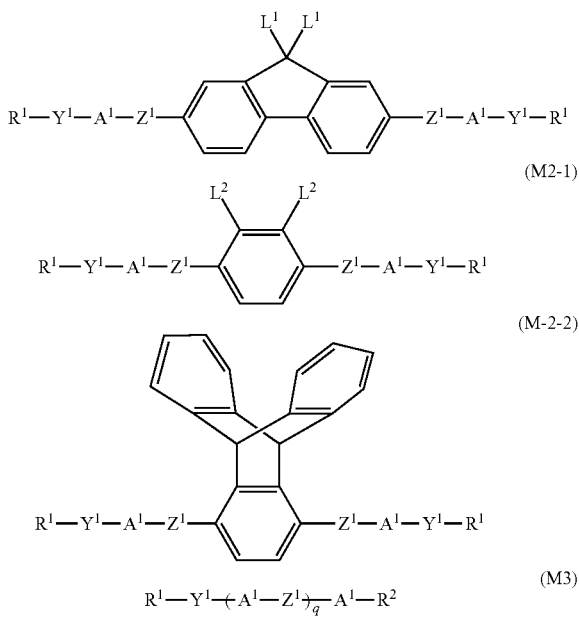

wherein
R¹ independently represents a group represented by one of the formulae (p-1) to (p-6);
R² represents alkyl having from 1 to 10 carbon atoms, alkoxy having from 1 to 10 carbon atoms, chlorine, fluorine, cyano, —CF₃ or —OCF₃;
A¹ independently represents 1,4-cyclohexylene or 1,4-phenylene; in which arbitrary hydrogen in the 1,4-phenylene may be replaced by fluorine;
Z¹ independently represents a single bond, —CH₂CH₂—, —CH₂O—, —OCH₂—, —COO—, —OCO—, CH═CH—, —C≡C—, —CH═CHCOO—, —OCOCH═CH—, —(CH₂)₂COO— or —OCO(CH₂)₂—;
Y¹ independently represents a single bond or alkylene having from 1 to 20 carbon atoms; in which arbitrary —CH₂— in the alkylene may be replaced by —O—, —CO—, —COO—, —OCO—, —OCOO— or —CH═CH—;
L¹ independently represents hydrogen, fluorine or —CH₃;
L² independently represents hydrogen, chlorine, fluorine, —CH₃ or —CF₃; and
q represents 1 or 2.

12. The polymerizable liquid crystal composition according to claim 11, wherein
in the formula (1),
the polymerizable group is a group represented by one of the formulae (p-4) to (p-6);
A independently represents 1,4-cyclohexylene, 1,4-phenylene, pyridin-2,5-diyl, pyridazin-3,6-diyl or pyrimidin-2,5-diyl; in which arbitrary hydrogen in the 1,4-phenylene may be replaced by chlorine, fluorine, cyano, alkyl having from 1 to 3 carbon atoms or fluoroalkyl having from 1 to 3 carbon atoms;
Z independently represents a single bond, —CH₂O—, —OCH₂—, —COO—, —OCO—, —CH═CH—, (CH₂)₂COO—, —OCO(CH₂)₂—, —CH═CH—COO—, —OCO—CH═CH— or —C≡C—;
Y independently represents a single bond or alkylene having from 1 to 10 carbon atoms; in which arbitrary —CH₂— in the alkylene may be replaced by —O—, —COO—, —OCO— or —OCOO—; and
m and n each represent 1,
in the formulae (M1), (M2-1), (M2-2) and (M3),
R¹ independently represents a group represented by one of the formulae (p-4) to (p-6);
R² represents alkyl having from 1 to 5 carbon atoms, alkoxy having from 1 to 5 carbon atoms, chlorine, fluorine, cyano, —CF₃ or —OCF₃;
Aˡ independently represents 1,4-cyclohexylene, 1,4-phenylene, monofluoro-1,4-phenylene or difluoro-1,4-phenylene;
Z¹ independently represents a single bond, —CH₂O—, —OCH₂—, —COO—, —OCO—, —C≡C—, CH═CHCOO—, —OCOCH═CH—, —(CH₂)₂COO— or —OCO(CH₂)₂—;
Y¹ independently represents a single bond or alkylene having from 1 to 10 carbon atoms;
in which arbitrary —CH₂— in the alkylene may be replaced by —O—, —COO—, —OCO— or —OCOO—;
L¹ independently represents hydrogen, fluorine or —CH₃;
L² independently represents hydrogen, chlorine, fluorine, —CH₃ or —CF₃; and
q represents 1 or 2, and
a ratio of the compound represented by the formula (1) is from 1 to 90% by weight, and a ratio of the polymerizable compound selected from the group of compounds represented by the formulae (M1), (M2-1), (M2-2) and (M3) is from 10 to 99% by weight, based on a total amount of the compound represented by the formula (1) and the polymerizable compound selected from the group of compounds represented by the formulae (M1), (M2-1), (M2-2) and (M3).

13. The polymerizable liquid crystal composition according to claim 11, wherein
in the formula (1),
the polymerizable group is a group represented by one of the formulae (p-4) to (p-6);
A independently represents 1,4-cyclohexylene,. or 1,4-phenylene in which arbitrary hydrogen in the rings may be replaced by chlorine, fluorine, —CH₃ or —CF₃;
Z independently represents a single bond, —COO— or —OCO—;
Y independently represents alkylene having from 1 to 10 carbon atoms; in which in the alkylene, —CH₂— adjacent to the ring may be replaced by —O—,—COO—, —OCO— or —OCOO—; and
m and n each represent 1,
in the formulae (M1), (M2-1), (M2-2) and (M3),
R¹ independently represents a group represented by one of the formulae (p-4) to (p-6);
R² represents alkyl having from 1 to 5 carbon atoms, alkoxy having from 1 to 5 carbon atoms, cyano, fluorine or —OCF₃;
Aˡ independently represents 1,4-cyclohexylene, 1,4-phenylene, monofluoro-1,4-phenylene or difluoro-1,4-phenylene;
Z¹ independently represents a single bond, —COO—, —OCO—, —CH═CHCOO—,—OCOCH═CH—, —(CH₂)₂COO— or —OCO(CH₂)₂—;
Y¹ independently represents a single bond or alkylene having from 1 to 10 carbon atoms; in which in the alkylene, —CH₂—adjacent to the ring may be replaced by —O—, —COO—, —OCO— or —OCOO—;

$L^1$ independently represents hydrogen or —$CH_3$;
$L^2$ independently represents hydrogen, fluorine, —$CH_3$ or —$CF_3$; and
q represents 2, and
a ratio of the compound represented by the formula (1) is from 3 to 85% by weight, and a ratio of the polymerizable compound selected from the group of compounds represented by the formulae (M1), (M2-1), (M2-2) and (M3) is from 15 to 97% by weight, based on a total amount of the compound represented by the formula (1) and the polymerizable compound selected from the group of compounds represented by the formulae (M1), (M2-1), (M2-2) and (M3).

14. The polymerizable liquid crystal composition according to claim 11, wherein the composition further comprises a polymerizable compound, which is not represented by the formula (1), (M1), (M2-1), (M2-2) and (M3) and is not optically active.

15. The polymerizable liquid crystal composition according to claim 14, wherein the composition further comprises a polymerizable optically active compound.

16. The polymerizable liquid crystal composition according to claim 15, wherein the composition further comprises a non-polymerizable liquid crystal compound.

17. The polymerizable liquid crystal composition according to claim 16, wherein the composition further comprises a non-polymerizable optically active compound.

18. A polymer film obtained by polymerizing the polymerizable liquid crystal composition according to claim 11.

19. An anisotropic polymer obtained by polymerizing the polymerizable liquid crystal composition according to claim 11.

20. The anisotropic polymer according to claim 19, wherein the polymerizable liquid crystal composition has one alignment mode selected from a homogeneous alignment, a tilted alignment, a twisted alignment and a homeotropic alignment.

21. The anisotropic polymer according to claim 20, wherein an alignment mode of the polymerizable liquid crystal composition is controlled by one method selected from a rubbing treatment, a photo alignment treatment, anion beam treatment, a corona treatment and a plasma treatment.

22. The anisotropic polymer according to claim 20, wherein an alignment mode of the polymerizable liquid crystal composition is controlled by one method selected from a rubbing treatment, a photo alignment treatment, a corona treatment and a plasma treatment.

23. The anisotropic polymer according to claim 19, wherein the anisotropic polymer is formed on a glass substrate as a supporting substrate.

24. The anisotropic polymer according to claim 19, wherein the anisotropic polymer is formed on a glass substrate having a plastic film coated thereon or on a plastic substrate containing a plastic film, as a supporting substrate.

25. The anisotropic polymer according to claim 24, wherein a plastic material as a material for the plastic film and the plastic film is one material selected from polyimide, polyamideimide, polyamide, polyetherimide, polyether ether ketone, polyether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, cellulose, triacetyl cellulose, a partially saponified product of triacetyl cellulose, an epoxy resin, a phenol resin and a cycloolefin resin.

26. The anisotropic polymer according to claim 24, wherein a plastic material as a material for the plastic film and the plastic film is one material selected from polyimide, polyvinyl alcohol, triacetyl cellulose, a partially saponified product of triacetyl cellulose and a cycloolefin resin.

27. An optical compensation film comprising the anisotropic polymer according to claim 19.

28. A liquid crystal display device comprising the optical compensation film according to claim 27.

29. A liquid crystal display apparatus comprising the optical compensation film according to claim 27.

30. A reflection film comprising the anisotropic polymer according to claim 19.

31. A liquid crystal display device comprising the reflection film according to claim 30.

32. A liquid crystal display apparatus comprising the reflection film according to claim 30.

* * * * *